(12) United States Patent
Takahashi

(10) Patent No.: US 8,264,711 B2
(45) Date of Patent: Sep. 11, 2012

(54) IMAGE FORMING APPARATUS, IMAGE PROCESSING SYSTEM, INCLUDING THE IMAGE FORMING APPARATUS CONNECTABLE VIA A NETWORK TO AT LEAST ONE SERVICE PROVIDER THAT PROVIDES A PLURALITY OF PROCESSING FUNCTIONS METHOD OF PROCESSING A JOB, METHOD OF CONTROLLING A JOB, AND COMPUTER READABLE STORAGE MEDIUM INCLUDING COMPUTER-EXECUTABLE INSTRUCTIONS

(75) Inventor: Hiroyuki Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1380 days.

(21) Appl. No.: 10/985,796

(22) Filed: Nov. 10, 2004

(65) Prior Publication Data

US 2005/0105129 A1 May 19, 2005

(30) Foreign Application Priority Data

Nov. 13, 2003 (JP) ................................. 2003-383650
Oct. 5, 2004 (JP) ................................. 2004-292293

(51) Int. Cl.
*G06F 3/12* (2006.01)
*G06K 15/00* (2006.01)
(52) U.S. Cl. ...................... 358/1.15; 358/1.13; 358/1.14
(58) Field of Classification Search .................. None
See application file for complete search history.

(56) References Cited

U.S. PATENT DOCUMENTS

| 5,287,194 | A | * | 2/1994 | Lobiondo ..................... 358/296 |
| 5,974,233 | A | | 10/1999 | Nishiyama |
| 6,029,238 | A | | 2/2000 | Furukawa |
| 6,100,992 | A | * | 8/2000 | Yoshiura et al. ............. 358/1.14 |
| 6,317,115 | B1 | | 11/2001 | Yokomizo |
| 6,452,607 | B1 | * | 9/2002 | Livingston .................... 715/705 |
| 6,757,070 | B1 | * | 6/2004 | Lin et al. ........................ 358/1.1 |
| 6,912,061 | B1 | * | 6/2005 | Ozaki .......................... 358/1.15 |
| 7,102,774 | B2 | | 9/2006 | White |
| 2001/0033752 | A1 | * | 10/2001 | Cook et al. .................... 396/564 |
| 2001/0043365 | A1 | | 11/2001 | Kremer et al. |
| 2002/0026379 | A1 | | 2/2002 | Chiarabini et al. |
| 2002/0051191 | A1 | | 5/2002 | Naito |
| 2002/0051204 | A1 | * | 5/2002 | Ohara .......................... 358/1.16 |
| 2002/0054320 | A1 | * | 5/2002 | Ogino .......................... 358/1.15 |
| 2002/0114003 | A1 | * | 8/2002 | Housel ......................... 358/1.15 |
| 2002/0144162 | A1 | | 10/2002 | Tada et al. |
| 2003/0033368 | A1 | | 2/2003 | Tominaga |
| 2003/0142340 | A1 | | 7/2003 | Watanabe |

(Continued)

FOREIGN PATENT DOCUMENTS

EP 782325 A 7/1997

(Continued)

*Primary Examiner* — Vincent Rudolph
(74) *Attorney, Agent, or Firm* — Canon USA, Inc., IP Division

(57) ABSTRACT

In an image processing system including an image forming apparatus and one or more service providers connected to the Internet, functions available in the image forming apparatus of a user and functions provided by the service providers on the Internet are displayed on an operation control screen such that the user can select an arbitrary function and specify operation conditions of the selected function via the operation unit. A controller of the image forming apparatus acquires information indicating the functions provided by the service providers, and selectively displays first-type functions indicated by the acquired information and/or second-type functions executable by the image forming apparatus.

13 Claims, 61 Drawing Sheets

U.S. PATENT DOCUMENTS

| | | | |
|---|---|---|---|
| 2004/0041819 A1* | 3/2004 | Barry et al. | 345/619 |
| 2005/0007614 A1* | 1/2005 | Kishigami | 358/1.13 |
| 2005/0099649 A1* | 5/2005 | Ferlitsch et al. | 358/1.15 |

FOREIGN PATENT DOCUMENTS

| | | |
|---|---|---|
| EP | 782325 A2 | 7/1997 |
| EP | 1211592 A2 | 6/2002 |
| JP | 09-186811 A | 7/1997 |
| JP | 09-214737 A | 8/1997 |
| JP | 2001-350681 A | 12/2001 |
| JP | 2002-229758 A | 8/2002 |
| JP | 2002-252732 A | 9/2002 |
| JP | 2003-162393 A | 6/2003 |

* cited by examiner

FIG. 9

Function Table    FTB

| Class | Functions | MFP | Provider-A | Provider-B | Provider-C | ... |
|---|---|---|---|---|---|---|
| Duplex | Simplex | X | X | X | X | |
| | Duplex | X | X | X | X | |
| Finishing | Mixed | | X | X | | |
| | Collate | X | X | X | X | |
| | Group | X | X | X | X | |
| | Staple | | X | X | X | |
| | Booklet | | X | X | X | |
| | Cloth Binding | | X | X | X | |
| | Case Binding | | X | X | X | |
| | Spiral | | X | | X | |
| | Twin Ring | | X | X | | |
| | File Binder | | X | X | X | |
| | Envelope | | | X | | |
| | ... | | | | | |

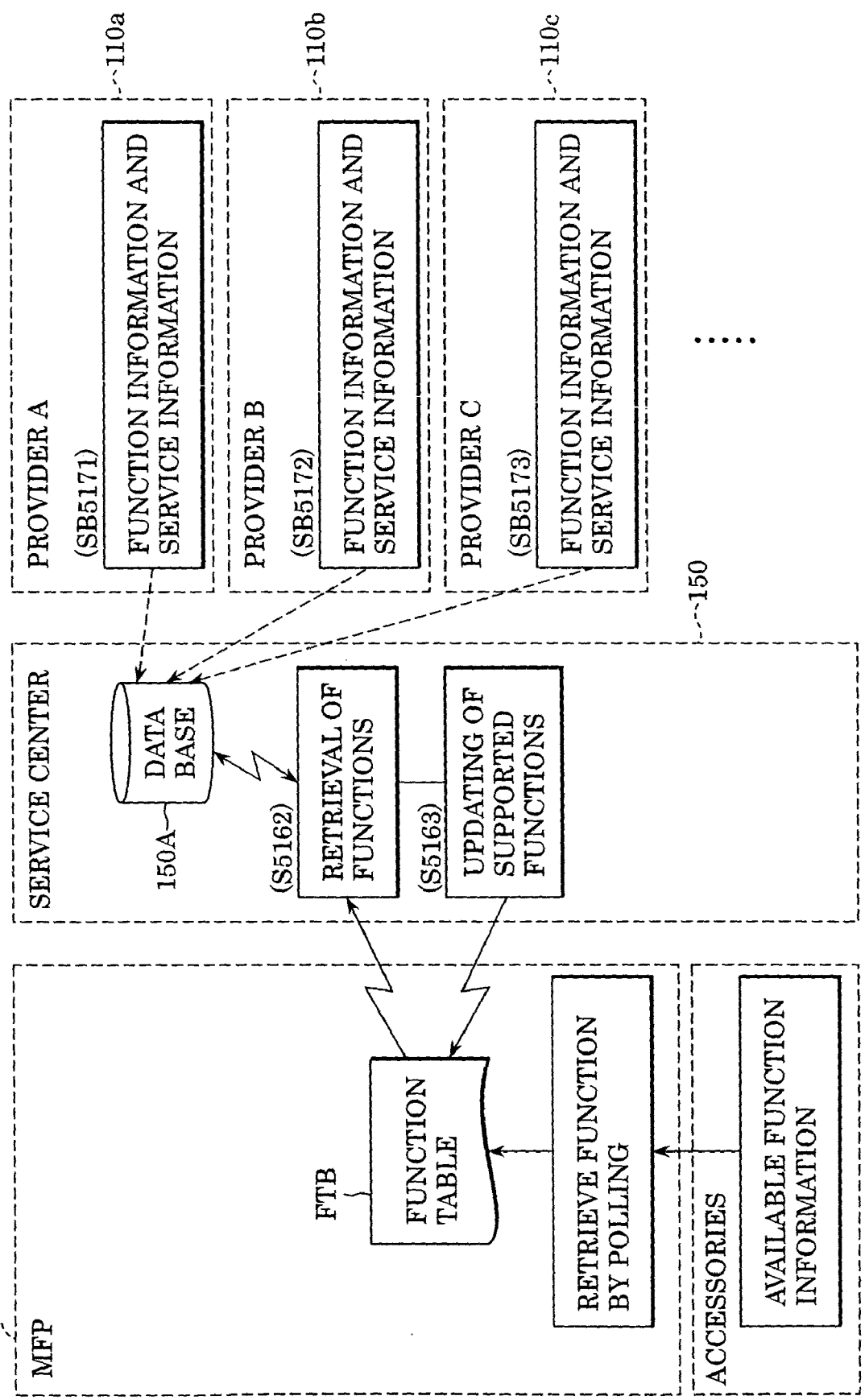

FIG. 17A

MFP

[ Finishing ]

Sorting: [ Collate ▼ ]

FIG. 17B

PROVIDER A

[ Finishing ]

| | |
|---:|:---|
| Stapling: | Off ▼ |
| Binding: | Case Binding ▼ |
| Hole Punch: | Off ▼ |
| Folding: | Off ▼ |
| Use Inserter: | Off ▼ |
| Insert Page: | |
| Banner Page: | Off ▼ |
| Sorting: | Collate ▼ |
| Trimmer: | Off ▼ |
| Trim Offset: | |

FIG. 17C

PROVIDER B

[ Finishing ]

| | |
|---:|:---|
| Stapling: | Off ▼ |
| Binding: | Case Binding ▼ |
| Hole Punch: | Off ▼ |
| Folding: | Off ▼ |
| Sorting: | Collate ▼ |
| Envelop: | Off ▼ |

FIG. 47 Job Management

| | |
|---:|:---|
| Job Priority: | Medium |
| Job Management: | Save Job |
| Reprint Management: | Delete Print Ready File |
| Job Scheduling: | Print |
| E-mail Notification: | Disabled |
| E-mail Address: | |
| Annotation: | Disabled |
| Annotation text: | |

FIG. 48 Finishing

| | |
|---:|:---|
| Stapling: | Off |
| Hole Punch: | Off |
| Booklet: | Off |
| Z-Fold: | Off |
| Use Inserter: | Off |
| Insert Page: | |
| Banner Page: | Off |
| Sorting: | Collate |
| Trimmer: | Off |
| Trim Offset: | |

FIG. 49 Image Quality

| | |
|---:|:---|
| Sharpness: | Normal |
| Brightness: | Normal |
| Color Mode: | CMYK |
| Toner Reduction: | Off |
| Copier Mode: | Character |
| Gloss Adjustment: | Standard |
| Pure Black Text/Graphics: | Off |
| Gloss Adjustment: | Off |
| Force Black Overprint: | Off |
| Gradation Smoothing: | Off |
| Combine Separation: | Off |
| Bits Per Pixel: | 8 |

| Linearization Profile: | MFP124. lud |
| --- | --- |
| ICC Color Matching: | Enabled |
| Rendering Intent: | Perceptual |
| ICC Printer Profile: | MFP124. icc |
| ICC CMYK Profile: | SWOP. icc |
| ICC RGB Profile: | SRGB.icc |
| Black Limit (0-255): | 255 |
| Cyan Limit (0-255): | 255 |
| Magenta Limit (0-255): | 255 |
| Yellow Limit (0-255): | 255 |
| Total Limit (0-255): | 1020 |

| Copy | Order | Send | Mail Box | System Monitor |

Select the paper size
[A 4] [A 3]
[A4R]

Select the paper type
[plain] [recycled]

[Cancel] [O K]

| Copy | Order | Send | Mail Box | System Monitor |

Select the paper size
[A 4] [A 3] [B 4] [letter]
[A4R] [A5R] [legal]

Select the paper type
[plain] [recycled] [color] [Tracing paper]

[Previous] [ ] [Cancel] [O K]

FIG. 63C

[PAPER SETTING] SELECT PAPER SIZE AND PAPER TYPE FROM THE FOLLOWING OPTIONS AND PRESS OK KEY

BELOW ARE PAPER SIZES AND PAPER TYPES CURRENTLY AVAILABLE IN THE IMAGE FORMING APPARATUS IN THE USER ENVIRONMENT paper size [A 4] [A 3]
[A4R]

paper type [plain] [recycled]

BELOW ARE PAPER SIZES AND PAPER TYPES CURRENTLY AVAILABLE IN THE PRINT DEVICE IN THE PROVIDER ENVIRONMENT paper size [A 4] [A 3] [B 4] [letter]
[A4R] [A5R] [legal]

paper type [plain] [recycled] [color] [Tracing paper]

[Cancel] [O K]

FIG. 64

STORAGE MEDIUM SUCH AS FD OR CD-ROM

| DIRECTORY INFORMATION |
|---|
| FIRST DATA PROCESSING PROGRAM<br>PROGRAM CODE CORRESPONDING TO STEPS OF FLOW CHART<br>SHOWN IN FIG. 6 |
| SECOND DATA PROCESSING PROGRAM<br>PROGRAM CODE CORRESPONDING TO STEPS OF FLOW CHART<br>SHOWN IN FIG. 8 |
| THIRD DATA PROCESSING PROGRAM<br>PROGRAM CODE CORRESPONDING TO STEPS OF FLOW CHART<br>SHOWN IN FIG. 15 |
| FOURTH DATA PROCESSING PROGRAM<br>PROGRAM CODE CORRESPONDING TO STEPS OF FLOW CHART<br>SHOWN IN FIG. 26 |
| FIFTH DATA PROCESSING PROGRAM<br>PROGRAM CODE CORRESPONDING TO STEPS OF FLOW CHART<br>SHOWN IN FIG. 31 |
| SIXTH DATA PROCESSING PROGRAM<br>PROGRAM CODE CORRESPONDING TO STEPS OF FLOW CHART<br>SHOWN IN FIG. 38 |
| SEVENTH DATA PROCESSING PROGRAM<br>PROGRAM CODE CORRESPONDING TO STEPS OF FLOW CHART<br>SHOWN IN FIG. 39 |
| EIGHTH DATA PROCESSING PROGRAM<br>PROGRAM CODE CORRESPONDING TO STEPS OF FLOW CHART<br>SHOWN IN FIG. 40 |
| NINTH DATA PROCESSING PROGRAM<br>PROGRAM CODE CORRESPONDING TO STEPS OF FLOW CHART<br>SHOWN IN FIG. 57 |
| TENTH DATA PROCESSING PROGRAM<br>PROGRAM CODE CORRESPONDING TO STEPS OF FLOW CHART<br>SHOWN IN FIG. 58 |

MEMORY MAP OF STORAGE MEDIUM

IMAGE FORMING APPARATUS, IMAGE PROCESSING SYSTEM, INCLUDING THE IMAGE FORMING APPARATUS CONNECTABLE VIA A NETWORK TO AT LEAST ONE SERVICE PROVIDER THAT PROVIDES A PLURALITY OF PROCESSING FUNCTIONS METHOD OF PROCESSING A JOB, METHOD OF CONTROLLING A JOB, AND COMPUTER READABLE STORAGE MEDIUM INCLUDING COMPUTER-EXECUTABLE INSTRUCTIONS

This application claims priority from Japanese Patent Applications No. 2003-383650 filed Nov. 13, 2003 and No. 2004-292293 filed Oct. 5, 2004, which are hereby incorporated by reference herein.

BACKGROUND OF THE INVENTION

1. Field of the Invention

The present invention relates to an image forming system in which a user environment including an image forming apparatus and a provider-environment that provides various services, such as a print service, are connected to each other via the Internet, a method of processing a job, a method of controlling a job, a program, and a computer-readable storage medium on which a program is stored.

2. Description of the Related Art

In a usual office environment, a user can use only an image forming apparatus (or a multi function peripheral) installed therein and associated software and hardware resources, and thus the user can use only functions provided by the image forming apparatus (or the multi function peripheral) and associated software and hardware resources (Japanese Patent Laid-Open No. 2002-82785).

In a print-on-demand (POD) market, chargeable printing services are provided such that a large number of copies or jobs are printed in response to requests issued by customers, and printed copies are delivered to the customers. In many cases, printing is performed by means of a digital printing process instead of a conventional printing process. In the digital printing process, the processes and apparatuses are controlled and managed using a computer. The quality of printed materials is increasing, and high quality close to that achieved by the conventional printing process has been achieved.

In a fulfillment service, a service is provided for all necessary operations and tasks including placing/receiving an order for a product, packaging, shipping, after-sales service, inventory control, and money reception/payment management.

In a centralized control system called a management information system (MIS), data associated with production is collected, edited, and reported to an executive to assist him/her in planning and managing business. In the MIS system, collected and stored information is supplied to a person who needs the information when the information is needed. The MIS system supports a fulfillment service in which data is described in a JDF (Job Definition Format) format established by the CIP4 (International Cooperation For Integration of Processes in Prepress, Press and Postpress).

Nowadays, broadband transmission services are widely available for the Internet, and an ASP (Application Service Provider) market is arising. In such a situation, it is becoming possible to use the Internet for the POD market.

On the other hand, on the user's side, in particular for users in small offices, high-performance MFPs (multi function peripheral) are expensive to purchase. In small offices, although there is a need for printing of a large number of copies in a short time, binding of printed sheets, printing in particular layout for the purpose of binding, and producing of direct mail, these needs are not easy to meet because of their high cost.

SUMMARY OF THE INVENTION

To solve the problems described above, an image forming apparatus, an image processing system, a method of processing a job, a method of controlling a process and a computer-readable storage medium on which computer-executable instructions are stored are provided.

An image forming apparatus, an image processing system, a method of processing a job, a method controlling a process, and a computer-readable storage medium on which applied to a POD market and can be used conveniently, and which meet various needs of many users, are provided.

The present invention provides an image forming system including an image forming apparatus connected to a network and one or more service providers that provide a particular service via the network, wherein information indicating processing functions provided by the plurality of service providers on the network is acquired, and first-type processing functions indicated by the acquired information and second-type processing functions executable by the image forming apparatus are selectively displayed on the same operation control screen allowing a user to select a processing function and specify processing conditions via the operation control screen without concern for whether the selected processing function is provided by a remote device or a local device. The image forming system according to the present invention makes it possible for a user to use not only functions executable by an image forming apparatus in a user environment but also functions such as a binding function and a sophisticated processing function that are not available in the user environment but that are provided by service providers. For use in such a system or for implementing such a system, the present invention also provides an image forming apparatus, a method of processing a job, a method of controlling a job, and a computer-readable storage medium on which computer-executable instructions are stored.

Further features and advantages of the present invention will become apparent from the following description of the embodiments with reference to the attached drawings.

BRIEF DESCRIPTION OF THE DRAWINGS

FIG. 9 shows an example of a function table (FTB) managed by an MFP shown in FIG. 1.

FIG. 10 shows a process of updating a function table in an image processing system according to the present invention.

FIGS. 17A to 17C are diagrams showing examples of job tickets that are issuable on the web browser shown in FIG. 16.

FIGS. 47 to 50 are diagrams showing examples of job tickets used in an image processing system according to the present invention.

FIGS. 63A to 63C are diagrams showing examples of operation control screens according to the present invention.

FIG. 64 is a diagram showing a memory map of a storage medium for storing data processing programs readable by an image processing apparatus according to the present invention.

DESCRIPTION OF THE EMBODIMENTS

First Embodiment

The present invention is described in further detail below with reference to preferred embodiments in conjunction with the accompanying drawings.

Overview of System

Figure 1:
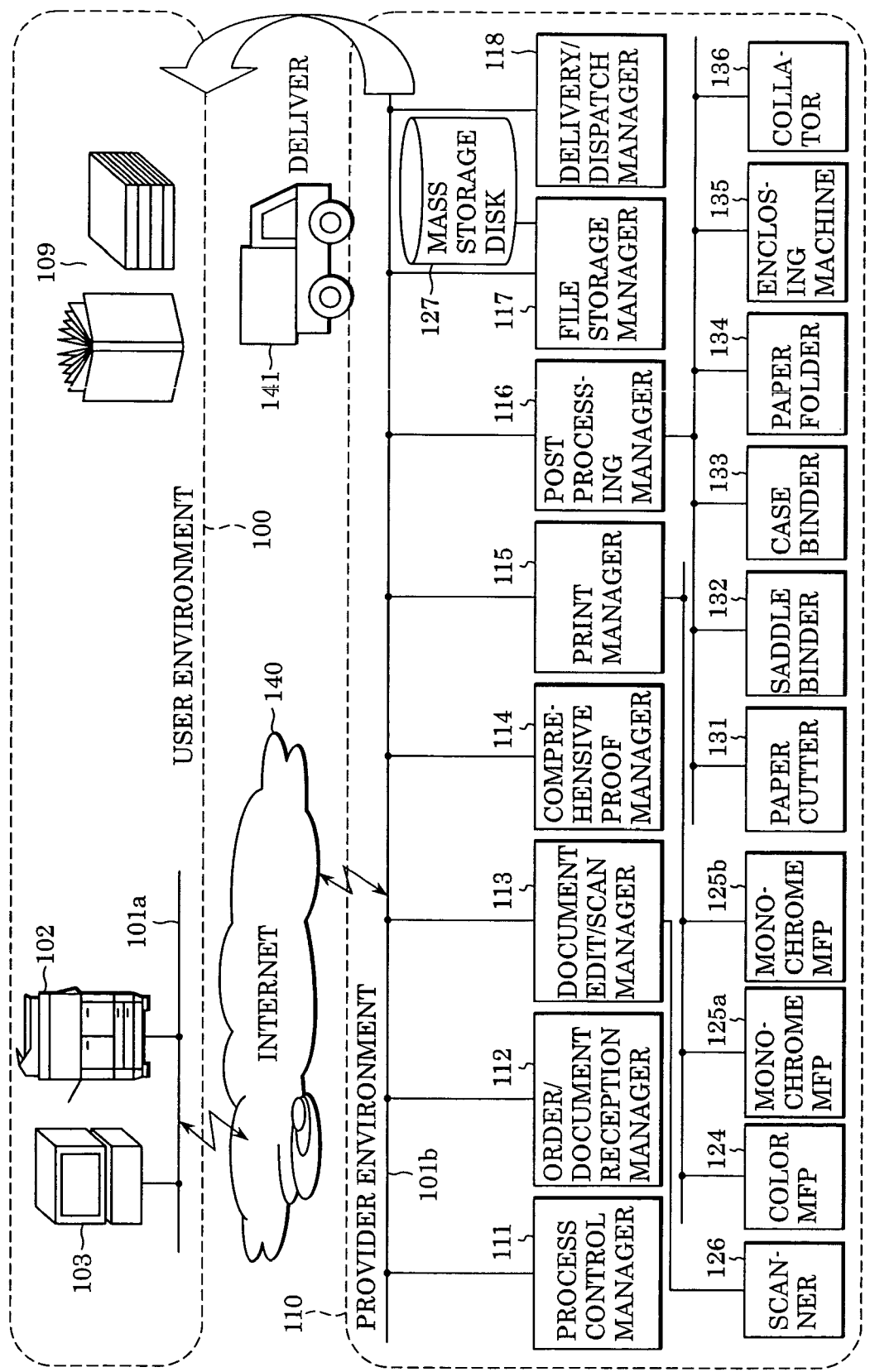
FIG. 1 is a block diagram showing an image processing system according to an embodiment of the present invention.

FIG. 1 is a block diagram showing an image processing system (also referred to as an image forming system) according to a first embodiment of the present invention.

In the present embodiment, as shown in FIG. 1, the image processing system includes a user environment 100 and a provider environment 110. In each environment, components are connected to one another via a network 101 (101a in the user environment 100 and 101b in the provider environment 110) and the user environment 100 and the provider environment 110 are connected to each other via the Internet 140 so as to form the image forming system. Note that the number of networks in each environment is not limited to one, but each environment may have one or more networks.

In the example shown in FIG. 1, the user environment 100 includes at least one multi function peripheral (MFP) 102 used as an image processing apparatus (image forming apparatus) connected to the network 101a. The user environment 100 may also include a client computer 103 connected to the network 101a. On the client computer 103, various programs are executed under the controls of an operating system (OS). The client computer 103 has a printer driver, installed on a hard disk (not shown), for issuing a print job to the MFP 102, and the client computer 103 is capable of communicating with the MFP 102 by using a particular protocol.

As shown in FIG. 1, a user in the user environment 100 can place an order with the provider environment 110 to process a job by using the MFP 102 or the client computer 103. As a matter of course, the client computer 103 is capable of issuing a job to the MFP 102.

The provider environment 110 includes a plurality of process managers that are controlled by a process control manager 111. The process control manager 111 controls not only computers and devices in the provider environment but also jobs transferred from one process manager to another.

An order/document reception manager 112 receives a job via the Internet 140. A document edit/scan manager 113 scans a document using a scanner 126 and/or edits image data obtained via scanning or electronic data directly received via the order/document reception manager 112 so as to achieve a particular layout or a page order requested by a user.

A comprehensive proof manager 114 is connected to the Internet 140 for communication and provides a preview image or a sample output of the edited job to the user via the Internet. The user checks the preview image to determine whether the job has been correctly edited. That is, the comprehensive proof manager 114 provides a comprehensive proof of the job to the user.

A print manager 115 rasterizes a job subjected to a preprint process (such as editing, scanning, and/or comprehensive proof) and supplies resultant rasterized data to the MFP, which performs printing in accordance with the supplied data. The print manager 115 is connected to a plurality of MFPs such as a color MFP 124 and monochrome MFPs 125 (125a and 125b). The printer manager 115 selects a suitable MFP depending on the delivery time and/or quality required for a job.

A post processing manager 116 performs a post process (finishing process) (such as sheet cutting, saddle binding, case binding, folding, enclosing, and/or collating) in a manner specified by a user by controlling a sheet cutter 131, a saddle binder 132 a case binder 133, a paper folder 134, an enclosing machine 135, and/or a collator 136.

A file storage manager 117 serves as a file server for storing a job received from a user in a mass storage disk 127 for future use such as reprinting.

A delivery/dispatch manager 118 is connected to the Internet 140 for communication, and the delivery/dispatch manager 118 servers to prompt an operator to deliver a completed job and also serves to manage invoices and delivery history.

The respective managers 111 to 118 described above may be implemented on different information processing apparatuses (computers) or two or more or all of the managers 111 to 118 may be implemented on a single information processing apparatus (computer).

That is, each manager is implemented on a computer including a central processing unit (CPU), a read-only memory (ROM), a random-access memory (RAM), and a hard disk drive (HDD) by installing a program on the ROM or the HDD and executing the program by the CPU.

The completed job 109 is dispatched from the delivery/dispatch manager 118 and delivered to the user environment 100 by using a transport vehicle 141 such as a truck.

Figure 2:
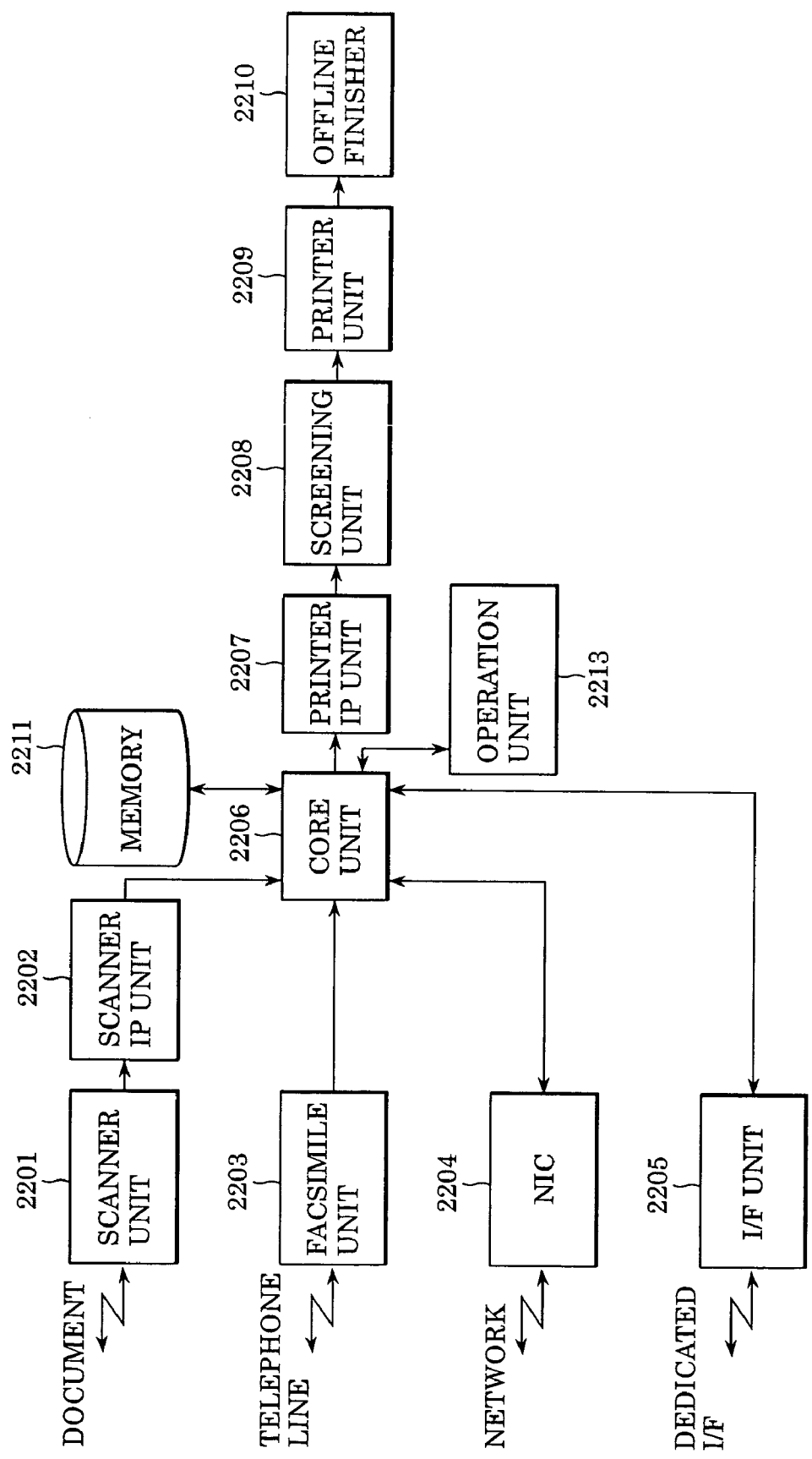
FIG. 2 is a block diagram showing the structure of an MFP shown in FIG. 1.

FIG. 2 is a block diagram showing a structure of a multi function peripheral (MFP) such as MFPs 102, 124, and 125 shown in FIG. 1.

As shown in FIG. 2, each MFP 102, 124, or 125 includes a scanner unit 2201 for reading an image, a scanner IP unit 2202 for performing image processing on image data output from the scanner unit 2201, a facsimile unit 2203 for transmitting/receiving an image via a telephone line, a network interface card (NIC) 2204 for transmitting/receiving image data or other information via a network, and a dedicated interface unit 2205 for communicating with the full color MFP 124. Depending on the manner in which the MFP 102, 124, or 125 is used, a core unit 2206 temporarily stores an image signal in a memory 2211 and determines a processing path.

Image data output from the core unit 2206 is sent via a printer IP unit 2207 and a screening unit 2208 to a printer unit 2209 for forming an image. Sheets on which an image is printed by the printer unit 2209 are sent to an online finisher 2210 to perform sorting and finishing.

The core unit 2206 includes a CPU (not shown) and controls transmission of various data over buses. More specifically, the core unit 2206 switches transmission path via busses as described below depending on the manner in which the MFP is used. In many cases, when data is transmitted via a network, the data is compressed, for example, in JPEG (Joint Photographic Experts Group), JBIG (Joint Bi-Level Image Experts Group), or ZIP (compressed file) format. When the MFP receives compressed data, the core unit 2206 decompresses the data.

In a copy operation, the core unit 2206 controls transmission of data such that data is transmitted via a path (A) scanner unit 2201→core unit 2206→printer unit 2209. In a network scanner operation, data is transmitted via a path (B) scanner unit 2201→core unit 2206→NIC 2204. In a network printer operation, data is transmitted via a path (C) NIC 2204→core unit 2206→printer unit 2209. In a facsimile transmission operation, data is transmitted via a path (D) scanner unit 2201→core unit 2206→facsimile unit 2203. In a facsimile reception operation, data is transmitted via a path (E) facsimile unit 2203→core unit 2206→printer unit 2209. In a box reception operation, data is transmitted via a path (F) NIC 2204→core unit 2206→memory 2211 or via a path (G) scanner unit 2201→core unit 2206→memory 2211. In a box transmission operation, data is transmitted via a path (H) memory 2211→core unit 2206→NIC 2204 or via a path (I) memory 2211→core unit 2206→printer unit 2209.

As described above, the core unit 2206 serves as a controller that controls all of the units (the scanner unit, the memory, the printer unit, the operation unit, and the external communication unit) of the image processing apparatus so as to properly perform operations such as inputting/outputting of job data or image data, transmitting/receiving of information indicating capabilities of an external apparatus (such as a provider), and displaying information on a screen.

The box reception/transmission refers to inputting/outputting of data using the memory 2211. In the box reception/transmission, the memory space is divided into areas assigned to respective users or jobs and data is temporarily stored in an assigned memory area. The data stored in the memory area can be accessed by a particular authorized user.

For example, when a user selects a box reception/transmission mode via the operation unit, job data from a scanner or an external apparatus (computer) is stored in a corresponding box area on a hard disk of the image processing apparatus. Thereafter, if the user issues a command via the operation unit, the job data is read from the box area and printed by the printer unit or transmitted to the external apparatus.

The printer IP unit 2207 includes an output masking/UCR unit for converting a signal into Y, M, C, and K (yellow, magenta, cyan, and black) signals corresponding to toner colors of the image forming apparatus by means of a matrix operation, a gamma correction unit for converting image data into C, M, Y, and K (cyan, magenta, yellow, and black) data according to which to print an image by using a lookup table (LUT) RAM taking into account color tones of toner, and a space filter for performing sharpening or smoothing.

The screening unit 2208 performs processing associated with error diffusing, dithering, and/or pulse with modulation (PWM).

In this embodiment, as described above, the image processing apparatus has a plurality of modes (also referred to as functions) including the copy mode, the print mode, the facsimile mode, and the box mode and is capable of performing various kinds of input/output processes. For example, the image processing apparatus is capable of inputting job data obtained by reading a document using the scanner unit 2201 of the image processing apparatus, job data output from a client computer, job data output from a scanner of another digital multi function peripheral, or job data output from a facsimile machine. The input job data is temporarily stored in the memory 2211 (a storage unit such as a hard disk) of the image processing apparatus and output in various manners as required. For example, the job data is printed using the printer unit 2209 of the image processing apparatus or transferred to another apparatus (an image processing apparatus, a provider computer, or a client computer) via a communication device such as the facsimile unit 2203, the NIC (network interface card) 2204 or the interface 2205. Although in the present embodiment, the image processing apparatus has the plurality of functions, the present invention does not necessarily require that the image processing apparatus have a plurality of functions. On the contrary, the image processing apparatus may have only one function (for example, the printing function) of the plurality of functions described above.

Although in the present embodiment, a network is used as a communication medium, other types of communication media may be used.

The MFP 102 also has an operation unit 2213. In the MFP 102 shown in FIG. 1, as described in further detail later, the core unit 2206 acquires, periodically or as required, information indicating resources available in the provider environment 110, such as a high-performance MFP, a binder, a sheet cutter, a folder, a collator, and an inserter, and displays available resources on a display screen such that either resources available in the present image processing apparatus in the user environment or resources available in the provider environment are selectively (switchably) displayed or all resources available in the user environment or the provider environment are displayed at the same time which allows a user to specify processing conditions for a job to be performed using a device in the provider environment in a similar manner to the manner of operating the MFP 102 in the user environment.

As will be described in further detail later, the operation control screen has a key for use to issue an order command to request a provider to perform processing on image data stored in the memory 2212, such as image processing, image editing, or sheet post processing. By operating the key, a user in the user environment 100 can receive services using resources in the provider environment 110.

The core unit 2206 determines which display elements (a guidance message field, a warning message field, a status field, and operation control keys such as touch panel keys including an order key) should be displayed on the display of the operation unit 2213 at which timing in which way, and the core unit 2206 controls the operation unit 2213 so as to provide a user interface in accordance with the determination.

The order command does not necessarily need to be issued via the above-described operation control screen displayed on the MFP 102 but may be issued via a Web browser on the client computer 103 in the user environment 100.

Not only image data stored in the memory 2211 but other image data such as that stored in a particular storage area (folder) of the hard disk of the client computer 103 may also be processed by using image processing resources in the provider environment 110 by issuing an order command.

Internet Environment

Figure 3:
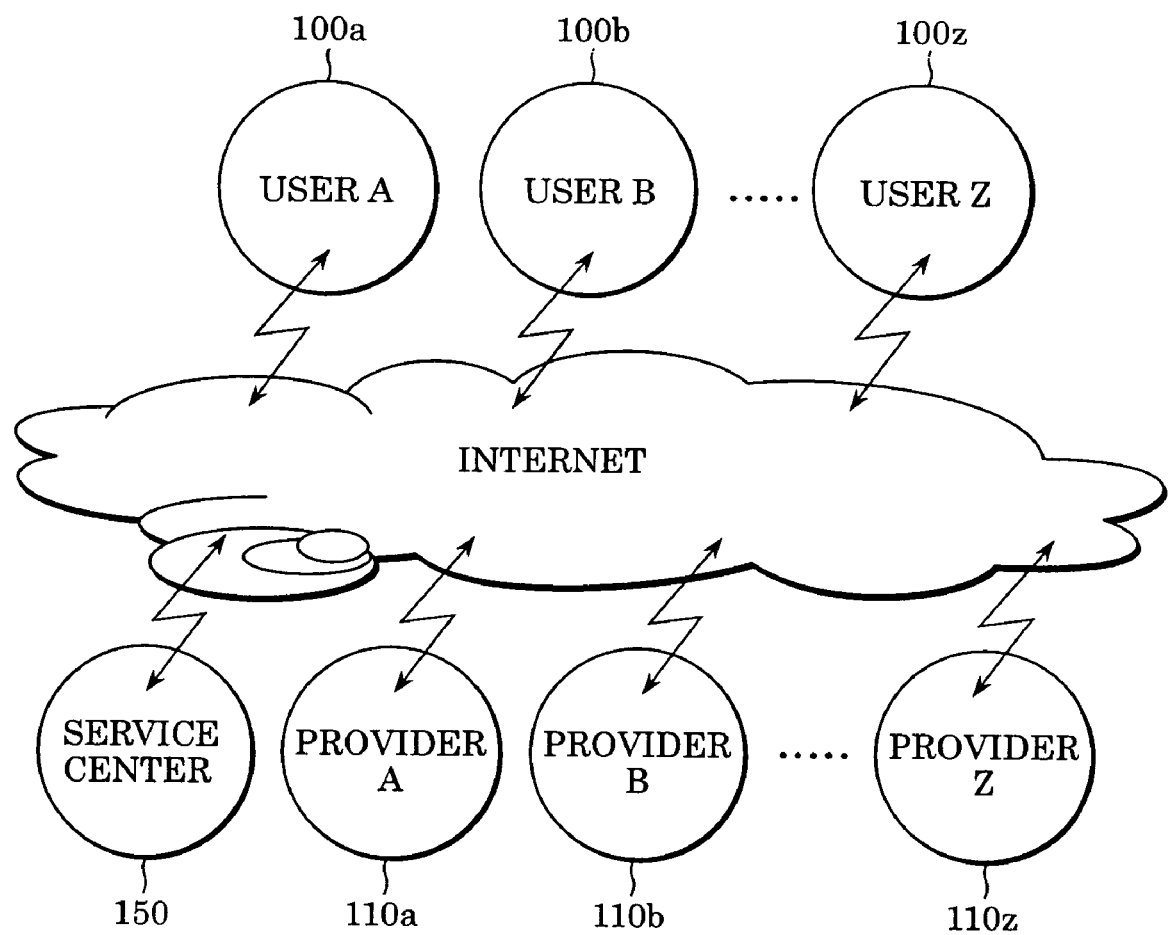
FIG. 3 is a diagram showing an example of a network environment used by an image processing system according to the present invention.

FIG. 3 is a diagram showing an example of a network environment used by an image processing system according to the present invention. In this example, many similar user environments 100 and many similar provider environments 110 such as those shown in FIG. 1 are connected to the Internet environment such that when a request is issued from some of users A, B . . . Z, the request is handled by a most suitable one of providers A, B . . . Z.

When some user issues a request, the user may inquire about service provided by each provider. However, this needs complicated data processing. Thus, preferably, a service center 150 provides service information to the user depending on access information associated with the user.

For example, when the user A has a contract with the providers A and B but not with the provider C, the service center 150 does not disclose information about the provider C. If the provider B best matches the request issued by the user B, the service center 150 provides only information about the provider B to the user B. Alternatively, capabilities of respective providers A, B . . . Z may be registered in advance and the service center may disclose information requested by a user.

Placing of Order for Copying

Specific examples of the order operation are described below.

Figure 4:
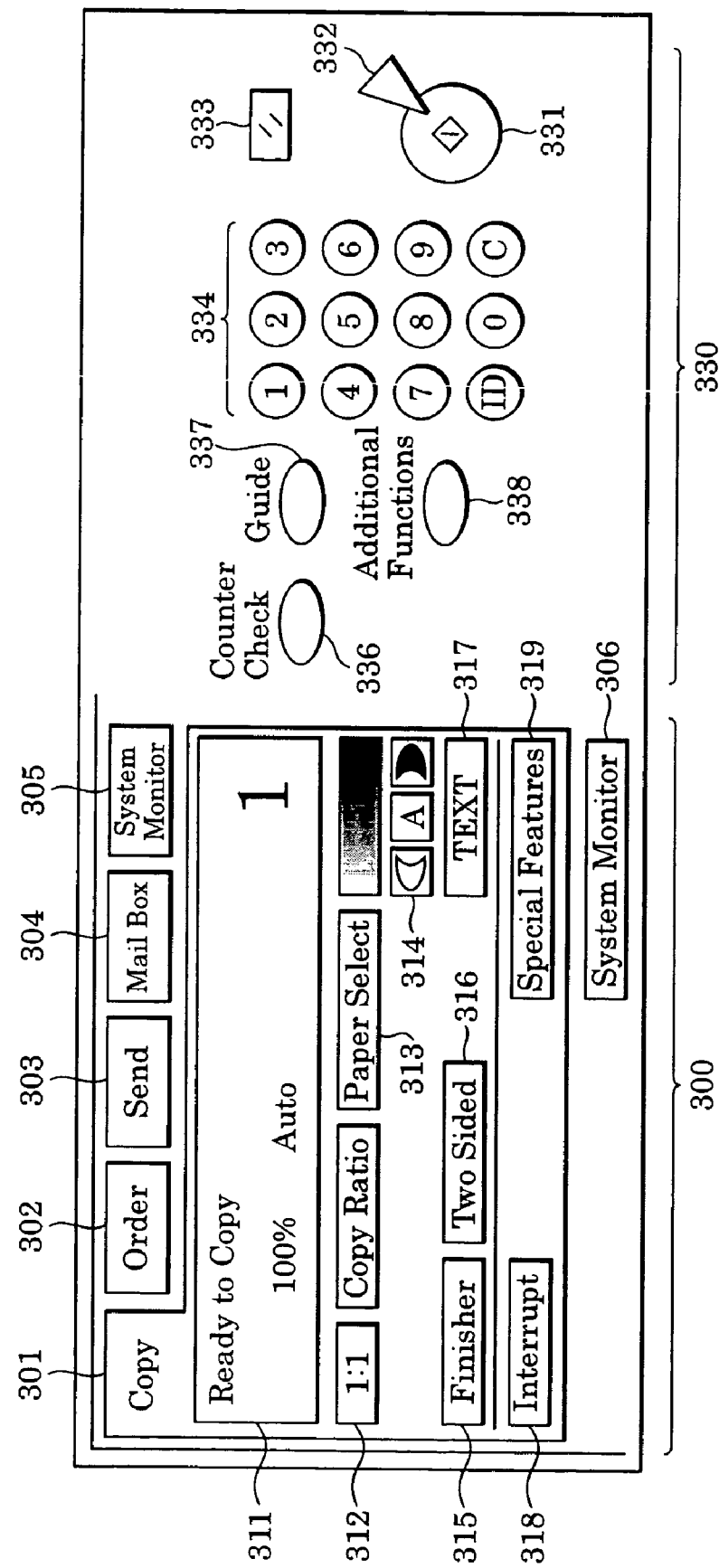
FIG. 4 is a plan view showing an example of an operation unit of the MFP shown in FIG. 1.
Figure 5:
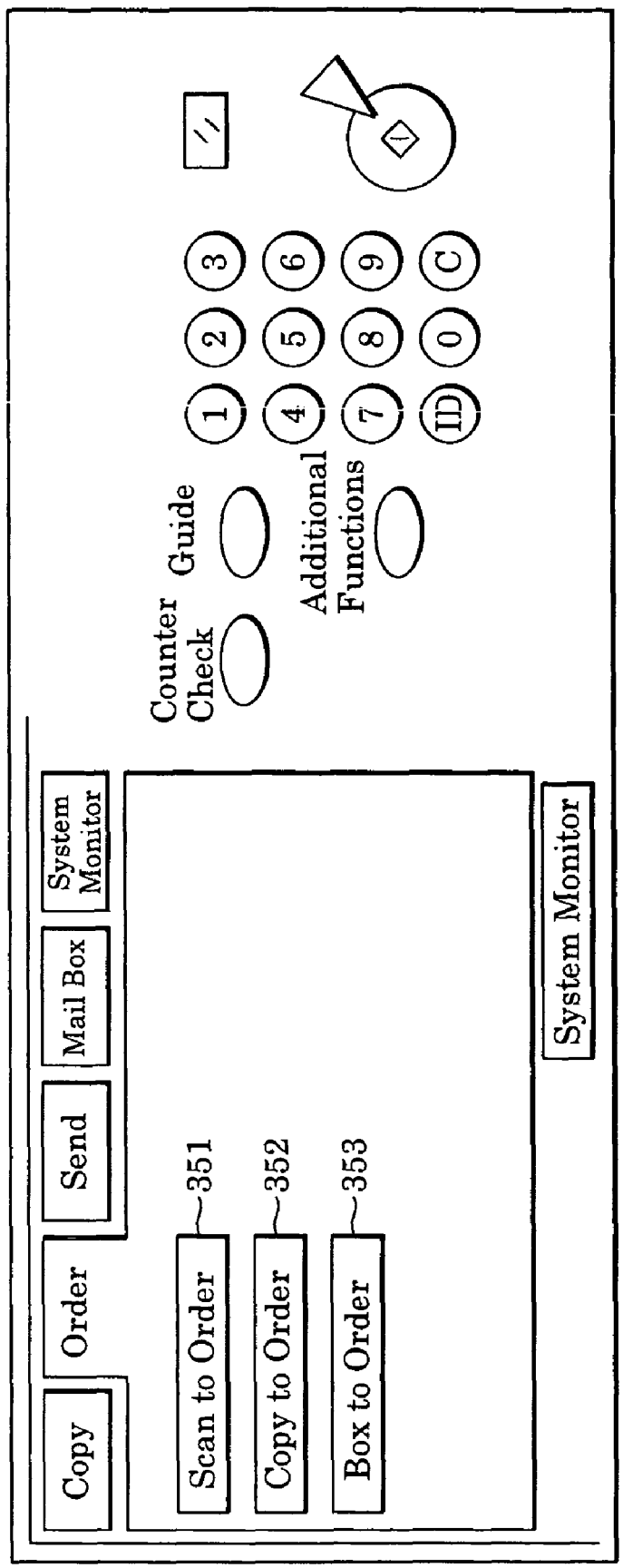
FIG. 5 is a plan view showing an example of an operation unit of the MFP shown in FIG. 1.

FIGS. 4 and 5 are diagrams showing examples of manners in which information is displayed on the operation unit of the MFP 102 shown in FIG. 1. FIG. 4 shows a manner in which information is displayed on the operation unit when a copying operation is performed. FIG. 5 shows a manner in which information is displayed on the operation unit when an order is placed with a provider via the Internet 140. As described above, the core unit 2206 controls the operation unit 2213 such that many types of operation control screens can be displayed on the display 300 of the operation unit 2213.

In FIG. 4, an LCD display 300 has a touch panel screen on which user-operable keys are displayed depending on the operation mode/status. If a user presses a touch panel key, a command is issued depending on the pressed touch panel key, and the core unit 2206 performs processing in accordance with the command. For example, the screen may be switched to another screen or a parameter (numerical data or a parameter indicating a processing condition such as two-sided printing, stapling, binding, editing, or zooming) may be set in accordance with the issued command.

The operation control screen also has a capability of displaying various kinds of information including information indicating, for confirmation, operation conditions or parameters specified by a user, information indicating the status of expendable supplies such as toner and print paper, error information, information indicating the current status of the printing operation, and guidance information indicating what a user should do.

The operation control screen display, under the control of the core unit 2206, on the LCD display 300 has tabs for switching items displayed on the operation control screen. The tabs include a Copy tab 301 for displaying items associated with a copy operation, an Order tab 302 for displaying items associated with an order operation, a Send tab 303 for displaying items associated with transmission of scanned data, a Mail Box tab 304 for displaying items associated with an operation of temporarily storing data in the MFP, and a System Monitor tab 305 for displaying items associated with the status of the MFP 102.

If a user presses the Copy tab 301 on the operation control screen, the core unit 2206 selects the copy mode. When the Order tab 303 is pressed, the order mode is selected. If the Send tab 303 is pressed, the transmission mode is selected. If the Mail Box tab 304 is pressed, the box mode is selected.

The operation control screen displayed on the LCD display 300 includes various display elements for setting operation conditions, such as a currently set condition display area 311, and soft keys including a copy ratio setting key 312, a paper size setting key 313, a density setting key 314, a post process setting key 315, a two-sided printing setting key 316, an image mode setting key 317, an interrupt setting key 318, and an other (special features) function setting key 319. For some items, detailed information is displayed in a hierarchical manner.

The operation unit 2213 also includes a set of hard keys 330. The hark key set 330 includes a start key 331, a stop key 332, a reset key 333, a ten-key pad 334 (including a clear key) for inputting a numeric value in setting of an operation condition, a counter check key 336 for storing the number of output sheets, a help key 337 for calling up guidance or help information, and a user mode key 338 for setting system conditions specific to a user.

The soft keys displayed on the operation control screen of the display 300 and the keys of the hard key set 330 on the operation unit 2213 are respectively coupled with touch sensors such that when a user presses any key, pressing is detected by a corresponding sensor. When a key is pressed, a corresponding touch sensor outputs detection information to the core unit 2206. Thus, the core unit 2206 gets information indicating which key has been pressed by the user. In response, the core unit 2206 performs a control operation depending on which key was pressed. For example, when a touch panel key is pressed, the core unit 2206 changes the touch panel key into a highlighted state to indicate that the key is selected or switches the current operation control screen to another operation control screen. In a case in which a key of the ten-key pad is pressed, the core unit 2206 displays a numeric value corresponding to the pressed key on the display.

When the Order tab 302 is pressed, an operation control screen for use to place an order appears. This operation control screen includes a Scan to Order key 351, a Copy to Order key 352, and a Box to Order key 353.

More specifically, if the Order tab 302 on the operation control screen shown in FIG. 4 is pressed by a user, the core unit 2206 displays the operation control screen including the order keys (351 to 353) on the LCD display 300.

Figure 6:
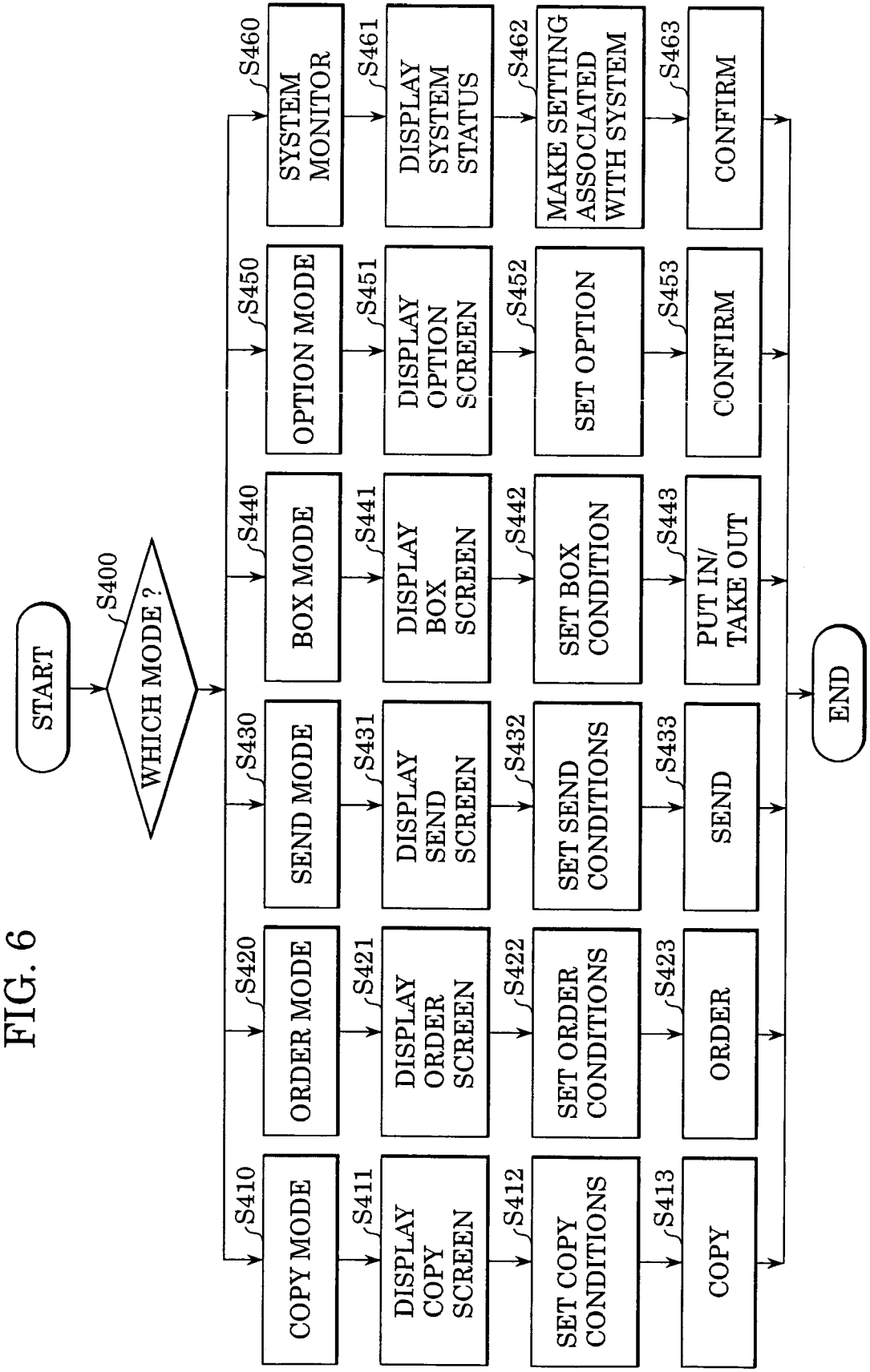
FIG. 6 is a flow chart showing a process of switching, depending on an operation mode, contents displayed on a display screen of an operation unit of an invention.

FIG. 6 is a flow chart showing a process of switching the items displayed on the operation control screen depending on which operation mode is selected via the operation unit of the image processing apparatus according to the present invention. When one of the tabs shown in FIG. 4 is pressed, an operation mode (the copy mode S410, the order mode S420, a transmission mode S430, a box mode S440, an option mode S450, or a system monitor mode S460) corresponding to the pressed tab is selected. Displaying of an operation control screen and setting of operation conditions are performed depending on the selected mode, and an operation is performed in the selected mode in accordance with the specified operation conditions. Note that these operations are performed under the control of the core unit 2206 having the CPU (not shown).

If it is determined in step S400 that the copy mode is selected by a user by pressing the copy tab 301 on the operation unit, the core unit 2206 proceeds the process to step S410 to change the operation mode to the copy mode. In step S411, the core unit 2206 displays the operation control screen for the copy mode on the LCD display 300 of the operation unit. In step S412, the core unit 2206 accepts setting of operation conditions in the copy mode specified by the user. That is, if a user presses the start key 331 after copy conditions (the number of copied, two-side/one-sided printing, editing, post processing such as stapling, and/or the copy ratio) are set via the operation control screen for the copy mode, then, in response, in step S413, the core unit 2206 controls the scanner unit and the printer unit of the MFP 102 so as to perform the copy operation in accordance with the specified copy conditions. When the copy operation is completed, the entire process is completed.

If it is determined in step S400 that the order mode is selected by a user by pressing the order tab 302 on the operation unit, the core unit 2206 advances the process to step S420 to change the operation mode to the order mode. In step S421, the core unit 2206 displays the operation control screen for the order mode (FIG. 5) on the LCD display 300 of the operation unit. In step S422, the core unit 2206 accepts setting of operation conditions in the order mode specified by the user. If a user presses the start key 331 after order conditions are set via the operation control screen for the order mode, then, in response, in step S423, the core unit 2206 performs the order operation via the communication control unit and the Internet 140 in accordance with the specified order conditions. When the order operation is completed, the entire process is completed.

In a case in which it is determined in step S400 that the transmission mode is selected by a user by pressing the send tab 303 on the operation unit, the core unit 2206 proceeds the process to step S430 to change the operation mode to the transmission mode. In step S431, the core unit 2206 displays the operation control screen for the transmission mode on the LCD display 300 of the operation unit. In step S432, the core unit 2206 accepts setting of operation conditions in the transmission mode specified by the user. If the user presses the start key 331 after transmission conditions (parameters associated with document size, resolution, transmission form, and transmission method) are set via the operation control screen for the transmission mode, then, in response, in step S433, the core unit 2206 performs the transmission operation via the communication control unit and the Internet 140 in accordance with the specified operation conditions. When the transmission is completed, the entire process is completed.

In a case in which it is determined in step S400 that the box mode is selected by a user by pressing the box tab 304 on the operation unit, the core unit 2206 proceeds the process to step S440 to change the operation mode to the box mode. In step S441, the core unit 2206 displays the operation control screen for the box mode on the LCD display 300 of the operation unit. In step S442, the core unit 2206 accepts setting of operation conditions in the box mode specified by the user. If the user presses the start key 331 after box operation conditions (document size, resolution, and box in which to store data) are set via the operation control screen for the box mode, then, in response, in step S443, the core unit 2206 stores data into or reads data from a nonvolatile storage device such as a hard disk disposed in the MFP 102 in accordance with the specified box operation conditions. When the operation is completed, the entire process is completed.

In a case in which it is determined in step S400 that the option mode is selected by a user by pressing the option tab 305 on the operation unit, the core unit 2206 proceeds the process to step S450 to change the operation mode to the option mode. In step S451, the core unit 2206 displays the operation control screen for the option mode on the LCD display 300 of the operation unit. In step S452, the core unit 2206 accepts setting associated with the optional operation specified by the user. In step S453, checking is performed as to whether setting has been correctly performed. If step S453 is completed, the process is ended.

In a case in which it is determined in step S400 that the system monitor mode is selected by a user by pressing the system monitor tab 306 on the operation unit, the core unit 2206 proceeds the process to step S460 to change the operation mode to the system monitor mode. In step S461, the core unit 2206 displays the operation control screen for indicating the system status on the LCD display 300 of the operation unit. In step S462, the core unit 2206 accepts setting associated with the system specified by the user. In step S463, checking is performed as to whether the system setting has been correctly performed. After step S463 is completed, the process is ended.

As described above, when the user selects the order mode by pressing the order tab 302 on the operation unit, the core unit 2206 switches the screen displayed on the display 300 from the copy setting screen (FIG. 4) to the order setting screen (FIG. 5) to allow the user to make setting associated with an order.

In the order mode, the core unit 2206 displays the order setting screen on the display 300 as shown in FIG. 7 and transmits an order command to an external provider in accordance with the settings selected by the user. The details of the ordering process will be described later with reference to FIG. 8.

Figure 7A:
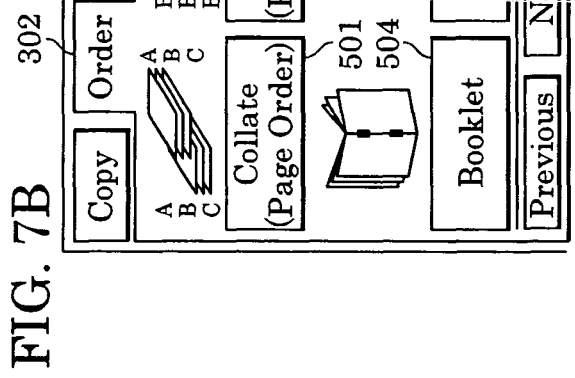
FIGS. 7A to 7D are diagrams showing examples of order setting screens displayed on an operation unit of an MFP shown in FIG. 1.
Figure 7B:
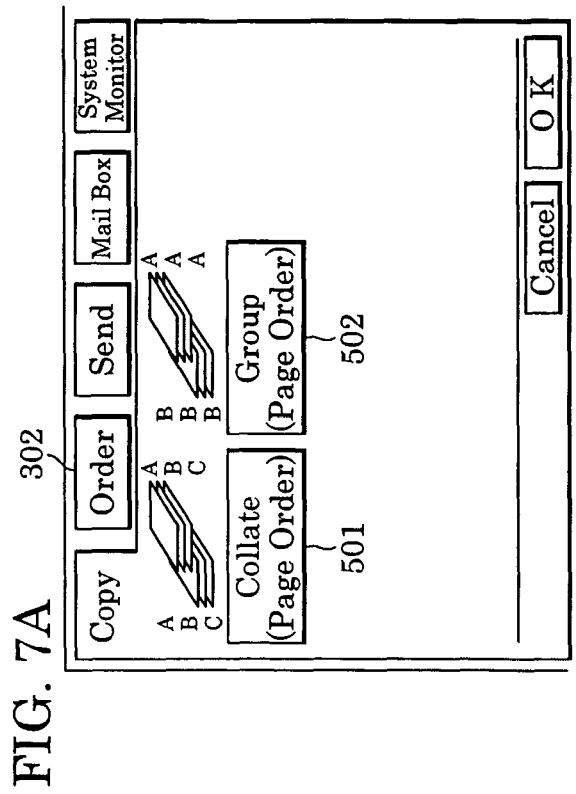
Figure 7C:
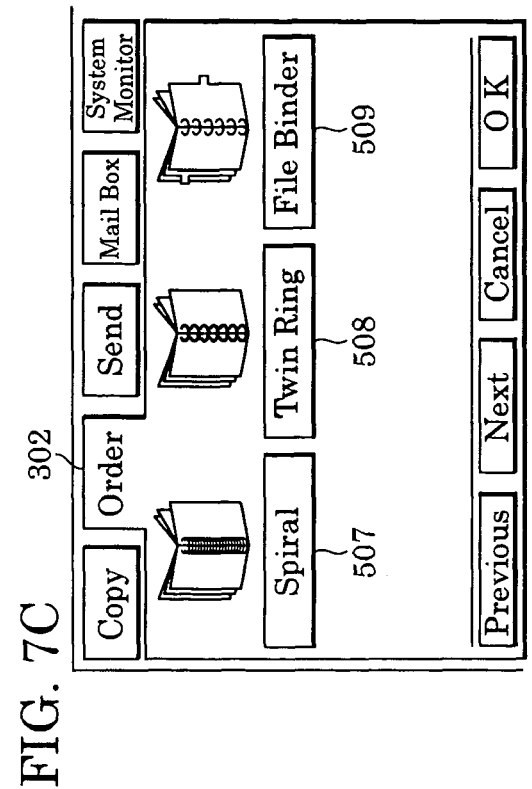
Figure 7D:
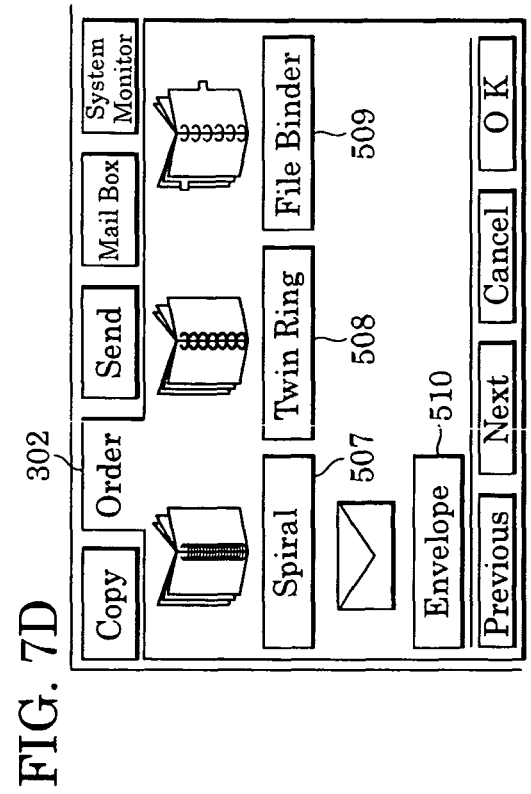

FIGS. 7A to 7D show specific examples of order setting screens displayed, in various situations, on the display 300 of the operation unit of the MFP 102 shown in FIG. 1. More specifically, FIG. 7A shows the operation control screen in the copy mode. FIG. 7B shows an order setting screen that is displayed on the display 300 when a user selects the order mode by pressing the order tab 302 on the operation control screen (FIG. 7A) displayed on the display 300 in the copy mode. FIGS. 7C and 7D show examples of option setting screens for specifying details of an order.

The present embodiment is described in further detail below with reference to FIG. 7. In the present embodiment, functions that are executable using only resources of the image processing apparatus (MFP 102) in the user environment are referred to as first-type functions, and functions that are executable using resources in external apparatuses (providers) with which the image processing apparatus in the user environment is capable of communicating are referred to as second-type functions. In the present embodiment, a user of the image processing apparatus in the user environment can select any function regardless of whether the function is of the first type or the second type, by using the order tab 302. The user can select a function and set details of the function via the operation unit 2213 of the image forming apparatus.

The examples of operation control screens shown in FIG. 7A to 7D are displayed on the display 300 of the image processing apparatus under the control of the core unit 2206, depending on the situation, to allow a user to set conditions of sheet processing (also referred to as post processing) such as stapling or binding.

For example, the operation control screen shown in FIG. 7A is displayed on the display 300 in a state in which the order tab 302 on the operation unit 2113 is not pressed by a user and thus the order mode is not selected. This operation control screen provides the user interface having function buttons for use in a case in which processing is performed by the image processing apparatus without issuing a request for processing to a provider.

In this specific example, the image processing apparatus is capable of performing, as post processing, collating (sorting of printed sheets in order of pages for each set of copies, such as "1, 2, 3 ... N", "1, 2, 3 ... N", "1, 2, 3 ... N", and so on) and grouping (sorting of printed sheets into group each having the same page such that "1, 1, 1 ... ", "2, 2, 2 ... ", "3, 3, 3 ... " ..., "N, N, N ... "). A user can select one of these two post processes (first-type functions) by pressing a key 501 or 502 on the operation control screen shown in FIG. 7A. If either one of these post processes is selected by the user, the core unit 2206 controls the image processing apparatus to perform the selected post process corresponding to the pressed key by using a post process unit of the image processing apparatus.

The operation control screens shown in FIGS. 7B to 7D are displayed on the display 300 when the order mode is selected by a user by pressing the order tab 302 on the operation unit 2113. These operation control screens provide user interfaces having function buttons used by a user to select an operation to be performed by an external apparatus (printing system) of a provider.

In the example shown in FIG. 7B, in addition to collating and grouping that are post processes executable by the image processing apparatus in the user environment, post processes including stapling and binding that are not executable by the image processing apparatus in the user environment but executable by external providers are selectable via the operation control screen. That is, a user is allowed to select a post process from a total of six choices (second-type functions) by pressing one of keys 501 to 506 on the operation control screen shown in FIG. 7B. When the user selects one of these post processes, the core unit 2206 communicates with a corresponding provider via the communication unit to request the provider to perform the post process corresponding to the pressed key.

Similarly, in the example shown in FIG. 7C, by pressing one of keys 507 to 509 on the screen, a user can select one of three post process (second-type functions) that are executable by using post processing units of external providers with which the image forming apparatus is capable of communicating. In the example shown in FIG. 7D, by pressing one of keys 507 to 510 on the screen, a user can select one of four post processes (second-type functions) that are executable by using post processing units of external providers.

In the present embodiment, a processing sequence is performed in a mode selected by a user via the operation unit 2213. The selectable modes include a mode in which processes requested by a user are all performed by the image processing apparatus, a mode in which processes requested by a user are all performed by an external provider apparatus the image processing apparatus is capable of communicating with, and a mode in which some of processes requested by a user are performed by the image processing apparatus and the other processes are performed by an external provider.

The type of the processing sequence may be explicitly selected by a user via the operation unit 2213 or may be automatically selected by the core unit 2206 based on the information indicating processing conditions specified by the user via the operation unit 2213.

In the displaying of operation control screens such as those shown in FIG. 7 under the control of the core unit 2206, each operation control screen may include only command keys associated with the same-type functions. For example, one operation control screen may include only command keys associated with functions executable by the image processing apparatus in the user environment, and another operation control screen may include only command keys associated with functions executable by providers. Alternatively, one operation control screen displayed on the display 300 may include command keys associated with both types of functions that are logical OR of functions available in the image processing apparatus in the user environment and functions available in the provider environment.

One way of displaying operation control screens is to switch the operation control screen, starting from the operation control screen that appears in response to pressing the order tab 302, in a hierarchical manner to allow a user to specify more detailed conditions. Another way is to first select the copy mode by clicking the copy tab 301 and make settings associated with the copying operation. At a stage at which settings associated with the post process are made (in a state in which the screen shown in FIG. 7A is displayed on the display 300), if the user wants to make a selection from more options than are displayed on the current screen, the user can switch the screen from that corresponding to the mode in which all processes are performed by the image processing apparatus to the screen corresponding to the mode in which external provider apparatus are also usable.

In the latter case, for example, when the operation control screen shown in FIG. 7A for selecting a post process executable by the image processing apparatus in the user environment is displayed on the display 300, if a user presses the order tab 302 on the operation control screen, the core unit 2206 switches the operation mode into the order mode and displays the operation control screen shown in FIG. 7B on the display 300 to allow the user to select one of post processes executable by external provider apparatuses with which the image processing apparatus in the user environment is capable of communicating. As described above, the operation control screen displayed on the display 300 can be switched to one of those shown in FIG. 7B to 7D either from the state in which the order mode is initially selected or from the state in which a mode other than the order mode, for example, the copy mode, is initially selected. This flexibility in terms of switchability to the operation control screens shown in FIG. 7B to 7D provides convenience to users.

In the image processing apparatus according to the present embodiment, as described above, the core unit 2206 switches the operation control screen displayed on the display 300 in response to pressing the order key 302 between the screen that allows a user to select one of functions available in the image processing apparatus in the user environment and the screen that allows the user to select one of functions available in external apparatuses with which the image processing apparatus in the user environment is capable of communicating. This capability of performing a process requested by a user by using the image processing apparatus in the user environment or the external provider apparatuses with which the image processing apparatus is capable of communicating makes it possible to handle a wide variety of requests issued by the user. As described above, the image processing apparatus according to the present embodiment has the user interface that is very convenient and easy to use.

Figure 8:
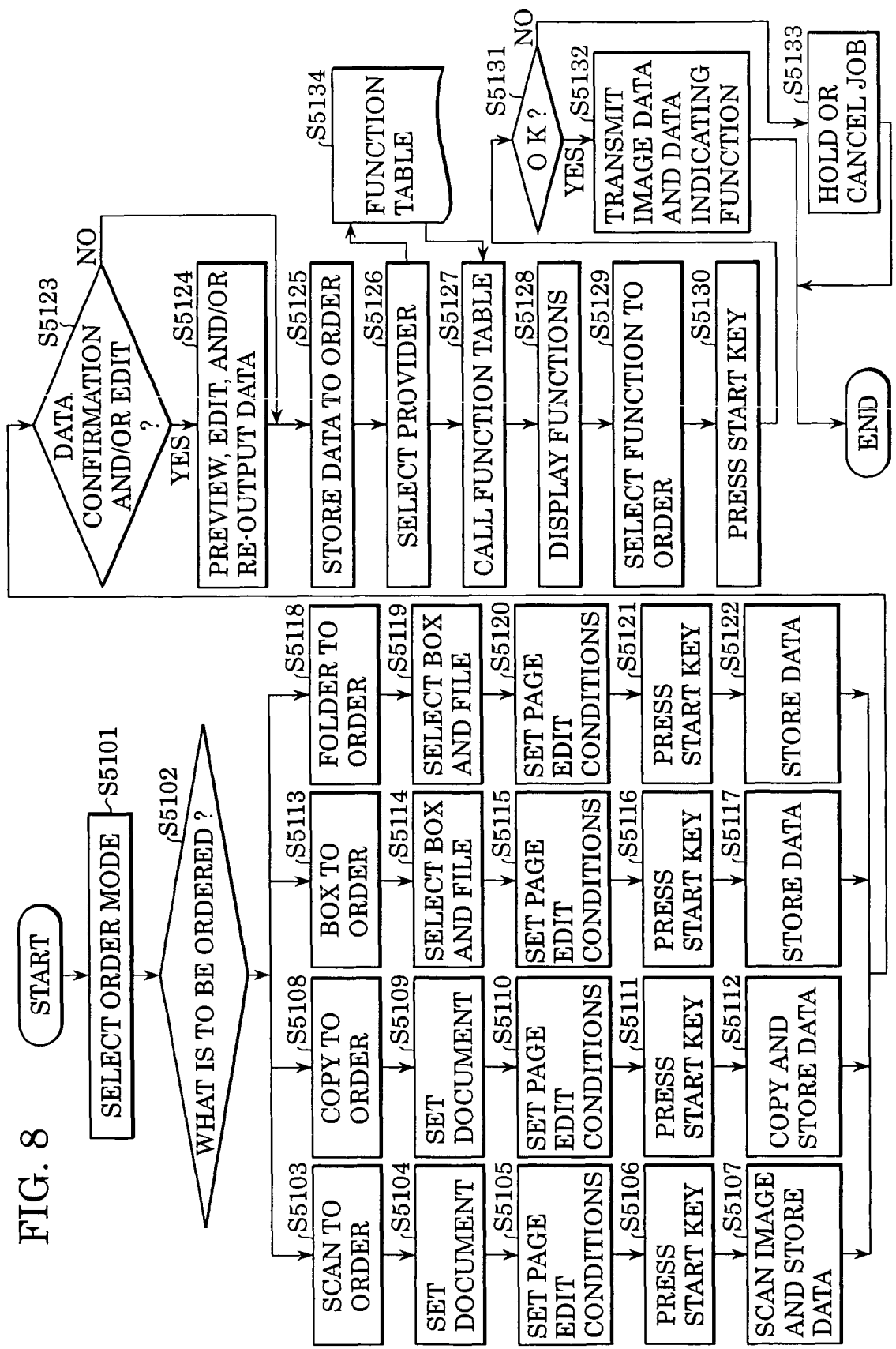
FIG. 8 is a flow chart showing an example of an ordering process performed by an image processing apparatus according to the present invention.

FIG. 8 is a flow chart showing an example of an ordering process performed by the image processing apparatus (MFP 102) according to the present invention. This ordering process is performed when the order mode is selected in the flow shown in FIG. 6. In FIG. 8, S501 to S533 denote step numbers. As in the previous example, this sequence is also performed under the control of the core unit 2206 including the CPU (not shown).

If a use selects the order mode by issuing an order tab command (by pressing the order tab 302) via the operation unit of the MFP 102 (step S5101), the core unit 2206 determines the process requested by the user in the order mode. In step S5102, it is determined what type of ordering was requested by the user. Processing proceeds based in the type of processing requested by the user. If it is determined (in step S5102) that scanning was requested by the user in the order mode (in the case in which the requested scanning sequence for job data input via the scanner unit 2201 includes a process to be performed by an external provider), the core unit 2206 starts an ordering process associated with the image scanning (step S5103). If it is determined that copying was requested by the user in the order mode (in the case in which the requested copying sequence includes not only inputting of job data using the scanner unit 2201 and printing of the job data using the printer unit 2209 but also a process to be performed by an external provider), the core unit 2206 starts an ordering process while performing the copying operation (step S5108). If it is determined that a box processing was requested by the user in the order mode (in the case in which the requested box sequence includes not only inputting of job data using the scanner unit 2201 for an external device and processing the job data using particular one of boxes virtually formed on the hard disk of the memory 2211 but also a process to be performed by an external provider), the core unit 2206 starts the ordering process associated with the image stored in the box (or the image to be stored in the box) (step S5513). If it is determined that accessing a folder was requested by the user in the order mode (in the case in which when the folder stored in a memory of a device on the network is accessed, it is needed to perform a process using an external provider apparatus) the core unit 2206 starts the ordering process associated with the data stored in the folder on the network (step S5118). Note that the term "folder" is used herein to describe a particular storage area of a particular device such as the client computer 103.

The core unit 2206 determines which process is requested by the user in the order mode, based on the operation performed by the user via the operation unit 2212 (for example, based on which key is pressed in which operation control screen). When the user selects the ordering process associated with image scanning, the user sets documents on an ADF or a document plate (step S5104), and the user sets page editing conditions if necessary (step S5105). The page editing refers to a process of editing image data obtained via the scanning process. An example of page editing is page-layout into a 2-in-1 form (two pages of image data are placed on one sheet). Another example is correction of image data obtained via the scanning process, such as deskewing or despeckling.

After the setting by the user is completed, if the start key 331 is pressed (step S5106), the core unit 2206 controls the scanner unit 2201 to start the scanning operation. Image data obtained via the scanning operation is temporarily stored in the image memory 2211 of the MFP 102 (step S5107).

On the other hand if the ordering process is started when the copying is being performed (step S5108), the operation is performed in a generally similar manner as in the case of the ordering process associated with image scanning. That is, first, documents are set on the ADF or the document plate (step S5109), and page editing conditions are set as required (step S5110). After the setting by the user is completed, if the start key 331 is pressed (step S5111), the core unit 2206 controls the scanner unit 2201 to start the scanning operation. Image data obtained via the scanning operation is temporarily stored in the memory 2211 and printed by the printer unit 2209 (selectively in response to a command issued by the user) (step S5112). The printing of a selected image allows the user to check whether the printing is being performed as desired.

To submit an order for processing of an image stored in a box (S5113), a user inputs, in advance, data in a particular box by using the printer driver, e-mail, facsimile, or a scanner and specifies the data stored in the box (S5114). To store data in the box, the user places documents on the ADF or the document plate and sets page editing conditions if necessary (step S5115). After the setting is completed, if the start key 331 is pressed (step S5116), the core unit 2206 starts scanning of the documents. Image data obtained via the scanning operation is stored in a specified box in the image memory 2211 of the MFP 102 (step S5117).

In the case in which the ordering process associated with data stored in a folder is selected (step S5118), the MFP 102 retrieves a data file stored in the folder on the network, using a protocol such as server message block (SMB) or file transfer protocol (FTP), and selects the retrieved data file stored in the folder (step S5119). Thereafter, the user places documents on the ADF or the document plate and sets page editing conditions if necessary (step S5120). After the setting by the user is completed, if the start key 331 is pressed (step S5121), scanning is started. Image data obtained via the scanning operation is stored in the image memory of the MFP 102 (step S5122).

The core unit 2206 checks the operation conditions specified by the user via the operation unit 2213 to determine whether checking of data and/or editing has been requested by the user (step S5123). If not, the process proceeds to step S5125. However, if in step S5123 it is determined that checking of data and/or editing was requested by the user, the stored data is previewed or printed for confirmation and/or subjected to editing operation (step S5124). After the confirmation and/or the editing are completed, the image data is again stored in the MFP 102 (step S5125).

After the data is stored, the core unit 2206 switches the screens displayed on the display 300 of the operation unit into the provider selection screen (step S5126) and refers to a prepared function table (FTB) (S5134) in step S5127. In accordance with the function table, the core unit 2206 displays available functions on the display 300 of the operation unit (step S5128).

FIG. 9 shows an example of the function table (FTB) stored in the MFP 102 shown in FIG. 1 and managed/updated by the core unit 2206. The table data of the function table is stored in memory 2211 of the MFP 102 such that the core unit 2206 can access the data.

In the function table FTB, as shown in FIG. 9, functions available in the MFP 102 and in respective providers are listed in a form that allows the core unit 2206 to recognize which functions are available in which providers (or the MFP 102). The information indicating which functions are available in which providers (or the MFP 102) may be supplied not only to the core unit 2206 but may also be displayed on the user interface on the display 300 such that the user of the MFP 102 can recognize the availability of functions of the respective providers. For example, the core unit 2206 may selectively display one of the operation control screens shown in FIGS. 7A to 7D on the operation unit of the MFP 102 in response to a command issued by the user of the MFP 102.

The functions available in the MFP 102 are detected via communication with accessories such as a finisher and a paper deck possessed by the MFP 102, and information indicating the available functions is described in the function table.

FIG. 10 shows a process of updating the function table in the image processing system according to the present invention.

As shown in FIG. 10, information indicating functions and/or services available in respective providers 110a to 110c is collected as function information and/or service information SB5171 to SB5173 by a service center 150 and stored in the form of a database in a storage unit 150A. The MFP 102 periodically acquires the information by polling, or the service center 150 transmits the information to the MFP 102 each time the information is updated, making it possible for the MFP 102 to use the latest function table FTB.

In the communication between the MFP 102 and the service center 150 and between the service center 150 and providers 110a to 110c, information to be sent is described in a format, for example, the XML (eXtensible Markup Language) format, using predefined schemata. The information sent includes data indicating the available functions, service data, a name of a new available function, and icon information.

In the communication, the MFP 102 accesses the service center 150 (or directly to a provider) via the network and issues a request for information indicating the available functions that can be displayed on the system monitor in step S460 in FIG. 6.

In response, the service center 150 reads function information collected from the respective provider from the database 150A and supplies the function information to the MFP 102. The MFP 102 displays system status information including the received function information (step S461).

Each provider sends information indicating available functions and/or services to the service center 150 periodically or when a change occurs in available function or service such that latest information is provided to users.

Referring again to FIG. 8, when available functions are displayed on the operation unit of the MFP 102 (step S5128), if the MFP 102 in the user environment 100 of the user does not have a particular finishing function (for example, a stapling function or a binding function) needed in the copying operation although the MFP 102 has capabilities of collating (for example, when 2 sets of copies are printed for a given job including 3 pages, printed pages are sorted in order 1st, 2nd, 3rd, 1st, 2nd, 3rd pages) and grouping (for example, when 2 sets of copies are printed for a given job including 2 pages, printed pages are grouped such that one set includes 3 pages of a 1st page and the other set includes 3 pages of a second page), then the core unit 2206 controls the operation control screen displayed on the display of the operation unit 2213 such that when a user presses the post process setting key 315, only the collate button 501 and the group button 502 are displayed as shown in FIG. 7A.

However, if, on the screen that appears when the order tab 302 is pressed, the user presses a key corresponding to the post process setting key 315, the core unit 2206 controls the operation control screen displayed on the display of the operation unit 2213 such that functions supported by the providers 110a to 110c are displayed (as shown in FIGS. 7B to 7C). Thus, for example, as show in FIG. 7A or 7C, the user can remotely select, via the operation unit 2213 of the MFP 102, not only the collating 501 or the grouping 502, but also stapling 503, saddle binding (booklet) 504, cloth binding 505, case binding 506, spiral binding 507, twin ring binding 508, or file binding 509 as a post process.

For example, if an enveloping machine has been newly installed in the provider 110b and enclosing-into-envelope service has been started, the database of the service center 150 is updated such that the new availability of enveloping 510 is reflected. The updated information is supplied from the service center 150 to the MFP 102. If the information is received, the core unit 2206 of the MFP 102 controls displaying of the operation unit 2213 of the MFP 102 such that the availability of the enveloping 510 is reflected. More specifically, the post process selection screen is displayed on the display of the operation unit 2213 of the MFP 102 such that the envelope button 510 is displayed as shown in FIG. 7D. This makes it possible for the user to receive the new function supported by the provider environment 110 via the operation control screen shown in FIG. 7D.

As shown in the function table of FIG. 8, the provider 110*b* (denoted as Provider B in the function table) does not support spiral binding, unlike the case shown in FIG. 7C.

Referring again to FIG. 8, the user selects a desired order function from the available functions such as those shown in FIG. 7B to 7C (step S5129). After a function is selected, if the start key 331 is pressed (step S5130), an order confirmation screen appears. After the user confirms that the setting is correct, if the user presses the OK button (step S5131), order data (image data) and a job ticket are transmitted to the service center 150 (step S5132).

In the case in which it is determined in step S5131 that the setting is not correct, the job is held or cancelled (step S5133). Thereafter, the present process is ended.

Specific examples of control operations in the system according to the present embodiment are described below.

In the following discussion, it is assumed that the MFP 102 does not have stapling and binding capabilities using a sheet processing apparatus although the MFP 102 has a sorting capability. It is also assumed that stapling and binding capabilities are available at least in one provider device (for example, a sheet processing apparatus such as the saddle binder 132) of provider devices (devices 111 to 118 and 124 to 136 in the provider environment 110 shown in FIG. 1) with which the MFP 102 is capable of communicating.

In this system, if the MFP 102 receives, via the network, function information indicating the system configuration and the functions available in the respective providers, the received information is stored as management/control information in the form of the function table such as that shown in FIG. 9 in a proper memory such as the memory 2211 so that the core unit 2206 can use the function table.

One method for the core unit 2206 to acquire function information of respective provider devices in the provide environment 110 is to transmit, in response to a command issued by a user, a function information request command to the respective devices (such as the process control manager 111) in the provider environment 110. On receiving the request command from the MFP 102, each provider device in the provider environment 110 returns function information to the MFP 102. Thus, the core unit 2206 acquires the function information and describes the acquired information in the table shown in FIG. 9. Alternatively, each device such as the process control manager 111 in the provider environment 110 may spontaneously transmit function information to the MFP 102 when a change occurs in the device configuration of some provider. Each time the MFP 102 receives the function information, the core unit 2206 updates the table information shown in FIG. 9 in accordance with the acquired function information.

In this system, for example, when the operator of the MFP 102 wants to print three sets of image job data acquired using the scanner of the MFP 102 and perform, as sheet processing (finishing), sorting by using the sorting capability of the MFP 102 or stapling by using the saddle binder 132 that is one of provider devices in the provider environment 110, the core unit 2206 controls the operation unit 2213 such that the user can specify the processing conditions for the job.

In this specific example, the image forming apparatus has a plurality of operation modes including the copy mode, the order mode, the transmission mode, and the box mode, and the copy mode is selected as an initial operation mode.

In the initial state, the core unit 2206 displays the operation control screen for use in the copy mode on the operation unit of the MFP 102 as shown in FIG. 4 such that the user can set various printing conditions (paper size, the number of copies, zooming ratio, etc.) for image data of a given job via the operation control screen.

The user places original document sheets of the job on the automatic document feeder (ADF) (not shown) of the scanner 2201 of the MFP 102, and sets the number of copies, which is one of printing conditions of the job, to three (3) by using the ten-key pad on the operation unit 2213. In this state, if the user presses the finisher key 315 on the screen shown in FIG. 4 to make a setting associated with the sorting process, which is another one of printing conditions of the job, the core unit 2206 controls the operation control screen as described next. If the finisher key 315 is pressed by the user in a state in which the job is to be processed by using only functions available in the MFP 102, that is, in a state in which the copy mode is selected by pressing the key 301 as shown in FIG. 4, the core unit 2206 examines the function table (FIG. 9) stored in the memory 2211 to determine the functions available in the MFP 102. In accordance with the information described in the function table, the core unit 2206 switches the operation control screen displayed on the operation unit 2213 to that shown in FIG. 7A. In this specific case, because the finisher key 315 is pressed in the copy mode in which the job is to be processed using only the functions available in the MFP 102, only finishing functions available in the MFP 102 (collating and grouping) are displayed on the operation control screen for use by the user to set finishing conditions for the job, as shown in FIG. 7A. The user can select a function from the functions available in the MFP 102 (first-type choices) via the operation control screen.

In this state shown in FIG. 7A (in which the job is to be processed using only the functions available in the MFP 102), if the user presses the collate key 501 on the screen shown in FIG. 7A to instruct the MFP 102 to execute collating and further presses the start key 331 on the operation unit 2213 to command the MFP 102 to start collating, the core unit 2206 controls the MFP 102 to perform processing on the job as described next.

First, the documents of the job placed on the ADF are fed sheet by sheet from the top of the stack of documents to the reading part of the scanner 2201 to read the documents of the job. The image data output from the scanner 2201 is sequentially stored in the memory 2211 (hard disk or the like) of the MFP 102 page by page starting from the first page. The image data of the job is then read page by page from the memory 2211 and printed by the printer unit 2209 of the MFP 102 to produce as many copies as the number of copies (three (3) in this specific example) specified by the user via the operation control screen shown in FIG. 4. In accordance with the collate command issued by the user by pressing the collate key 501 on the operation control screen shown in FIG. 7A, printed sheets are collated (sorted) into three sets of copies of the job by the sheet processing apparatus of the MFP 102. As described above, the core unit 2206 controls the respective units of the MFP 102 so as to perform the processing sequence on the job using only the functions available in the MFP 102 in accordance with the processing conditions specified by the user.

In the state shown in FIG. 7A (in which the job is to be processed using only the functions available in the MFP 102), if the user issues an order request to process the job by using a function that is not available in the MFP 102 but available in a device of a provider in the provider environment 110, the core unit 2206 controls the operation as described next.

If, in order to place an order with a provider, the user presses the order key 302 on the operation control screen shown in FIG. 7A during the setting of finishing conditions that is one of processing conditions for the job, the core unit 2206 switching operation mode from the current mode in which the job is to be processed using only the functions available in the MFP 102 into a mode in which the job is processed using functions available in devices of providers. When the core unit 2206 switches the operation mode, the core unit 2206 examines the function table (FIG. 9) stored in the memory 2211 to determine the functions available in the respective providers, and the core unit 2206 switches the operation control screen (FIG. 7A) in which the functions available in the MFP 102 are displayed into an operation control screen (FIG. 7A) in which functions available in providers are displayed.

In this state shown in FIG. 7B (in which the job is to be processed in response to a request issued by the MFP 102), if the user presses a staple key 503 on the screen shown in FIG. 7B to issue a command to perform stapling by using a device of a provider and further presses the start key 331 on the operation unit 2213 to command the MFP 102 to start the processing on the job, the core unit 2206 controls the MFP 102 to perform processing on the job as follows. First, the documents of the job placed on the ADF are fed sheet by sheet from the top of the stack of documents to the reading part of the scanner 2201 to read the documents of the job. The image data output from the scanner 2201 is sequentially stored in the memory 2211 (hard disk or the like) of the MFP 102 page by page starting from the first page. The image data of the job is then read page by page from the memory 2211 and printed by the printer unit 2209 of the MFP 102 to produce as many copies as the number of copies (three in this specific example) specified by the user via the operation control screen shown in FIG. 4. Furthermore, if the order command is issued to the provider by the user by clicking the order key 302 on the operation unit 2213 of the MFP 102, and if the staple key 503 on the operation control screen shown in FIG. 7B is clicked by the user to select the stapling by the saddle binder 132 in the provider environment from the plurality of functions provided by providers, then the core unit 2206 of the MFP 102 transmits information indicating the order command for the job and information indicating the process to be performed on the job in a predetermined format, such as a JDF data format such as a job ticket, to a manager device (such as the process control manager 111 shown in FIG. 1) in the provider environment 110 via a particular data transmission channel such as the Internet. The order command may be transmitted to the final destination device (the saddle binder 132 in the present example) via the manager device such as the process control manger 111 controlling the provider environment 110 or directly without passing through the manager device. In the present example, the order command for the stapling process (command data in the JDF format) is transmitted to the saddle binder 132 via a data transmission path MFP 102→Internet→provider environment 110, and further in the provider environment 110 process control manager 111→post process manager 116→saddle binder 132, and the command is stored in relation to the job ID of the job.

If the process control manager 111 receives the job order command from the MFP 102, the process control manager 111 informs, via a user interface unit such as a computer monitor, an operator in the provider environment 110 that that the job order command has been received from the MFP 102 (under the control of a computer on which the process control manager 111 is installed). In response to receiving the notification, the operator in the provider environment 110 comes to the place where the MFP 102 is located and brings the three sets of copies of the job printed by the MFP 102 to the saddle binder 132 in the provider environment 110. Each bundle of the job is placed on a tray of the saddle binder 132 in the provider environment 110. If a staple start command is issued via an operation unit (not shown) of the saddle binder 132, the stapling for the job is performed by the saddle binder 132 under the control of the post process manager 116. When as many bundles as the number specified by the user (three sets in this specific example) are stapled, the stapling process is completed. After all processing including the stapling requested by the MFP 102 is completed, the operator of the provider environment 110 delivers the resultant three stapled bundles of sheets having image data scanned and printed by the MFP 102 to the user of the MFP 102, that is, the orderer of the job, by using a delivery device 141 under the control of a delivery/dispatch manager 118. In this image forming system, as described above, the controller including the core unit 2206 of the MFP 102 controls devices of the system such that a processing sequence on a job requested by a user is performed using functions including those that are not available in the MFP 102 but available in devices of providers.

In this specific example, the processing sequence is performed by the MFP 102 in the user environment and the provider device in the provider environment 110 in a cooperative fashion. More specifically, to process a given job into a final form specified by the client via the operation unit 2213 of the MFP 102, the processing sequence (work flow) including a plurality of processes (processes #1 to #7) is performed in the following order (process #1→process #2→process #3→process #4→process #5→process #6→process #7). Each of the processes (process #1 through process #7) is described below.

Process #1: In the MFP 102, the core unit 2206 displays the operation control screen on the operation unit 2213 as shown in FIG. 4 or 7. A client issues an order command to a provider by pressing the order key 302 on the operation unit 2213.

The client sets process conditions of the job (for example, three copies of a scanned document are printed and stapled) via the operation control screen such as that shown in FIG. 4 or FIG. 7B.

Process #2: In accordance with the command issued and the process conditions specified by the client via the operation unit 2213 of the MFP 102 in Process #1, the core unit 2206 performs scanning of the job using the scanner of the MFP 102. Image data of the job obtained as the result of the scanning process is sequentially stored in the memory 2211 of the MFP 102.

Process #3: In response to the request issued by the client via the operation unit 2213 of the MFP 102 in Process #1, the core unit 2206 transmits a job process order command (including information that allows the process control manager 111 to understand what process should be performed by using which device in the provider environment 110) in the form of JDF data such as that shown in FIG. 42 from the MFP 102 to the process control manager 111 in the provider environment 110 via the Internet. In parallel to the operation of issuing the job process order command to the process control manager 111 from the MFP 102, the core unit 2206 reads image data of the job from the memory 2211 of the MFP 102 and prints it using the printer of the MFP 102.

Process #4: The order command in the form of JDF data issued by the MFP 102 is received by the project control manager 111 (for example, implemented on an information processing apparatus such as a personal computer) in the provider environment 110. In accordance with the order command, the controller of the process control manager 111 informs a human operator of the provider environment 110 that the order command has been received from the MFP 102 and what operation should be performed by the human operator, by displaying the information on the display of the computer or the user interface of a portable terminal.

In this specific example, the controller of the process control manager 111 outputs an operation command indicating that the operator should take sheets printed by the MFP 102 and place the printed sheets taken out of the MFP 102 on the saddle binder 132 to staple them.

Process #5: In response to the operation command issued in Process #5, the human operator in the provider environment 110 takes the printed sheets out of the MFP 102 (the human operator in the provider environment 110 comes to the location of the user environment 100 to get the printed sheet). The operator in the provider environment 110 places the printed sheets on the saddle binder 132 in the provider environment 110. The operator then issues a staple start command via the operation unit of the binder 132, which starts the stapling in response to the command.

Process #6: The saddle binder 132 in the provider environment 110 staples three sets of copies of the job.

Process #7: Finally, the three sets of printed copies are delivered to the client by using a transportation device 11.

Processes #3 and #7 may be performed at different times or at substantially the same time. Note that the timing of performing the above processes #1 to #7 is not important if the sequence can be correctly performed.

In the present example, as descried above, the processing sequence (also referred to as a work flow) is performed by the present system in the order described above to obtain a printed material in a final form.

Alternatively, to process the given job into the final form, the processing sequence may be performed as follows.

Process #1: In the MFP 102, the core unit 2206 displays the operation control screen on the operation unit 2213 as shown in FIG. 4 or 7. A client issues an order command to a provider by pressing the order key 302 on the operation unit 2213. The client sets process conditions of the job (for example, three copies of a scanned document are printed and stapled) via the operation control screen such as that shown in FIG. 4 or FIG. 7B.

Process #2: In accordance with the command issued and the process conditions specified by the client via the operation unit 2213 of the MFP 102 in Process #1, the core unit 2206 performs scanning of the job using the scanner of the MFP 102. Image data of the job obtained as the result of the scanning process is sequentially stored in the memory 2211 of the MFP 102.

The work flow from the beginning to this process is the same as that in the previous work flow.

Process #3: In response to the request issued by the client via the operation unit 2213 of the MFP 102 in Process #1, the core unit 2206 transmits a job process order command (including information that allows the process control manager 111 to understand what process should be performed by using which device in the provider environment 110) in the form of JDF data such as that shown in FIG. 42 from the MFP 102 to the process control manager 111 in the provider environment 110 via the Internet. The core unit 2206 controls the operation such that in parallel to the process of issuing job ordering command from the MFP 102 to the process control manager 111, the image data of the job stored in the memory 2211 is transmitted to an MFP (the color MFP 124 or the monochrome MFP 125 in the example shown in FIG. 1) in the provider environment without being printed by the printer of the MFP 102.

Process #4: The order command in the form of JDF data issued by the MFP 102 is received by the project control manager 111 (for example, implemented on an information processing apparatus such as a personal computer) in the provider environment 110. The image data of the job to be processed according to the order command issued by the MFP 102 is also received.

In accordance with the order command received from the MFP 102, the controller of the process control manager 111 controls the process such that the image data of the job received from the MFP 102 is printed, for example, using the MFP 125 in the provider environment (in accordance with the command issued by the client, three sets of copies are printed in this specific example).

In accordance with the order command, the controller of the process control manager 111 informs a human operator in the provider environment 110 that the order command has been received from the MFP 102 and what operation should be performed by the human operator, by displaying the information on the display of the computer or the user interface of a portable terminal.

In this specific example, the controller of the process control manager 111 outputs an operation command indicating that the operator in the provider environment 110 should take sheets printed by the MFP 125 in the provider environment 110 and place the printed sheets taken out of the MFP 125 on the saddle binder 132 to staple them.

Process #5: In response to the operation command issued in Process #4, the human operator in the provider environment 110 takes the printed sheets out of the MFP 125 and places the printed sheets on the saddle binder 132 in the provider environment 110. The operator then issues a staple start command via the operation unit of the binder 132, which starts the stapling in response to the command.

Process #6: The saddle binder 132 in the provider environment 110 staples three sets of copies of the job.

Process #7: Finally, the three sets of printed copies are delivered to the client by using the transportation device 141.

In the present system, as described above, not only a job order command but also image data of a job to be processed may be sent from the MFP 102 to the provider environment 110, and the provider environment may process the received image data in accordance with the order command.

In the present embodiment, as described above, either the first mode or the second mode is selected by an operator of the image forming apparatus 102 via the operation control screen displayed on the display 300 of the operation unit 2213 of the image forming apparatus 102. In the first mode, a job (including image data output from the scanner unit of the image forming apparatus 102 and stored in the memory 2211 of the image forming apparatus 102 or image data received from an external apparatus such as a host computer 103 and stored in the memory 2211 of the image forming apparatus) accepted by the image forming apparatus 102 is performed by using the functions other than the ordering function (such as the copying function, the transmission function, or the mail box function) of the image forming apparatus 102 without needing an operation of a human operator other than the operator of the image forming apparatus 102 in the user environment 100 shown in FIG. 1. That is, without needing an operation of human operators of the provider devices 111 to 136 in the provider environment 110 shown in FIG. 1, while in the second mode, a job (including image data output from the scanner unit of the image forming apparatus 102 and stored in the memory 2211 of the image forming apparatus 102 or image data received from an external apparatus such as a host computer 103 and stored in the memory 2211 of the image forming apparatus) accepted by the image forming apparatus 102 is performed by functions of some of provider devices 111 to 136 in the provider environment 110 other than the image forming apparatus 102 in conjunction with an operation performed by human operators of the provider devices 111 to 136 in the provider environment 110 shown in FIG. 1 other than the operator of the image forming apparatus 102 in the user environment 100.

For example, when an operator of the image forming apparatus 102 presses the copy mode key 301 on the operation control screen (FIG. 4) displayed on the display 300 of the image forming apparatus 102, the core unit 2206 operates the image forming apparatus 102 in the first mode described above. The core unit 2206 detects the functions available in the image forming apparatus 102 (such as two-sided printing, interrupt printing, sorting, zooming, or image density adjusting), and the core unit 2206 displays a screen for selecting a function from those available in the image forming apparatus (an example of such as screen is shown in FIG. 7A) on the display 300. Such a screen is also referred to as a first-type function selection screen. If the user selects one of the functions available in the image forming apparatus 102 by clicking the touch panel, an operation is performed in accordance with the selected function.

Figure 42:
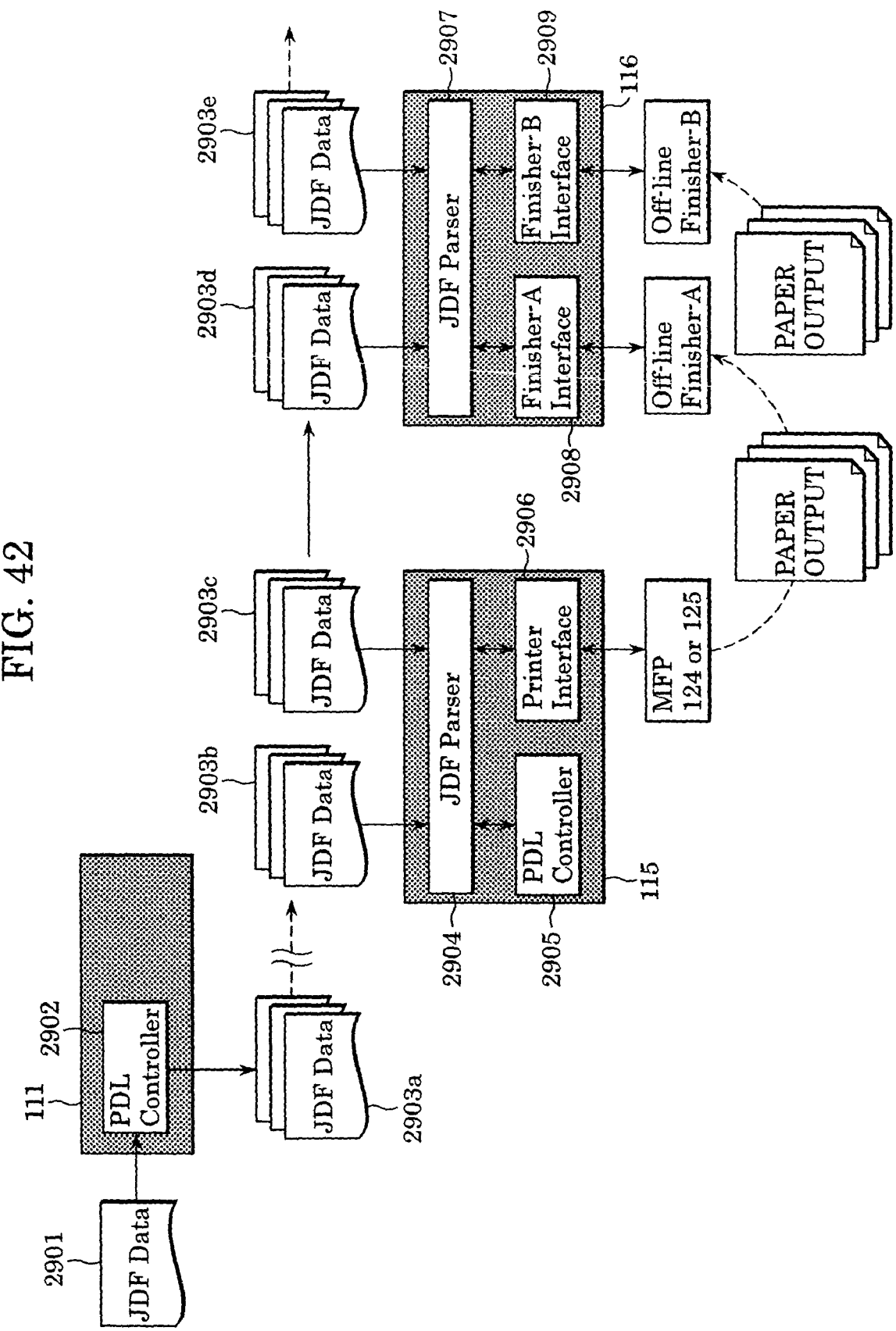
FIG. 42 is a diagram showing a process control performed by the process control manager shown in FIG. 1.

On the other hand, when an operator of the image forming apparatus 102 presses the order mode key 302 on the operation control screen (FIG. 4) displayed on the display 300 of the image forming apparatus 102, the core unit 2206 controls the image forming apparatus 102 to operate in the second mode described above. Under the control of the core unit 2206, a job order command is issued to a particular device (for example, the operation control manager 111) in the provider environment 110 via the Internet. The core unit 2206 acquires information indicating all of the currently available functions of the respective devices 111 to 126 in the provider environment 110 (for example, the monochrome printing function of the monochrome MFP 125, the color printing function of the color MFP 124, the sheet cutting function of the sheet cutter 131, the sheet saddle binding function of the saddle binder 132, the case binding function of the case binder 133, the folding function of the folder 134, the enclosing function of the enclosing machine 135, the collating function of the collator 136, the file storage function of the file storage manager 117, and the editing function of the document edit/scan manager 113) from the provider environment 110 via the Internet. The information may be acquired in real time or in advance. In accordance with the acquired information indicating the available functions of the devices in the provider environment 110, the core unit 2206 displays a screen indicating available functions of the devices in the provider environment 110 (second-type functions) in an at-a-glance fashion on the display 300. If a user selects one of these available functions via the touch panel on the display 300 of the image forming apparatus 102, the core unit 2206 controls the image forming apparatus 102 to transmit a command to the provider environment 110 to perform the function specified by the user of the image forming apparatus 102 by using a device having the specified function. The command is described in the JDF format as shown in FIG. 42 and transmitted via the Internet to a particular device (for example, the process control manager 111) in the provider environment 110.

On receiving the job order command and the operation instruction data (JDF data) indicating the function to be performed, the process control manager (manager computer) 110 displays information on the user interface unit such as a monitor thereof. The displayed information includes message information indicating that the job order command has been received from the image forming apparatus 102, message information indicating what process should be performed on the job by using which provider device, and message information indicating what operation should be performed by an operator in the provider environment 110 in the processing of the job. In accordance with the information displayed on the monitor, the specified function is performed by the provider device and the operator in the provider environment 110.

Thus, as described above, the system and the apparatus according to the present embodiment of the invention are applicable to the POD market and provide a very convenient and easy-to-use environment that no longer has problems similar to those with the conventional technique described earlier and that can satisfy various needs of a user of the image forming apparatus 102.

Furthermore, in the present embodiment, as described earlier with reference to FIGS. 7A to 7D, the operation control screen displayed on the display 300 of the operation unit 2213 of the image forming apparatus 102 is switched selectively by the core unit 2206 in response to pressing the touch panel between the operation control screen (for example, the operation control screen shown in FIG. 7A) indicating the functions available in the image forming apparatus 102 and the operation control screen (for example, one of the operation control screens shown in FIG. 7B to 7D) indicating the functions available in the provider environment 110. If the user of the image forming apparatus 102 determines, based on the information displayed on the operation control screen, that the job can be processed using only the image forming apparatus 102, the job is processed using the image forming apparatus 102. On the other hand, if the user determines that the job cannot be processed by using only the functions of the image forming apparatus 102, the user switches the operation control screen to that indicating the functions of the devices in the provider environment 110, and selects one of the functions. This allows the system to handle a wide variety of needs of users.

When the operation control screen indicating the functions of the image forming apparatus 102 is displayed as shown in FIG. 7A, the copy tab is displayed in such a manner that the user of the image forming apparatus 102 can recognize that the copy mode is currently selected. On the other hand, when the operation control screen indicating the functions of the provider devices in the provider environment 110 is displayed as in one of FIGS. 7B to 7D, the order mode tab is displayed in such a manner that the user of the image forming apparatus 102 can recognize that the order mode is currently selected. Thus, the operation control screen indicating the available functions is displayed in such that manner that the user can easily recognize which operation control screen is currently displayed. This is very useful and convenient for users to select a function.

Another example of the manner of controlling the user interface is described below with reference to FIGS. 63A to 63C. FIGS. 63A to 63C show some examples of operation control screens that are displayed, under the control of the core unit 2206, on the display 300 of the operation unit 2213 of the MFP 102.

For example, let us assume that the user of the image forming apparatus 102 is setting operation conditions via the operation control screen shown in FIG. 4 to print job data input to the image forming apparatus 102 via the scanner or an external apparatus. At the stage at which the operation control screen shown in FIG. 4 is displayed, the copy mode is selected. That is, the image forming apparatus 102 is in the first mode in which a given job is processed using only the functions of the image forming apparatus 102.

In the setting of the printing conditions, if the user presses the paper selection key 313 on the screen shown in FIG. 4 to select a setting for a type of paper on which to print the image data of the job, the core unit 2206 extracts the functions available in the image forming apparatus 102 from the function table (FIG. 9) stored in the memory 2211 of the image forming apparatus 102 and displays the operation control screen indicating the extracted functions on the display 300 as shown in FIG. 63A such that the user of the image forming apparatus 102 can select the size and the type of paper to be used to print the image data from the resources possessed by the image forming apparatus 102.

In the specific example shown in FIG. 63A, the operation control screen indicates that A4-size paper, A3-size paper, and A4R-size paper are available in the image forming apparatus 102 and also indicates that two types of paper, that is, plain paper and recycled paper are available. The user can select the size and the type of paper from these options.

In this state, for example, if the user presses an A4 key on the operation control screen shown in FIG. 63A and further presses a plain key and then the job execution key (start key) 331 on the operation unit 2213 shown in FIG. 4, the core unit 2206 controls the image forming apparatus 102 such that A4-size plain paper is fed from a paper cassette disposed in the image forming apparatus 102 and the print data is printed on the A4-size plain paper fed from the paper cassette.

On the other hand if the user determines, from the information displayed on the operation control screen shown in FIG. 63A, that any paper available in the image forming apparatus 102 does not meet the requirement in terms of the size or type of paper, and thus the user presses the order key 302 on the operation control screen shown in FIG. 63A, then the core unit 2206 extracts the functions available in the provider devices in the provider environment 110 from the function table (FIG. 9) that was produced based on the information acquired from a particular device (for example, the process control manager 111) and stored in the memory 2211 of the image forming apparatus 102, and the core unit 2206 displays the operation control screen indicating the extracted functions on the display 300 as shown in FIG. 63B such that the user of the image forming apparatus 102 can select the size and the type of paper to be used to print the image data from resources possessed by a provider device (for example, the color MFP 124 or the monochrome MFP 125) in the provider environment 110.

In the specific example shown in FIG. 63B, the operation control screen indicates that A4-size paper, A3-size paper, A4R-size paper, B4-size paper, letter-size paper, A5R-size paper, and legal-size paper are available in the provider device (the color MFP 124 or the monochrome MFP 125) in the provider environment 110 and also indicates that four types of paper, that is, plain paper, recycled paper, colored paper, and tracing paper are available. The user can select the size and the type of paper from these many options.

In this state, for example, if the user presses a letter key on the operation control screen shown in FIG. 63B and further presses a color key and then the job execution key (start key) 331 on the operation unit 2213 shown in FIG. 4, the core unit 2206 controls the image forming apparatus 102 such that a job order command to request a device in the provider environment 110 to process the job, image data to be printed, and an operation instruction command indicating that the image data should be printed on letter-size colored paper by using an image forming apparatus in the provider environment 110 are transmitted from the image forming apparatus 102 to the process control manager 111 in the provider environment 110 via the Internet. In accordance with the operation instruction command, the operation control manager 111 transfers the image data (received from the image forming apparatus 102 in the user environment 100) and the operation instruction command (indicating that the image data should be printed on letter-size colored paper) associated with the image data to, for example, the color MFP 124 via the printer manager 115. In response, the color MFP 124 prints the image data received from the image forming apparatus 102 on letter-size colored paper. When the color MFP 124 completes the printing operation, the color MFP 124 sends information indicating the printing operation is completed to the operation control manager 111 via the print manager 115. On receiving the information, the process control manager 111 informs the operator in the provider environment 110 that the printing operation is completed, by displaying the information on the user interface display of the computer or the portable terminal. Furthermore, the process control manager 111 sends an operator instruction command to the operator via the delivery/dispatch manager 118 to provide information that the printed sheets obtained after the completion of the process should be delivered to the orderer of the job, that is, the user of the job, of the image forming apparatus 102 in the user environment 100. In response to receiving the operator instruction command, the operator delivers the printed sheets to the orderer of the job, that is, the user of the image forming apparatus 102 in the user environment 100 by using, for example, the transportation device 141. As described above, the processing sequence associated with the job, including not only processes performed by devices but also processes performed by the human operator, is performed in the provider environment.

As described above, the present embodiment can be modified in various manners and can be used in a wide variety of applications.

In the present embodiment, as described above, the core unit 2206 controls the displaying of the operation control screen on the display 300 of the image forming apparatus 102 such that either the operation control screen (such as that shown in FIG. 7A or FIG. 63A) indicating the functions available in the image forming apparatus 102 of the job orderer (in the user environment 100) or the operation control screen (such as one of those shown in FIGS. 7B to 7D or such as that shown in FIG. 63B) indicating the functions available in devices (for example, devices 111 to 113) of the job order receiver (in the provider environment 110) are selectively displayed. Alternatively, the functions available in the user environment or the provider environment may be displayed on the same screen as shown in FIG. 63C. The operation control screen shown as an example in FIG. 63C is displayed by the core unit 2206 on the display 300 of the image forming apparatus 102 when a user issues a command, via the operation unit 2213 of the image forming apparatus 102, to make setting in terms of paper used in printing performed by the image forming apparatus 102. This operation control screen shown in FIG. 63C indicates the sizes and types of paper available in the image forming apparatus 102 such that a user can select a desired size and type of paper from the displayed options by pressing the touch panel. The operation control screen shown in FIG. 63C also indicates the sizes and types of paper available in devices in the provider environment 110 such that a user can also select a desired size and type of paper from these displayed options by pressing the touch panel.

In any case, available functions are displayed on the display 300 in such a manner that a user of the image forming apparatus 102 can distinguish the functions available in the image forming apparatus 102 in the user environment and the functions available in devices in the provider environment 110 from each other, such that the above-described advantages are provided according to the present invention.

Print Order Operation

The process is described further for the following two modes: (a) printing of data output from the client computer 103 is performed by the MFP 102 in the user environment, and (b) an order for printing is submitted to an external provider.

A web server is installed on the MFP 102 such that the web server is always in an active state. The web server is implemented by a web server program typified by IIS (Internal Information Server) available from Microsoft® Corp. When a user inputs a URL (Uniform Resource Locator) address via a web browser, the web server provides a service screen (web page) on the web browser using HTTP (hyper text transfer protocol).

In a common printer driver, a port for connection to a printer on a network is assigned based on an address or a name of the printer or a parallel port is used. In contrast, in the present embodiment, the MFP 102 is connectable to a printer on a network via the web server such that a job submit screen of the web server is opened from the printer driver, and a print command or a print order command for a job is issued via this job submit screen.

Figure 11A:
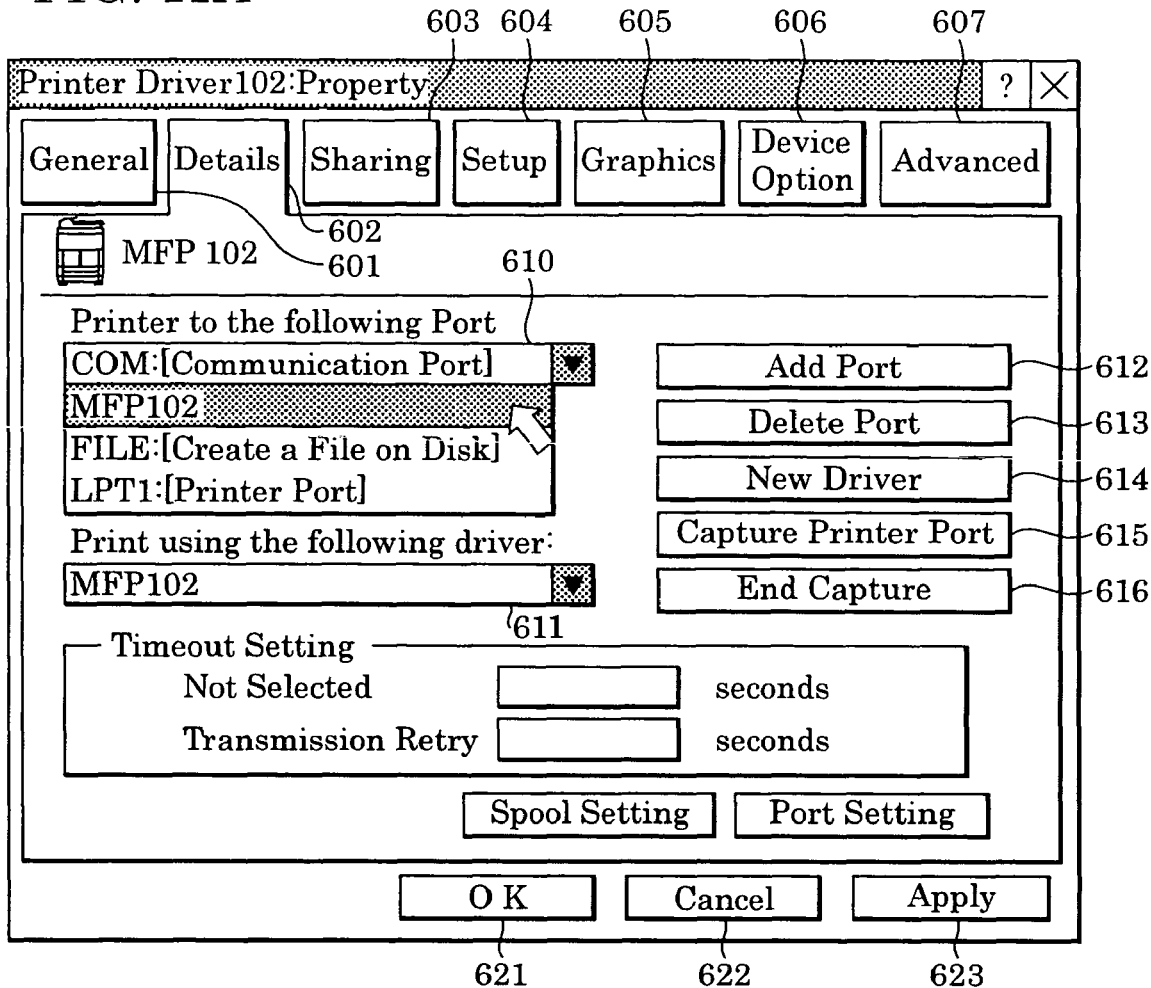
FIGS. 11A and 11B are diagrams showing examples of print setting screens displayed by a printer driver on a client computer shown in FIG. 1.
Figure 11B:
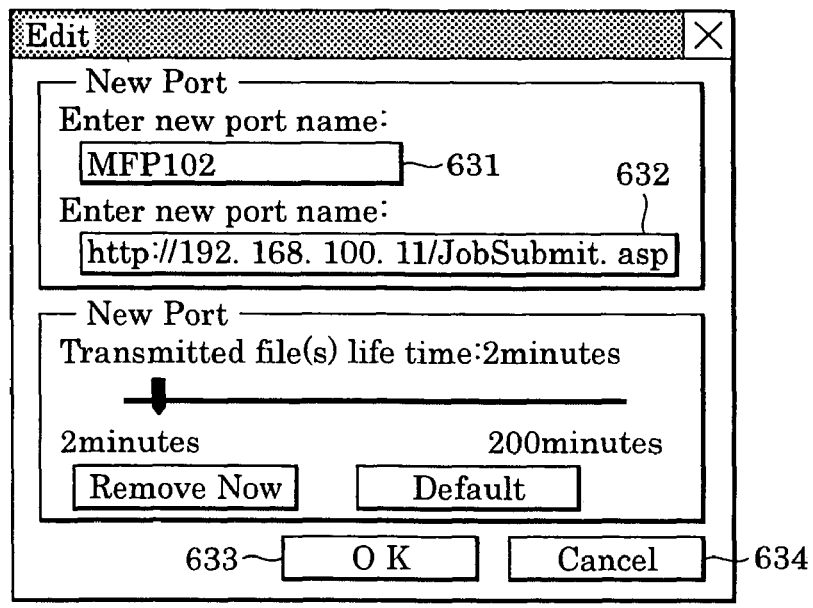

FIGS. 11A and 11B show examples of print setting screens of the print driver of the client computer 103 shown in FIG. 1. FIG. 11A shows a GUI (Graphical User Interface) screen for setting properties of the printer of the MFP 102. This screen is used to set a port immediately after a printer driver is set on the client computer 103.

This property setting screen includes tabs 601 to 607 for opening subscreens for setting detailed properties. In the specific example shown in FIG. 11A, a subscreen related to a Details tab 602 is opened to make setting in terms of ports. Note that tabs and the corresponding subscreens for setting detailed properties are not limited to those shown in FIG. 11A, but they may be differently formed depending on the printer driver used.

A port for a particular printer is assigned in a port selection column 610. In an initial state immediately after the printer driver is installed on the client computer 103, no port is assigned. When a new port is assigned, an Add Port key 612 is pressed. In response, a window shown in FIG. 11B appears. The property setting screen shown in FIG. 11A also includes a Delete Port key 613, a New Driver key 614, a Capture Printer Port key 615, and an End Capture key 616.

In the window shown in FIG. 11B, a port name (MFP 102 in this specific example) is input in a port name column 631, and a URL of the web server installed on the MFP 102 is input in a URL column 632. The inputting of the URL of the web server in this column makes it possible for the job submit screen to appear when a job is printed or a job order command is issued. After the port name and the URL are input, if an OK button 633 is pressed, the screen shown in FIG. 11A appears again.

In a printer driver column 611, a printer driver used in printing is selected. In this specific example, MFP 102 is selected as the printer driver. As required, other properties such as a timeout value are set. Thereafter, if an OK button 621 is pressed, the property setting screen is closed. If a Cancel button 622 is pressed, settings are canceled. If an Apply button 623 is pressed, settings are applied.

An example of a process of performing printing via an application program running on the client computer is described below.

Printer Driver

Document data is input by a user in various forms including PDL (Page Description Language) data, PDF (Portable Document Format) data, application data, and a paper document. In the case in which document data is given in the form of PDL (PostScript® (PS) or Printer Control Language (PCL)) data or PDF data, the document data may be directly transferred to the print manager 115 for the purpose of printing, because document data in these formats can be directly rasterized. However, in the case in which document data is given in the form of application data, an operator converts the given application data into a printable form by using the printer driver of the client computer 103, and the resultant data is transmitted to the print manager 115.

The printer driver is described in further detail below.

Figure 12:
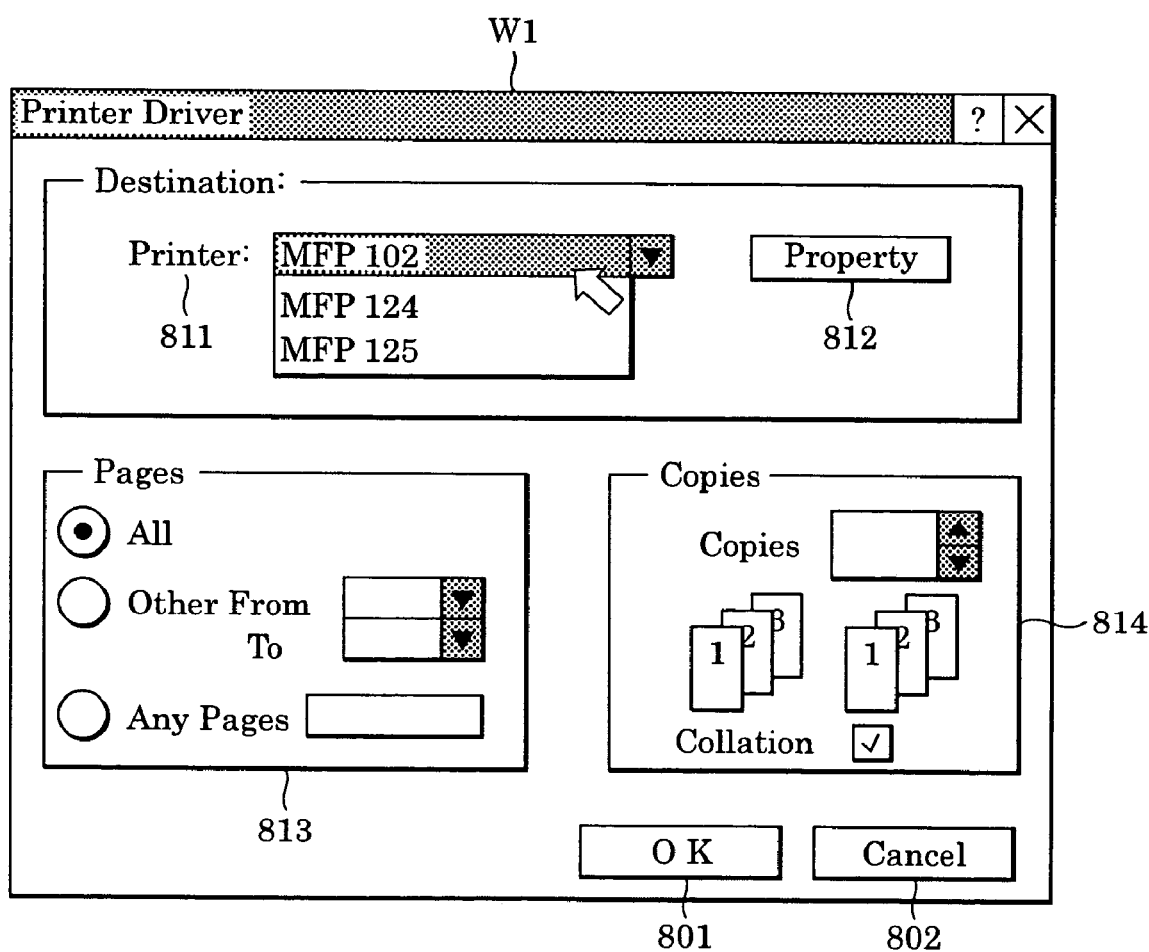
FIG. 12 is a diagram showing an example of a printer driver setting screen displayed on a client computer shown in FIG. 1.
Figure 13:
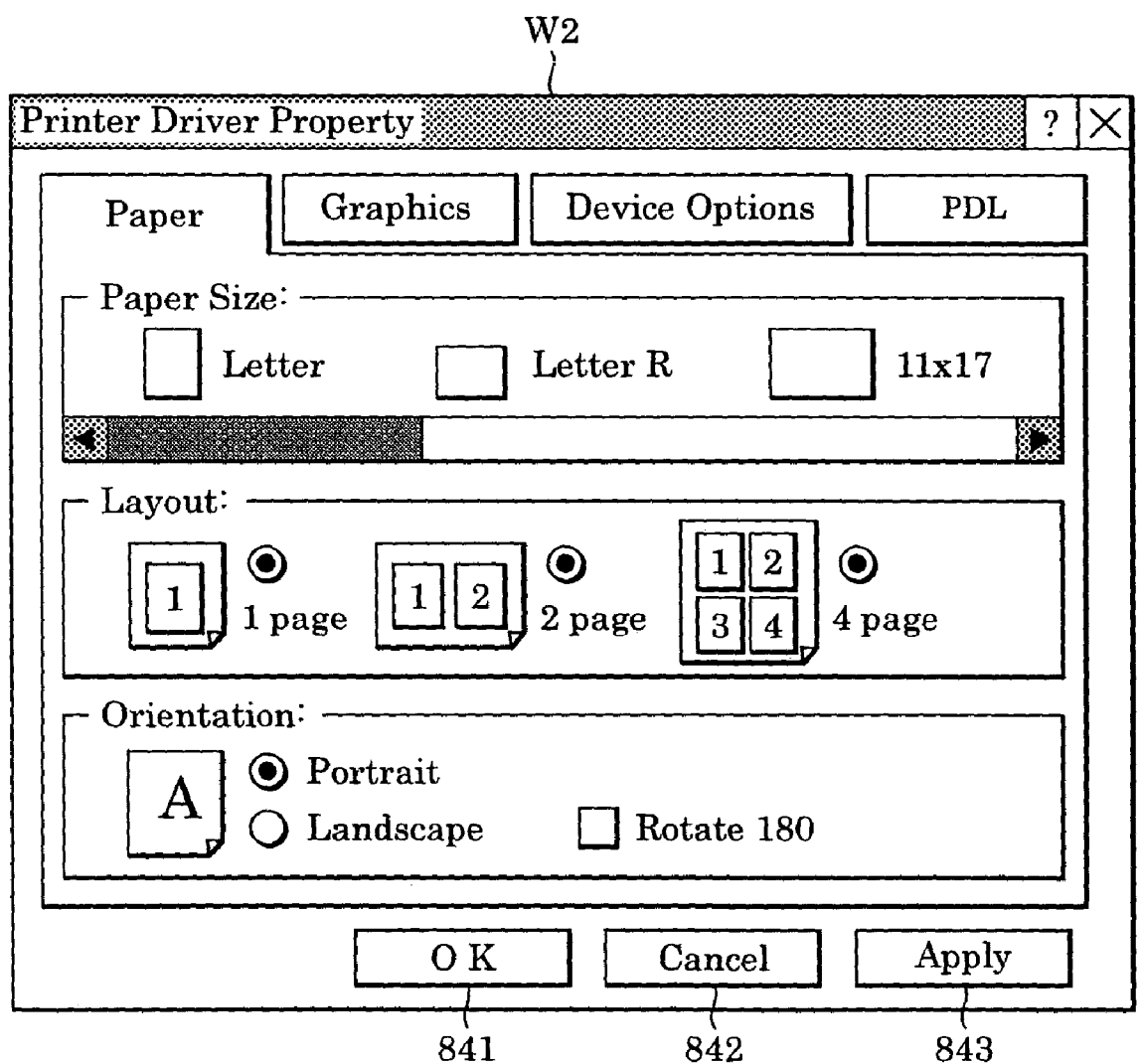
FIG. 13 is a diagram showing an example of a printer driver setting screen displayed on a client computer shown in FIG. 1.
Figure 14:
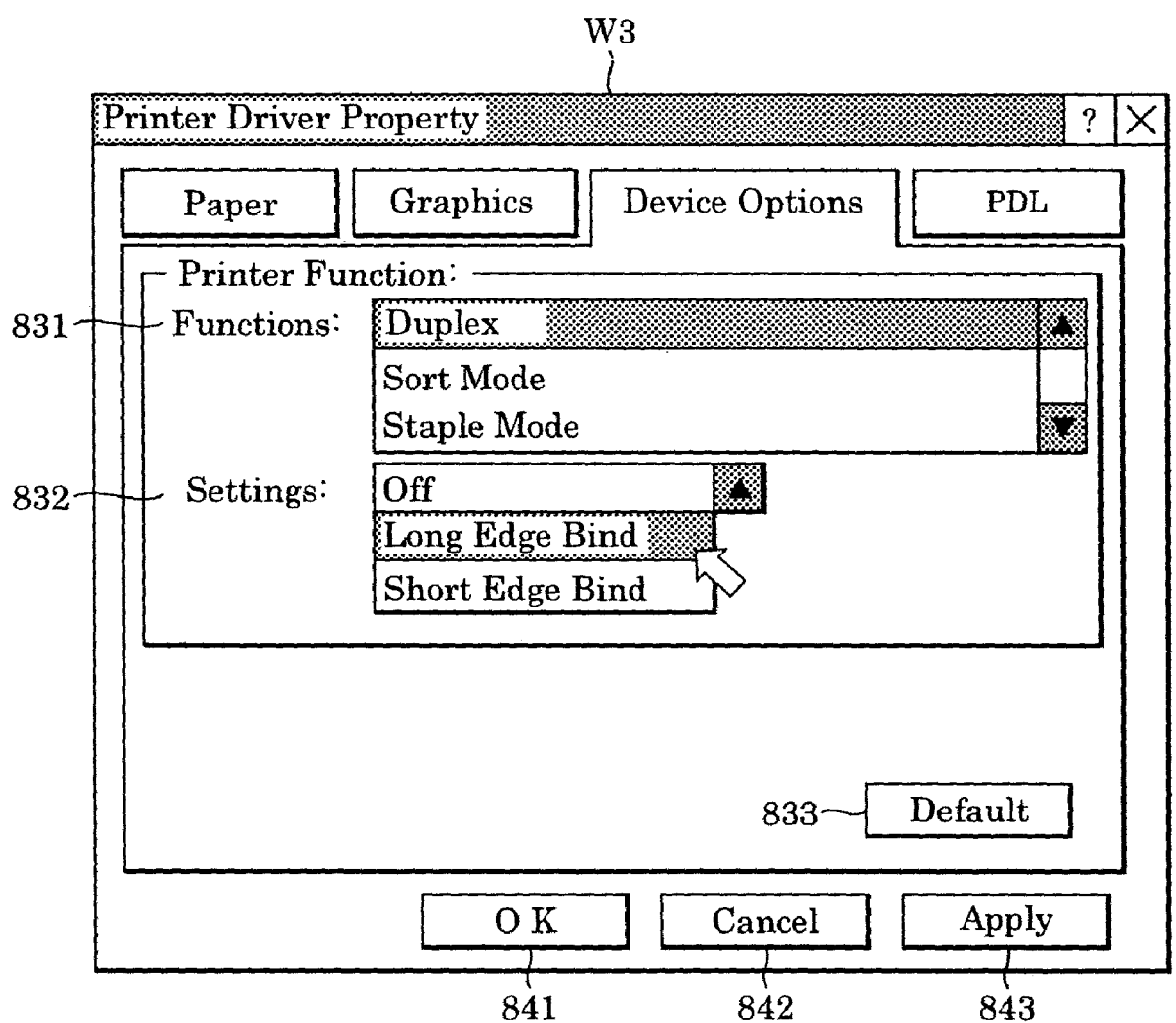
FIG. 14 is a diagram showing an example of a printer driver setting screen displayed on a client computer shown in FIG. 1.

FIGS. 12 to 14 show examples of printer driver setting windows displayed on the screen of the client computer 103 shown in FIG. 1. FIG. 12 shows a printer driver setting window W1 that initially appears. A property setting window W2 shown in FIG. 13 appears when a property key 812 is pressed in the window W1. A property setting window W3 shown in FIG. 14 appears when a device option tab in the window W2 is selected.

Properties of the printer driver of the client computer 103 are specified via a printer property setting GUI that appears when a print command is issued in an application program. After necessary parameters associated with the properties of the printer are set via this GUI, image data is transmitted to the printer.

In the printer driver setting window W1 shown in FIG. 12, a destination printer is selected in a destination column 811. In the example shown in FIG. 12, MFP 102 is selected (MFP 124 and MFP 125 are also selectable).

Pages to be output are specified in a page setting column 813. Of pages of image data produced by application software running on the client computer 103, pages to be output are specified in this page setting column 813.

The number of copies to be printed is specified in a "Copies" column 814. After a cursor is moved so as to select this column 814, if an upper or lower arrow button (in a scroll bar on the right-hand end of the column 814) is clicked, the number of copies is increased or decreased. To set details of a destination device selected in the destination column 811, a property key 812 is pressed. In response, the window shown in FIG. 13 or 14 appears.

After settings are completed, an OK key 801 is pressed to start printing. If a cancel key 802 is pressed, the printing operation is canceled.

Each GUI window shown in FIG. 13 or 14, which appears in response to pressing the property key 812 shown in FIG. 12, includes a Paper tab, a Graphics tab, a Device Options tab, and a PDL tab. If one of these tab is clicked using a pointing device or the like (not shown), a subwindow for selecting settings associated with paper, graphics, device options, or PDL appears depending on the clicked tab.

In the example shown in FIG. 13, a Paper subwindow coupled to the Paper tab is opened. The paper subwindow is used to set the paper size, the layout, and the paper orientation. In a subwindow that appears in response to clicking the Device Options tab, a user can make detailed settings specific to the device, for example, settings associated with finishing process such as stapling or the color tone of the printer. As shown in FIG. 14, a printer function and an associated parameter are set in column 831 and 832, respectively. If a default key 833 is clicked, the settings are reset to default values.

Although not shown in the figures, settings in terms of resolution and halftone are made via a subwindow opened when the Graphics tab is clicked, and settings in terms of the output form of PDL are made in a subwindow that appears when the PDL tab is clicked.

If an OK key 841 is clicked, settings of properties are applied and the screen returns to the window shown in FIG. 12. On the other hand, if a Cancel key 842 is clicked, settings of properties are canceled and the screen returns to the window shown in FIG. 12. In the case in which an Apply key 843 is clicked, settings of properties are applied while maintaining the screen in the current state.

In general, parameters associated with the printer driver for a particular printer are set in the setting window that appears when the Device Options tab is selected. For example, to set the printer driver, the parameters specific to the printer are described in a PPD (PostScript® Printer Description) file.

In the PPD file, initial values of parameters associated with the printer, allowable combinations of setting items, etc., are described, and a PPD file is prepared for each printer. The operator installs the PPD file on each of his/her computers or clusters such that the PPD file is linked with the printer driver.

A PPD file has a one-to-one correspondence with a printer whose functions are known. In other words, a PPD file is not produced for use with a device that is located in the provider environment and whose functions are not known by the client computer 103. Another problem with a PPD file is that an additional function of a device in the provider environment cannot be applied to the PPD file. Although the above problems can be solved by preparing a printer driver for the device in the provider environment by downloading it from the provider environment, the preparation involves a complicated process in particular when there is a plurality of providers.

In the present embodiment, the above-described problems are solved as described below with reference to a flow chart shown in FIG. 15.

Figure 15:
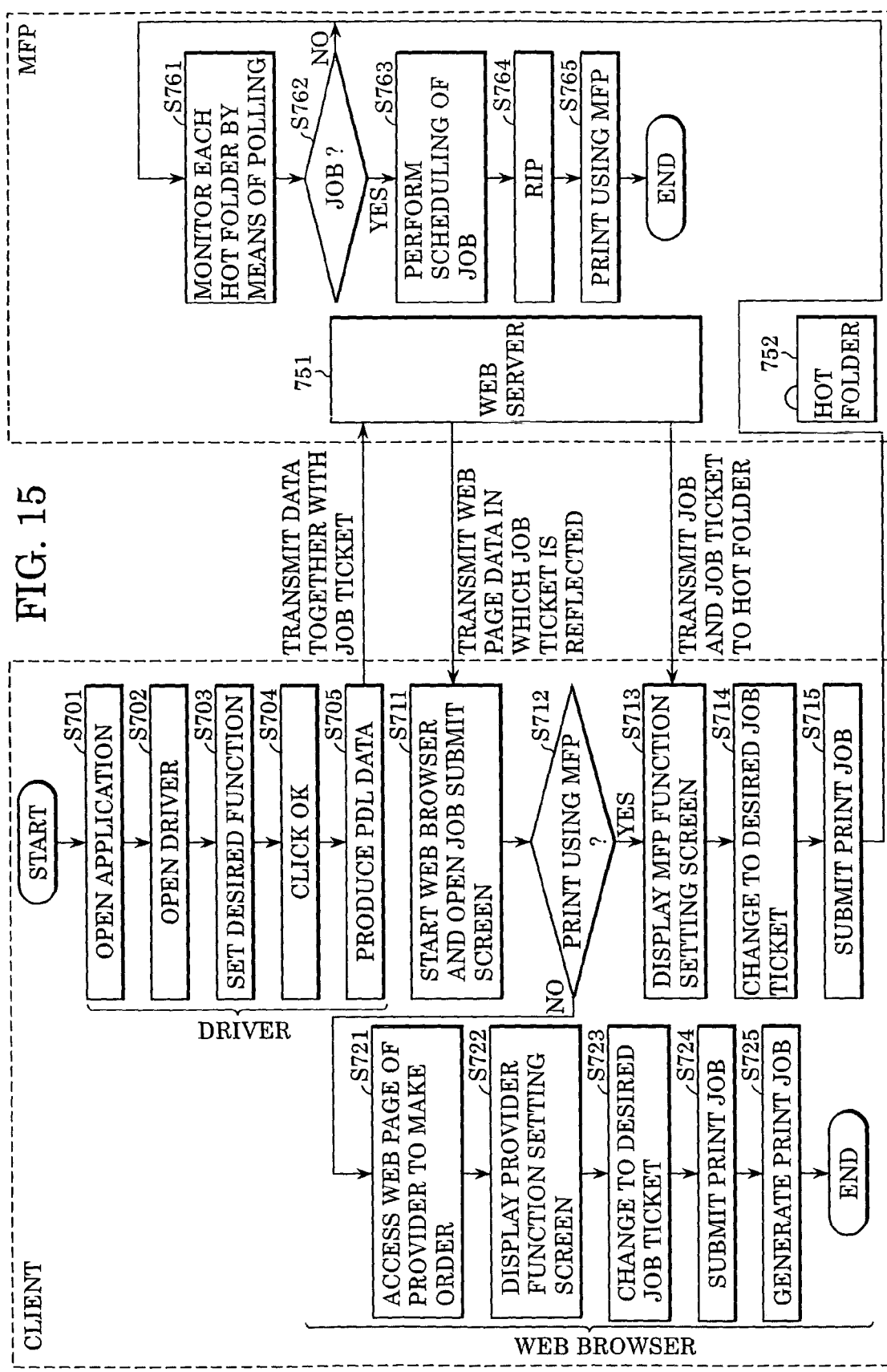
FIG. 15 is a flow chart showing an example of a process, performed in a user environment shown in FIG. 1, to place an order for printing.

FIG. 15 is a flow chart showing an example of a print ordering process performed in the user environment 100 shown in FIG. 1. This process is performed by the client computer 103 and the MFP 102 shown in FIG. 1 while transmitting data between them. In the flow chart shown in FIG. 15, steps S701 to S705 are performed by the driver of the client computer 103, steps S711 to S715 and S721 to S724 are performed by the web browser of the client computer 103, and steps S761 and S765 are performed by the MFP 102.

First, an application is opened (step S701). Thereafter, the driver is opened (step S702) and a desired function is specified (step S703). Thereafter, if the OK button is clicked (step S704), application data is converted into PDL data (for example, PS data). The printer driver serves to produce the PDL data and transmit the resultant PDL data to a specified port (indicated by a URL). More specifically, if the job submit page on the MFP 102 indicated by the URL is registered in advance as the port in the client computer 103, the job submit page is accessed (step S705).

In the above process, the printer driver running on the client computer 103 converts the data received from the application into PDL data and accesses the job submit page on the MFP 102 via the web browser of the client computer 103 by specifying the URL of the job submit page and the HTML (Hyper Text Markup Language) file name following the URL.

Figure 16:
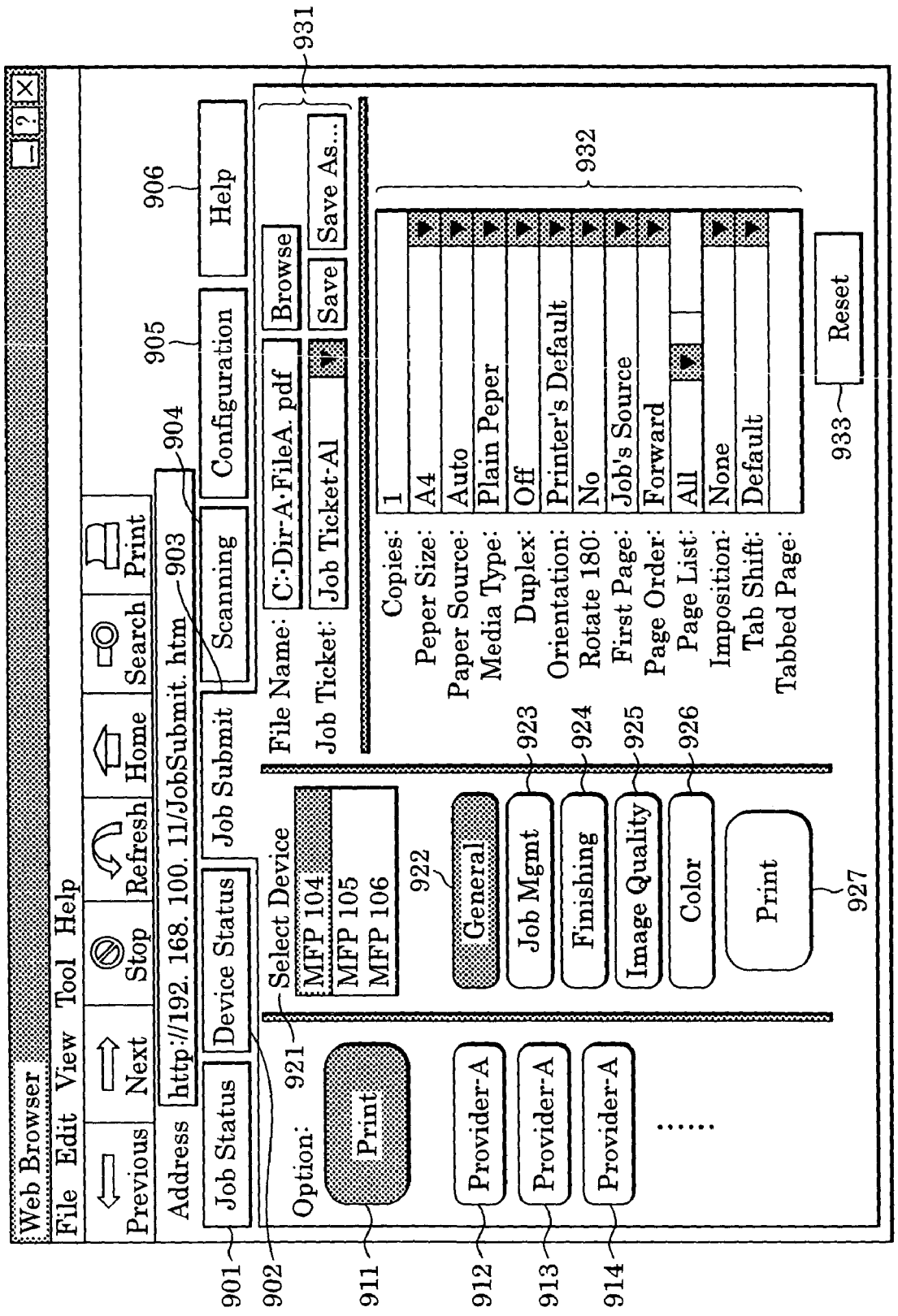
FIG. 16 is a diagram showing an example of a web browser displayed on a display of a client computer shown in FIG. 1.
Figure 18:
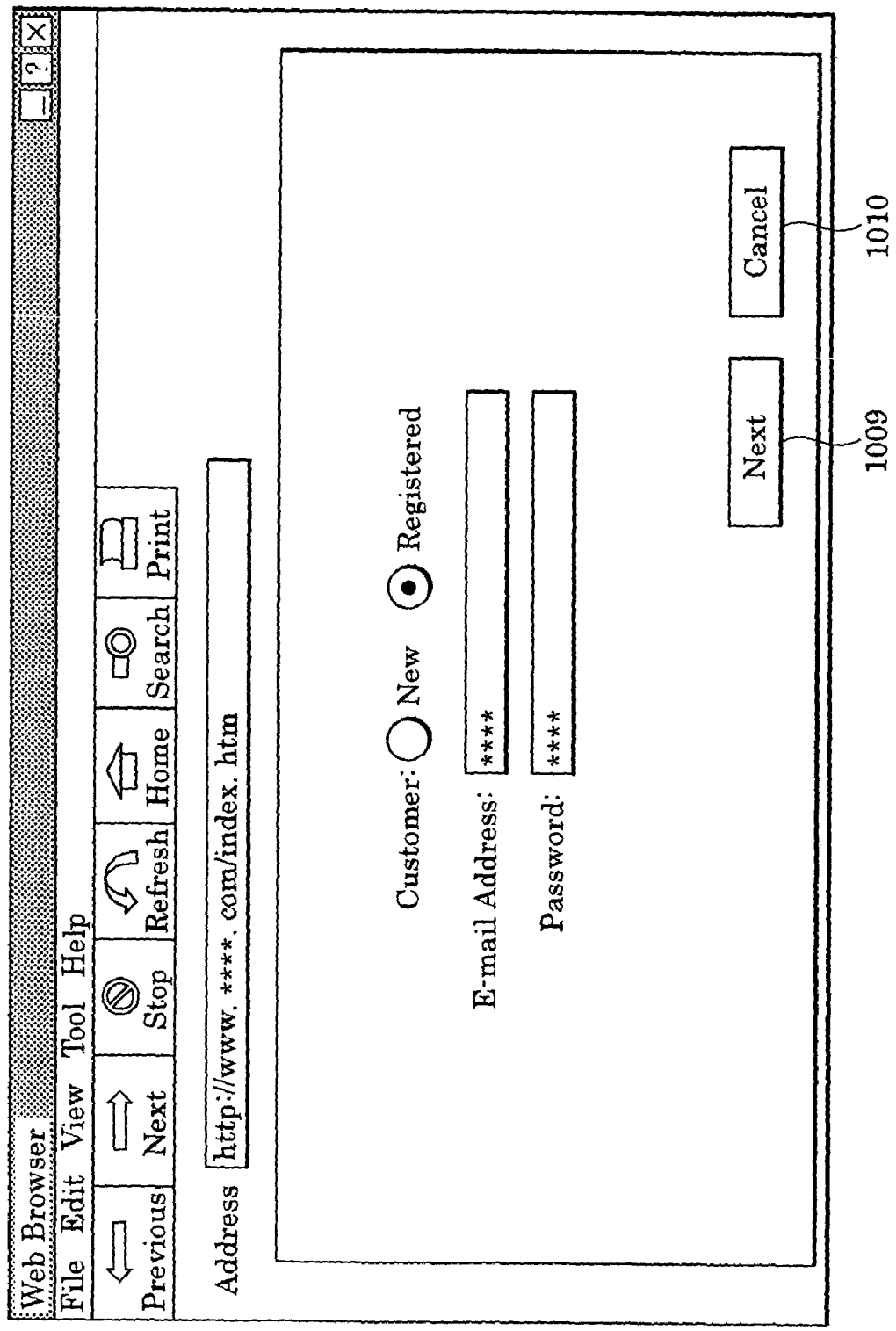
FIGS. 18 to 25 are diagrams showing a web browser displayed on a display of a client computer shown in FIG. 1, at various stages of sending electronic document data.

In response, a request for the HTML file of the job submit page is transmitted from the web browser of the client computer 103 to the web server 751 on the MFP 102. In this state, if the OK button on the printer driver is clicked, a job submit screen appears on the browser of the client computer 103 as shown in FIG. 16.

In this job submit screen, if an MFP key 911 on the left-hand side is clicked, the MFP 102 is selected as a destination printer. If one of provider keys 912 to 914 (the job submit screen may include more provider keys, if necessary) is clicked, a print order command is issued.

In the web browser (shown in FIG. 16) displayed on the display of the client computer 103, a job ticket is issued as shown in FIGS. 17A to 17C.

Referring again to FIG. 15, in step S712, it is determined whether the MFP key 911 is clicked. If the MFP key 911 is not selected, an order is submitted as described below with reference to transmission method #1. Access is provided to a web page of a provider for the user to make an order via the web browser of the client computer 103 (step S721). A provider function setting screen is displayed via the web browser (step S722) for the user to select desired settings. A job ticket is selected (step S723). A print job for the job ticket is submitted (step S724) and the print job is generated (step S725). Processing then ends.

On the other hand, if the MFP key 911 is selected (in step S712), functions available in the MFP 102 and associated parameters are displayed based on information supplied from the web server 751, as shown in FIG. 16 (step S713).

The user sets parameters 932 in the job submit screen shown in FIG. 16. The parameters can be set for a particular parameter group by clicking one of parameter group buttons General 922, Job Mgmt 923, Finishing 924, Image Quality 925, and Color 926.

If a Save key 931 is clicked, setting data is stored or read into or from a specified file. Printing is possible not only for a file requested by an application but also for any printable file located on the network by specifying its file name.

In the case in which printing is performed using the MFP 102, if a Print key 927 is clicked after selecting settings has been completed, the PDL file and a job ticket are transmitted to the hot folder 752 (steps S714 and S715).

In the MFP 102, the hot folder 752 is periodically checked (step S761) to determine whether the hot holder 752 receives a job (step S762). When a job is detected, if the job is printable, scheduling of outputting of the job is performed (step S763). The job data is then converted into raster image data (step S764) by a raster image processor (RIP) and printed (step S765) using the MFP 102. If the printing is completed, the process is ended.

Command/data transmission for submission of an order is possible according to one of three methods described below.

Transmission Method #1 (Client→Provider): When each provider has a web page for job order reception, if one of provider keys 912 to 914 is clicked in the screen shown in FIG. 16, a provider indicated by URL input in the web browser displayed on the MFP 102 is accessed, and a web page of the provider corresponding to the clicked provider key appears on the web browser. After settings are performed via this web page, an order is submitted. In this process, the PDL data and the job ticket are directly transmitted from the client computer 103 to the provider by means of peer-to-peer transmission.

Transmission Method #2 (Client→MFP→Provider (RIP)): First, PDL data is transmitted to the MFP 102 from the client computer 103. The MFP 102 transfers the received PDL data to the provider. In this case, data transmission is always performed between the MFP 102 and the provider, and thus devices to which communication is performed are clearly known. This makes it possible to achieve high security in communication. Furthermore, if necessary, the MFP 102 can perform test printing before a print order is issued. This allows a reduction in possibility of placing an incorrect order.

In this technique, it is sufficient to inform only the MFP 102 of the functions available in the providers. To obtain the latest information, the MFP 102 periodically acquires the information on the functions available in the providers, or each provider sends, to the MFP 102, information in the XML format indicating the functions available in the provider each time functions are updated. This makes it possible to display the latest information on the order screen.

Transmission Method #3 (Client→MFP (RIP)→Provider): The data rasterized by the MFP 102 may be compressed before it is transmitted to the provider from the MFP 102. Although the compression of data has many advantages, the compression also has a disadvantage that it becomes not easy to perform a prepress process such as a layout process. If necessary, a password may be embedded in the compressed data to achieve higher security.

A proper one of the three transmission techniques may be selected depending on the situation or a combination of those techniques may be used.

The timing of issuing a request for the HTML file of the job submit screen shown in FIG. 15 is discussed below. In the conventional printer driver, the process is performed sequentially as described earlier. In the present embodiment, in contrast, the job submit screen is displayed on the web browser in response to a print command, and a print command is again issued via this job submit screen. More specifically, when the OK button 801 on the printer driver setting screen shown in FIG. 12 is pressed, the client computer 103 accesses the web server 751 of the MFP 102 and concurrently performs data conversion into PDL form. When a user is setting a job ticket via the job submit screen displayed on the web browser of the client computer 103, the conversion process is performed. Thus, the conversion process is completed before the user clicks the print button on the job submit screen, and both the PDL data and the job ticket are transmitted at the same time to the MFP 102 when the print button is clicked.

Alternatively, PDL data may be stored in advance in the hot folder 752 shown in FIG. 15, the HTML file of the job submit page may be requested after a message indicating that the PDL data has been registered is received from the server. In this case, the PDL data has already been registered in the server, and only the job ticket is transmitted.

In response to receiving the request for the HTML file, the web server 751 on the MFP 102 transmits the HTML file of the job submit screen to the client computer 103. On receiving the HTML file, the client computer 103 displays the job submit screen (step S711). At this stage, the user may modify the job ticket if necessary. When the process of producing the PDL file in step S705 is completed, the PDL file and the modified job tickets are transmitted to the hot folder 752.

Referring again to FIG. 16, job processing conditions are specified in a job ticket 932. When a job is output to the MFP 102, the number of parameters to be specified is small as shown in FIG. 17A. If the Provider key 912 or 913 is clicked, the area for setting the job processing conditions (that is, the job ticket setting area) 932 is switched to that shown in FIG. 17B or 17C, depending on the selected provider, such that the user can specify processing conditions.

The roles of the respective managers in the provider environment shown in FIG. 1 are described below.

Process Control Manager 111

In a centralized control system called a management information system (MIS), data associated with production is collected, edited, and reported to an executive to assist him/her in planning and managing business. In the MIS system, collected and stored information is supplied to a person who needs the information when the information is needed.

The process control manager 111 is a computer serving as a key device in the MIS system. The process control manager 111 collects and manages a large amount of information in the form of a database that allows a user to use much information that would not be handled without the MIS system.

The data accumulated in the process control manager 111 is used when a decision is made in an application, in particular, as to scheduling of production or process such that operations are performed in an optimum manner by devices and/or operators in order to achieve high productivity.

Order/Document Reception Manager 112

The order/document reception manager 112 shown in FIG. 1 is a computer serving as an intermediary in electronic commerce. More specifically, the order/document reception manager 112 is responsible for receiving and issuing an order via the Internet.

When seen from users, the order/document reception manager 112 looks like as an electronic shop using the Internet. When a user accesses the order/document reception manager 112, if user authentication is successfully passed, the user transmits a job order command together with electronic data to be processed to the order/document reception manager 112.

In the case of the transmission method #1 described above, a document in the form of electric data is sent using a common web browser.

FIGS. 18 to 25 show examples of manners in which information is displayed in the web browser on the display of the client computer 103 shown in FIG. 1 when electronic data is sent, wherein contents displayed in the web browser vary depending on the situation.

On the user's computer, a service screen (FIG. 18) is opened on the web browser in accordance with screen data supplied from the provider. If the user is a registered user, a user ID (for example, e-mail address) and a password are input.

Figure 19:
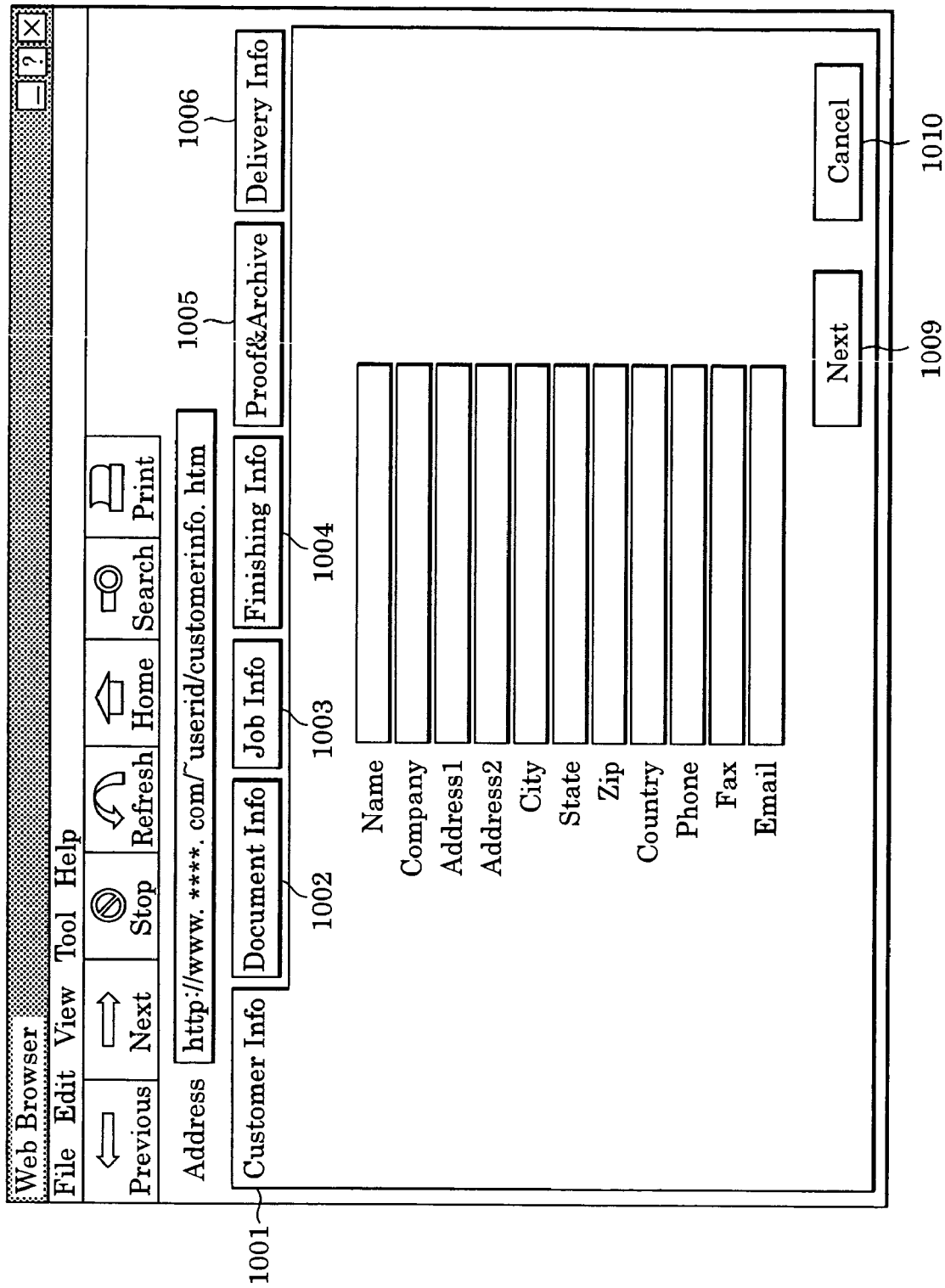

In a case in which a user accesses this web site for the first time, a New button is selected and further a Next key 1009 is clicked. In response, an input window such as that shown in FIG. 19 is opened. In this input window, the user inputs necessary entries (such as a name, company name, address, telephone number, facsimile number, e-mail address, etc.) for registration.

In FIG. 19 or other similar figures, if a cancel key 1010 is pressed, the accessing to the site is terminated. Although in this specific example, necessary entries are simply input, additional inputting of a password or the like to authenticate the user and opening of an account may performed to ensure security.

Figure 20:
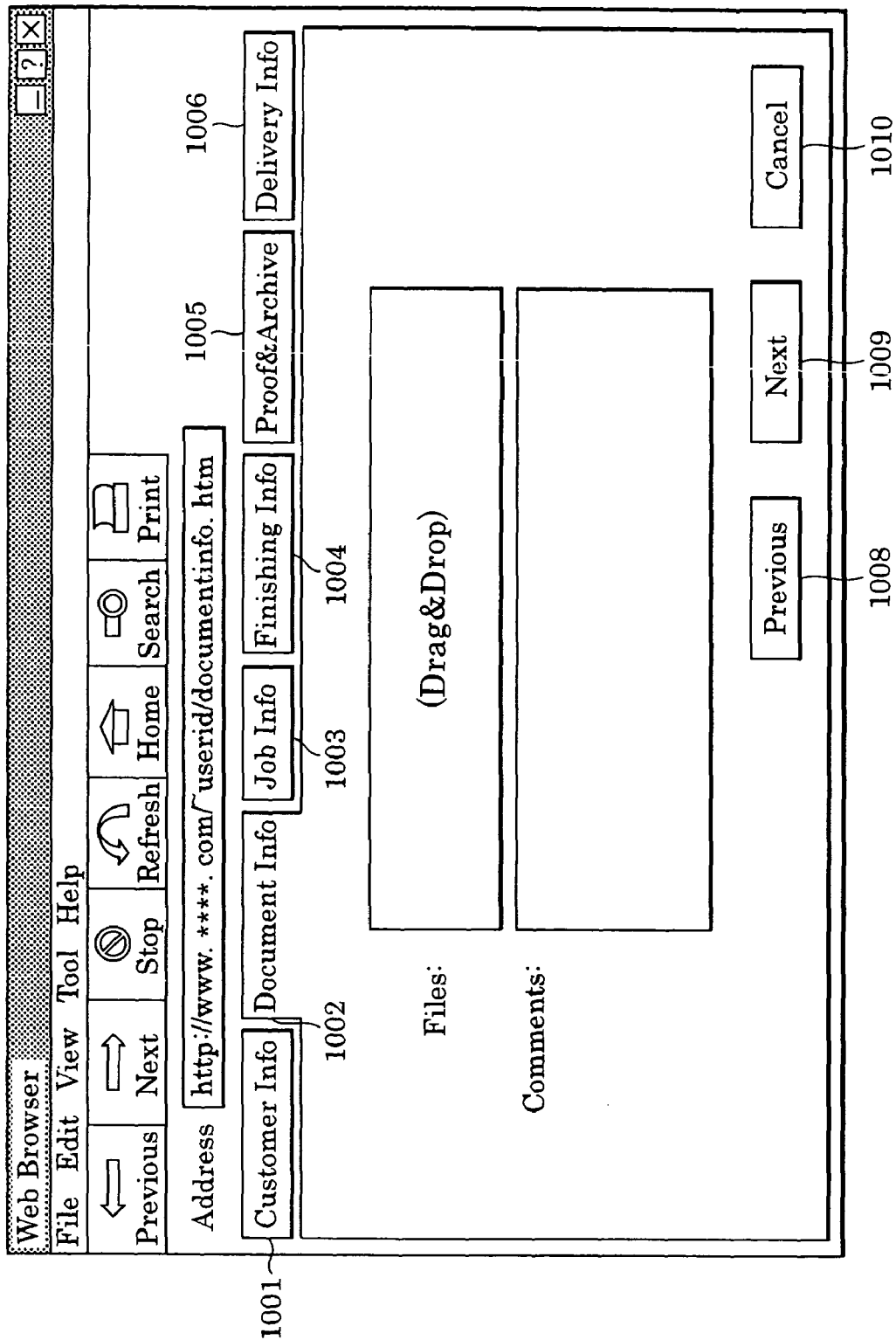
Figure 21:
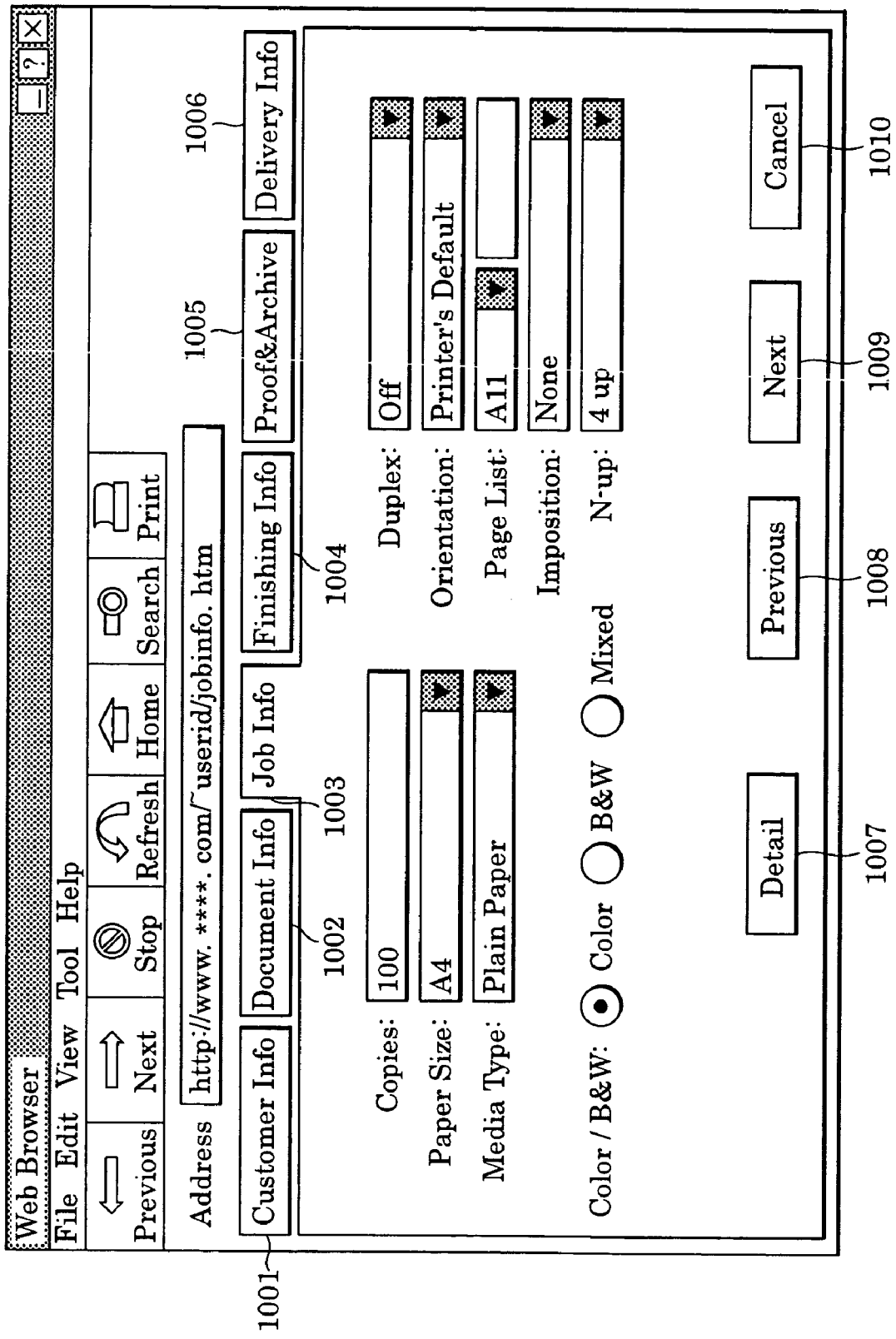

Thereafter, in the screen shown in FIG. 20, the user attaches electronic data to be printed to the screen by dragging and dropping and enters a comment if desired. If the next key 1009 is pressed (in step S1054 in a flow shown in FIG. 26 described later), the screen is switched to that shown in FIG. 21. In the screen shown in FIG. 21, entries of a job ticket are input to specify processing conditions of the job (in step S1055 in the flow shown in FIG. 26 described later). If the next key 1009 is clicked, the screen is switched to that shown in FIG. 22.

Figure 22:
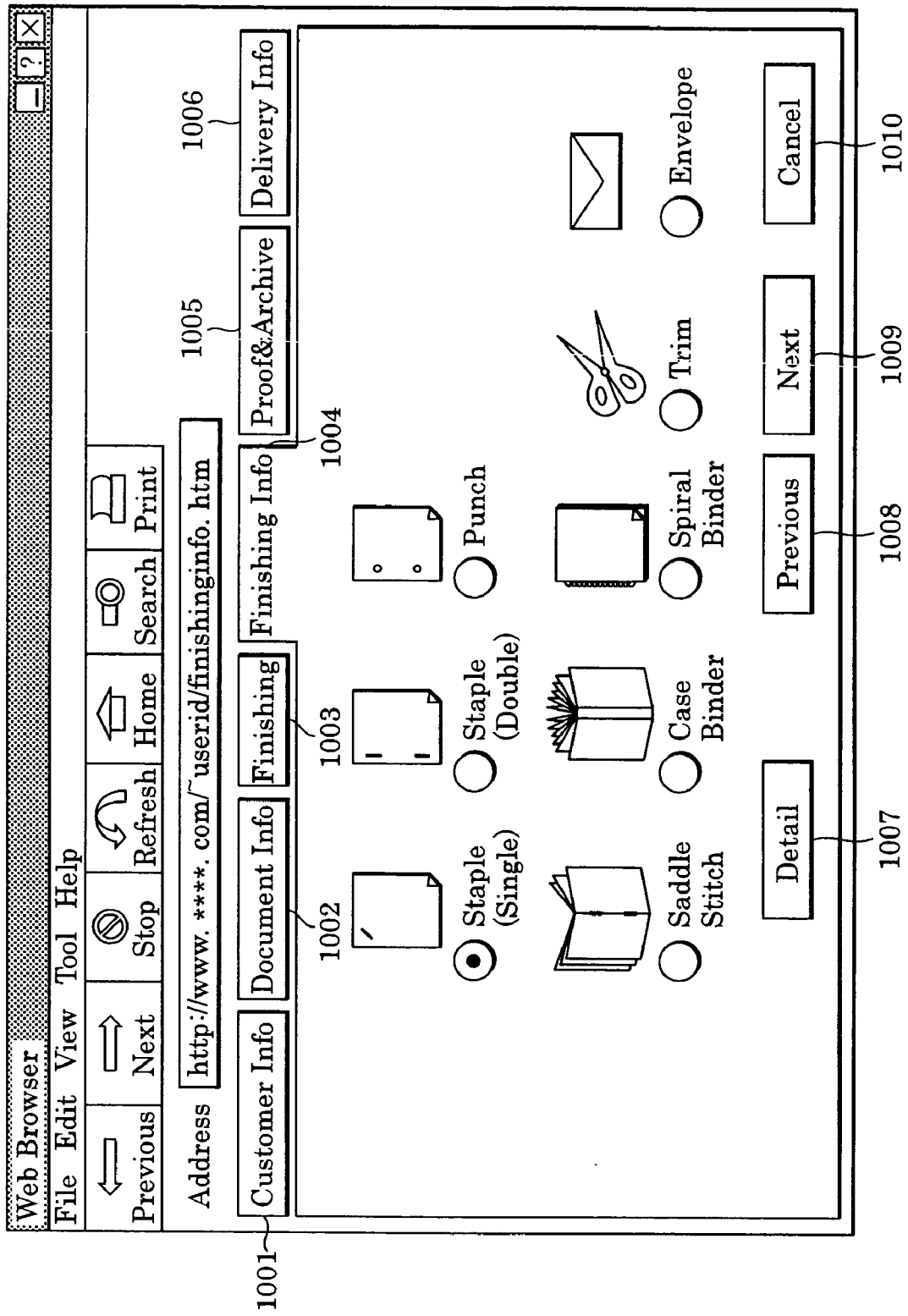

In the screen shown in FIG. 22, a desired finishing process is selected (in step S1056 in the flow shown in FIG. 26 described later). Thereafter, if the next key 1009 is clicked, the screen is switched to that shown in FIG. 23.

Figure 23:
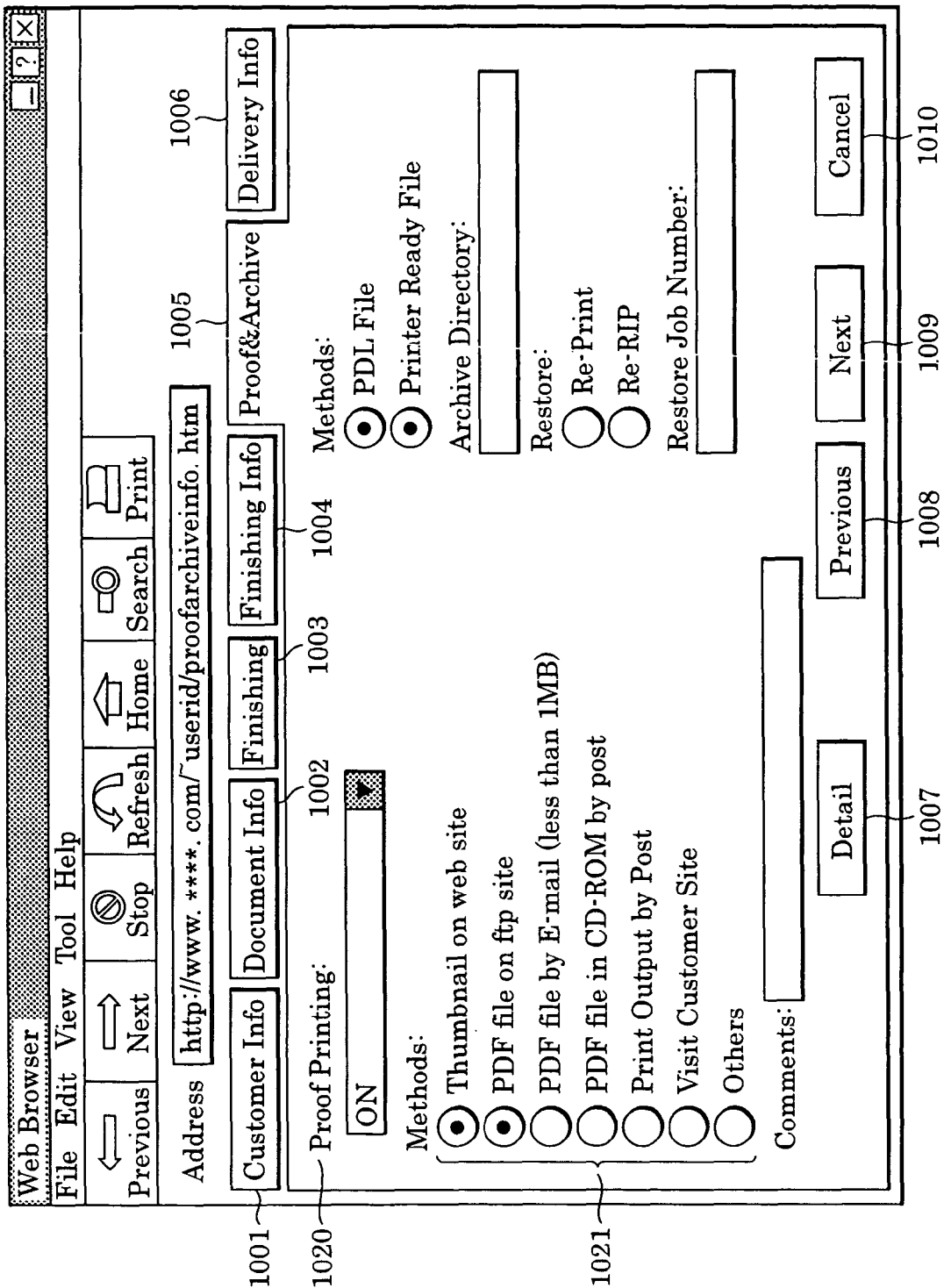
Figure 24:
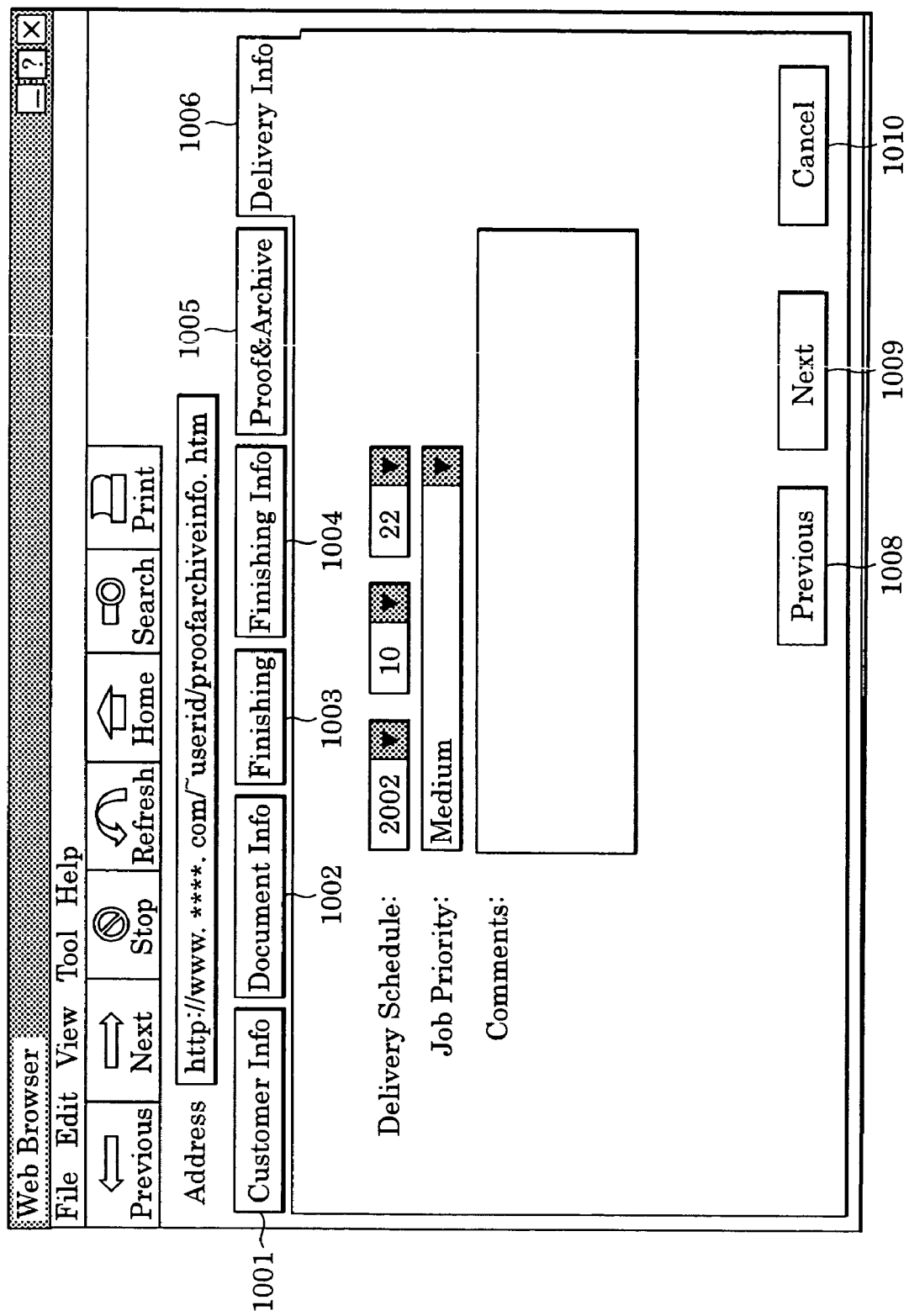

In the screen shown in FIG. 23, a selection as to whether proof printing is necessary is made in column 1020, and a proof mode (form) is specified by checking one or more buttons 1021. Furthermore, other information such as archive information is input (in step S1057 in the flow shown in FIG. 26 described later). Thereafter, if the next key 1009 is clicked, the screen is switched to that shown in FIG. 24. In the screen shown in FIG. 24, information indicating the delivery time is input (in step S1058 in the flow shown in FIG. 26 described later). Thereafter, if the next key 1009 is clicked, the screen is switched to that shown in FIG. 25.

Figure 25:
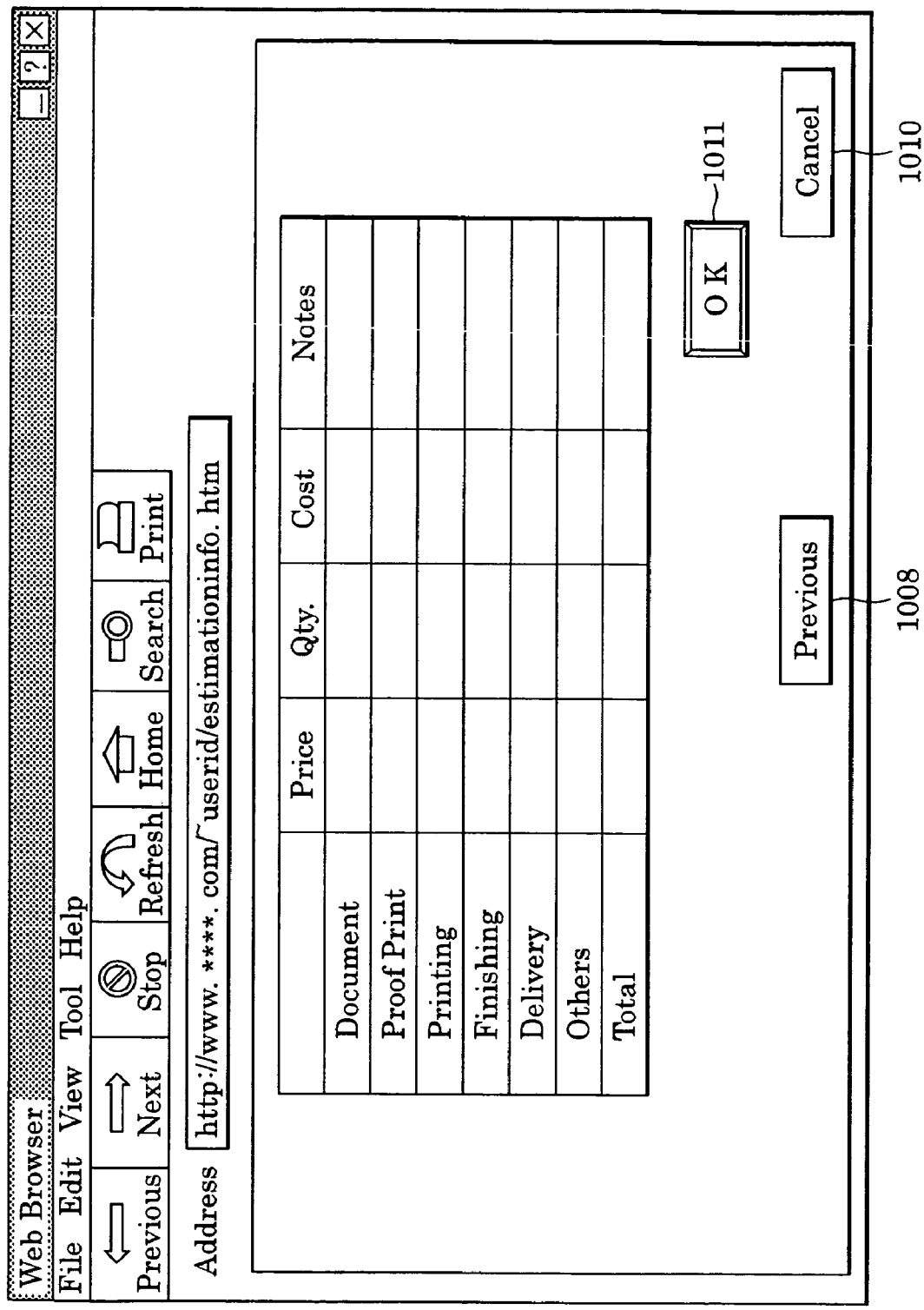

In the screen shown in FIG. 25, the estimated price is displayed. If the user accepts the proposed price, the user issues a tentative order command. The price is calculated depending on whether the user is a new customer or a valued customer, the job size, the processing conditions including the number of copies specified in the job ticket, the finishing conditions, the method of proof and the number of times proof is presented, archive or reprint information, and/or the delivery time. Because the user can get information indicating the estimated price before the tentative order command is issued, troubles caused by the price can be avoided. If the proposed price is not acceptable, the user may modify the settings by using information tabs (customer information tab 1001, document information tab 1002, job information tab 1003, post process information tab 1004, proof and archive information tab 1005, and/or delivery information tab 1006), the Return key 1008, and/or the Next key 1009. Thereafter, the price is estimated again.

Figure 26:
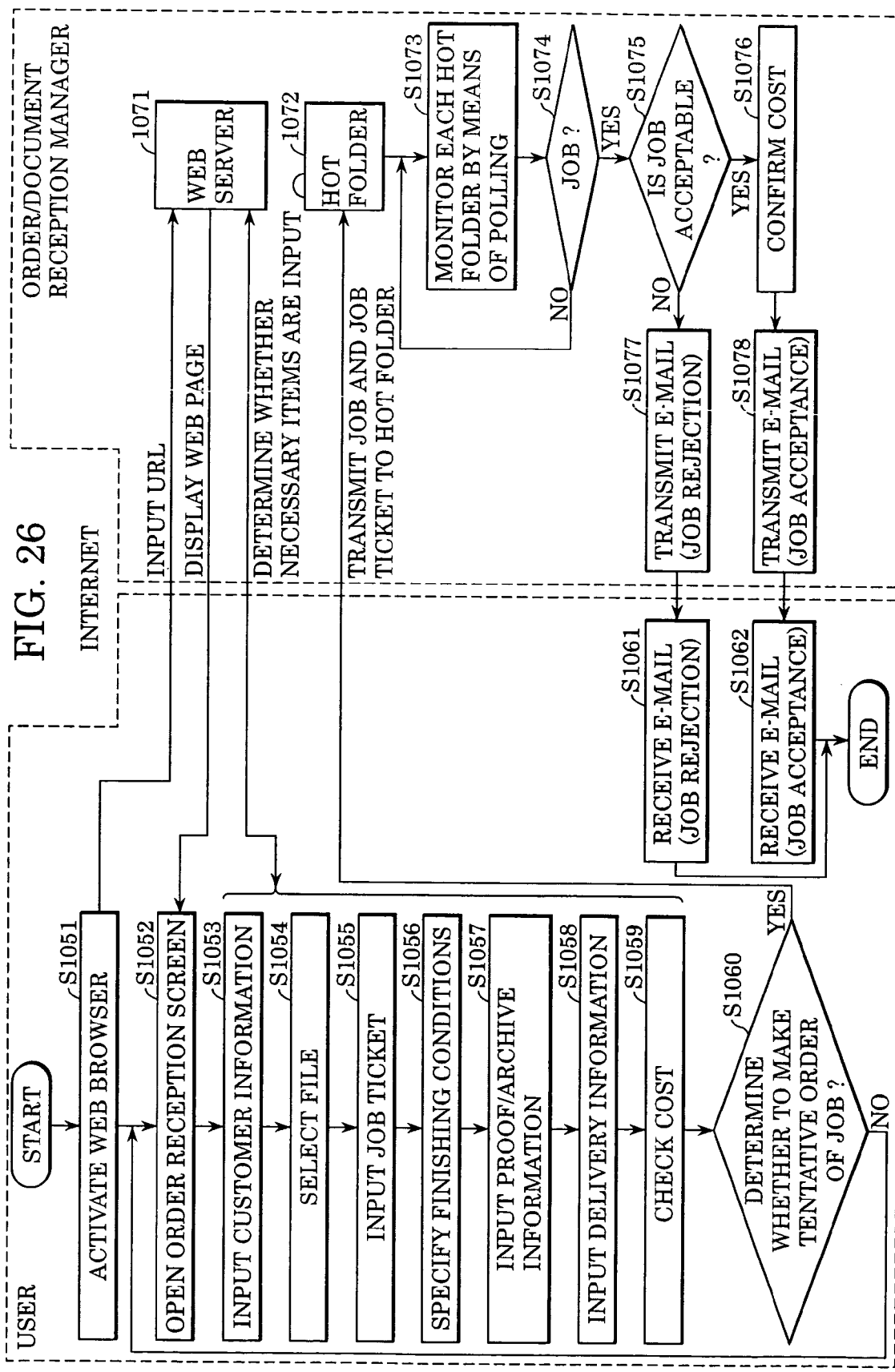
FIG. 26 is a flow chart showing an example of a job ordering process performed in an image processing system according to the present invention.

When the proposed price is acceptable (if the answer to a decision step S1060 in FIG. 26 is Yes), if the OK key 1011 is clicked, the tentative order command is issued. Because the order command issued at this stage is tentative, the processing conditions specified in the job ticket can be modified at a later time, for example, when the proof checking is performed.

If the job is accepted by the order/document reception manager 112 as described above, information on the job is sent to the process control manager 111. In response, the process control manager 111 starts controlling of the job. First, the process control manager 111 issues JDF data of the job.

The process control manager 111 in the provider environment has service screen data that is supplied to users to display the screens shown in FIG. 18 to 24 and also has a program for checking whether entries are correctly input.

The process described above is shown in the form of a flow chart in FIG. 26 and described in further detail next.

FIG. 26 is a flow chart showing the job ordering process performed in the image processing system according to the present invention, and this process corresponds to the process performed via the web browser screens shown in FIGS. 18 to 25. In this flow chart shown in FIG. 26, steps S1051 to S1062 are performed via the web browser screen displayed on the client computer 103, and steps S1073 to S1078 are performed by the order/document reception manager 112.

The user activates the web browser (S1051) and then repeatedly performs the above-described inputting operation (opening of the order setting screen (S1052), inputting of customer information (S1053), selection of a file (S1054), inputting of the job ticket (S1055), specifying finishing conditions (S1056), inputting proof/archive information (S1057), specifying delivery time (S1058), and evaluation of the proposed price (S1059)), via the web browser screens for tentative order displayed based on the information supplied from the web server 1071 of the provider, until the user accepts the proposed price and issues the tentative order command (step S1060). If the tentative order command is issued, the file (image data) selected by the user and the job including data indicating printing conditions are transmitted from the user's apparatus to the hot folder 1072 of the order/document reception manager 112. The hot folder may be prepared for each user.

In the order/document reception manager 112, the hot folder 1072 is periodically checked to determine whether the hot holder 1072 receives a job (step S1073). When a job is detected (step S1074), it is determined whether the job is acceptable (step S1075). If the job is acceptable, the job is accepted (step S1076), and the accepted job is transferred to the process control manager 111. In this case, an acceptance message is transmitted to the user via the web screen (step S1078).

On the other hand, if it is determined in step S1075 that the job is not acceptable, a rejection message is sent to the user via the web screen (step S1077).

On receiving the acceptance or rejection message sent from the web server 1071, the message is displayed on the web browser of the user's apparatus (steps S1061 and S1062), and the process is ended.

When the transmission method #2 or #3 (described above) is used, if the MFP 102 is registered in the service center or the provider and signs a necessary contract with the service center or the provider when the MFP 102 is initially installed or when maintenance is performed, the service center or the provider can identify whether the MFP 102 is an authorized user simply by checking whether the MFP 102 is already registered, and thus the ordering process can be easily performed without having to perform complicated operations described earlier. A window screen having the same format such as that shown in FIG. 16 can be used when job data is output to the MFP 102 in the user environment and also when an order for a job is submitted to the provider. This reduces the possibility that an error will occur in placing an order.

Document Edit/Scan Manager

The document edit/scan manager 113 shown in FIG. 1 performs scanning and editing of a document under the control of the process control manager 111.

Editing of a job includes merging of a plurality of files received from a user, inserting or deleting of a page, laying out of pages according to an instruction given by the user, and providing a preview image indicating an expected result that will be achieved after completion of a specified post process.

Figure 27:
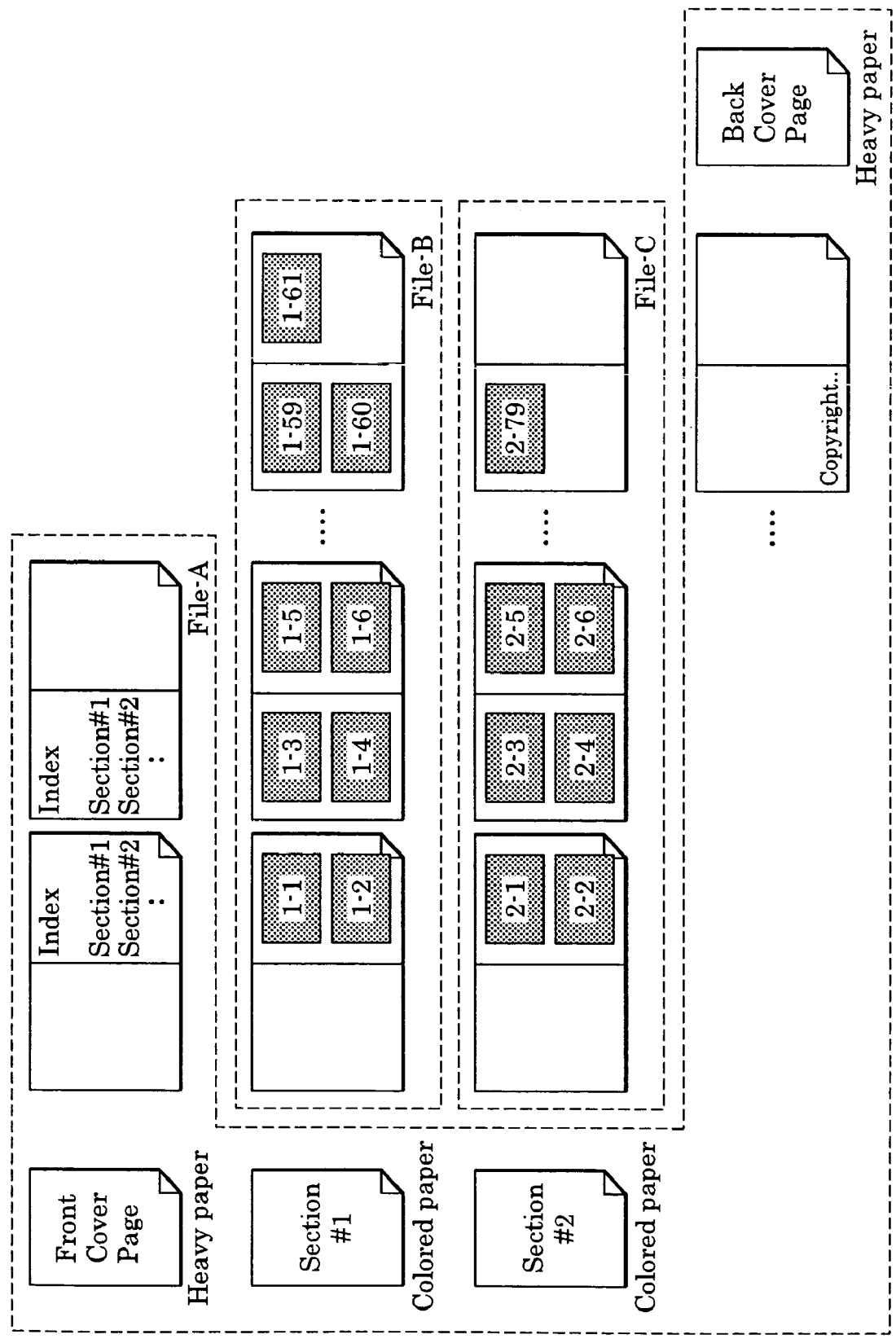
FIGS. 27 to 29 are diagrams showing examples of a manner in which files received from the user environment are edited and post-processed in the provider environment shown in FIG. 1.
Figure 28:
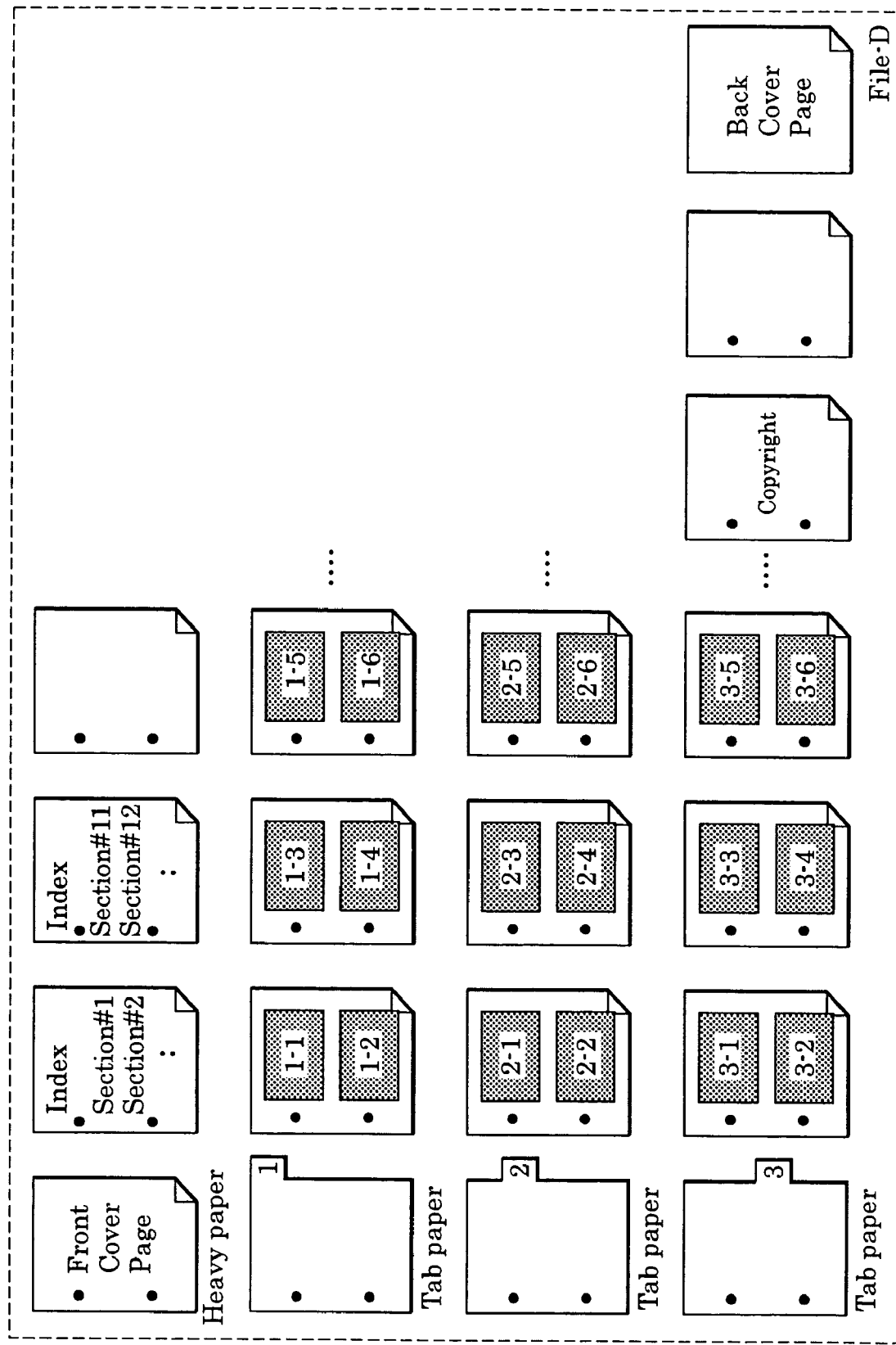
Figure 29:
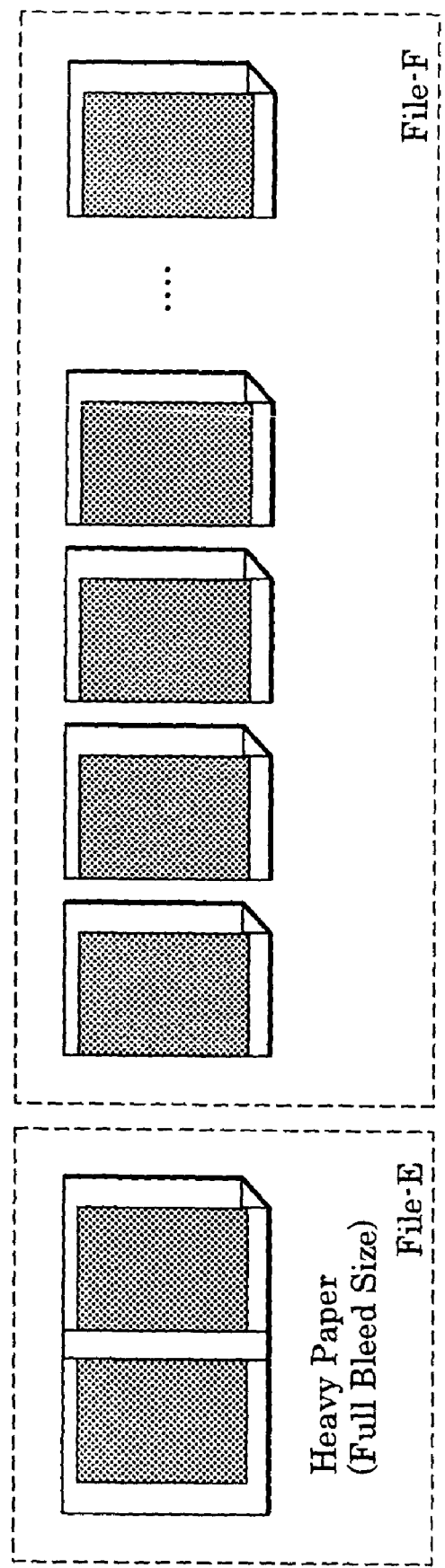

FIGS. 27 to 29 show examples of ways in which files A to F received from the user environment 100 are edited and post-processed in the provider environment 110 shown in FIG. 1.

In the example shown in FIG. 27, a job received from a user includes files A to C. The file A is specified by the user to be output in the original size. On the other hand, the files B and C are specified by the user to be output in a 2-in-1 form. As with this example, the user has to specify the size in which the document should be edited. When it is necessary to output files in a particular order, the user has to specify the order when the user supplies the job to the provider.

In the example shown in FIG. 28, a job received from a user includes only one file D. The file D is specified by the user to be output on a special medium (tab paper in this specific example), punched, and stapled. In this example in which the file is output on the special medium, and punching and stapling are required, the user has to provide information to the provider when the job is sent to the provider, to indicate the medium to be used and the post process conditions associated with punching and stapling, although the job includes only one file.

In the example shown in FIG. 29, a job received from a user includes a file E and a file F. The files E and F are specified by the user to be case-bound, and different paper sizes are specified for the files E and F. When the job is output on a particular paper size as is the case with the present example, the user specifies the paper size when the user sends the job to the provider.

Information indicating processing conditions such as those described above is issued, for example, in step S1055 or S1056 shown in FIG. 26 via an order placement screen described later.

As described above, the file received from a user is not necessarily in the same form as the final form specified by the user, and thus editing into the specified form is performed by the document edit/scan manager 113 in the provider environment.

Furthermore, when the job received from a user includes a plurality of files that are different in type or that are produced using different applications, it is necessary to combine the plurality of files into a single file. This is also performed by the document edit/scan manager 113.

The editing process is performed by the document edit/scan manager 113 in accordance with edit information supplied together with the document from the user, by executing a program on the document edit/scan manager 113 without an editing operation by an operator and/or manually by an operator of the client computer 103 by using an application program.

When scanning of a document is required, scanning is performed by the scanner 126 or the scanner unit of the MFP 124 or MFP 125 under the control of the document edit/scan manager 113. In the scanning operation, the document edit/scan manager 113 calls a scanner driver, and produces a preview image, scans the document, and making a quick copy by using a printer unit of an MFP. When a document given by a user is in the form of paper document, the document is converted into electronic document data by an operator by using the document edit/scan manager 113. In any case, the scanner driver is first activated on the document edit/scan manager 113.

Figure 30:
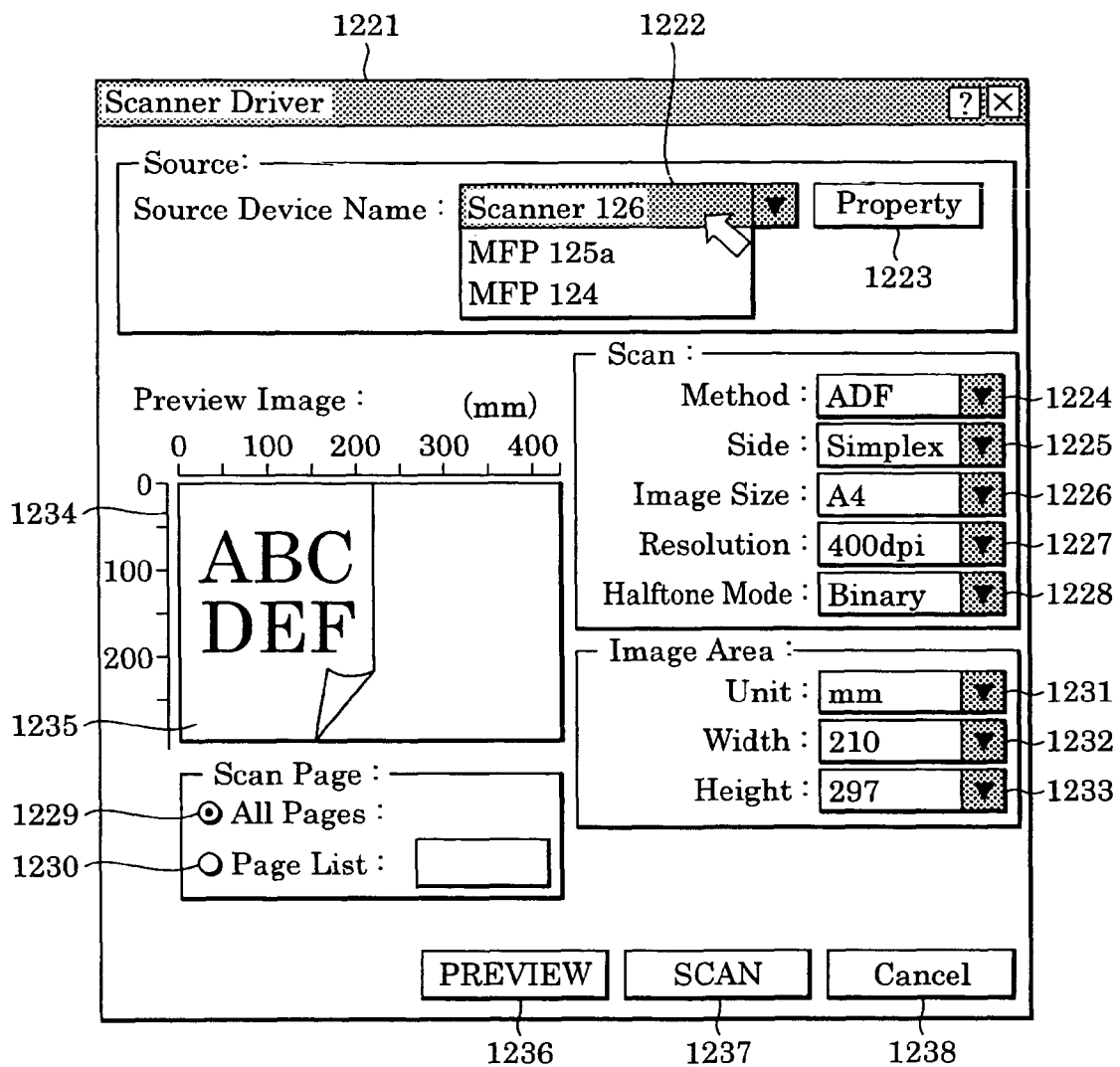
FIG. 30 is a diagram showing an example of a scanner driver GUI (Graphical User Interface) for issuing a scan operation command to an MFP shown in FIG. 1.

FIG. 30 shows an example of a scanner driver GUI (Graphical User Interface) for specifying conditions of the scanning operation performed by the MFP 102 shown in FIG. 1.

In the scanner driver GUI shown in FIG. 30, a scanner to be used is selected by specifying a source device name 1222, and parameters 1224 to 1233 are specified. Thereafter, if a scan preview key 1236 or a scan key 1237 is clicked using a pointing device or the like (now shown), scanning of an image is started. If a cancel key 1238 is clicked using the pointing device or the like (not shown), scanning is canceled. If a property key 1223 is clicked using the pointing device or the like (not shown), a window for setting properties of the scanner specified in the source device name field 1222 appears. A title bar 1221 indicates this window is used for setting properties of the scanner driver. A preview image 1235 is displayed in a preview area 1234.

Comprehensive Proof Manager

In many cases, the comprehensive proof manager 114 shown in FIG. 1 is used to check the layout and color tone. For monochrome documents, only the layout is checked.

In the printing market, before entering a prepress or printing process, a sample called a color comprehensive layout is presented to an orderer. The recent trend is toward use of a color printer or a color plotter to make a hard copy of a digital color image for the color comprehensive sample.

In the on-demand printing using a printer, comprehensive checking of layout and color tone and proof checking of details of color tone are both performed based on output using the same color printer (or the same monochrome printer). The comprehensive proof checking is performed under the control of the comprehensive proof manager 114.

Figure 31:
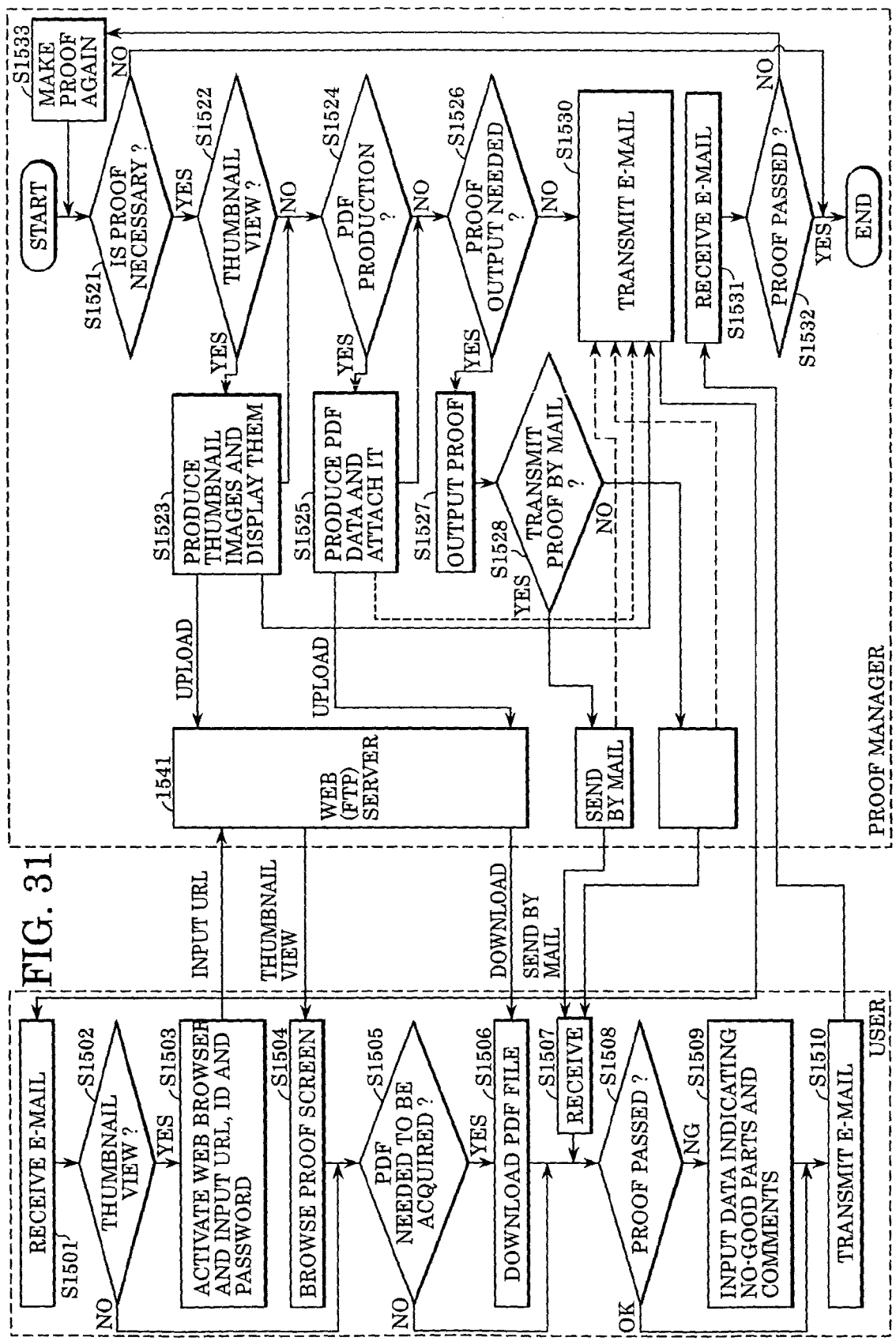
FIG. 31 is a flow chart showing a communication process performed between a comprehensive proof manager and a client computer shown in FIG. 1 and also showing a proof producing process performed by the comprehensive proof manager.

FIG. 31 is a flow chart showing a communication process performed between the comprehensive proof manager 114 shown in FIG. 1 and a user's computer and also showing a proof production process performed by the comprehensive proof manager 114. In FIG. 31, steps S1501 to S1510 are performed in the user environment and steps S1521 to S1533 are performed by the comprehensive proof manager 114.

As with the order/document reception manager 112, the comprehensive proof manager 114 also has a web server 1541 (the web server 1071 shown in FIG. 26 may be shared by the comprehensive proof manager 114 and the order/document reception manager 112). First, in step S1521, for a given job whose process is managed by the process control manager 111, it is determined whether proof is requested by a user (necessity for proof is specified in step S1057 in the flow shown in FIG. 26). If it is determined that proof is not requested, the process is immediately ended.

On the other hand, if it is determined in step S1521 that proof is requested, the process proceeds to step S1522 to provide a service (proof) according to a specified proof method (proof representation method) to the user.

In step S1522, it is determined whether proof in the form of thumbnail view is requested. If so, the process proceeds to step S1523, in which a thumbnail image is produced using the document edit/scan manager 113, and the resultant thumbnail image is uploaded to the web server 1541 such that only the authorized user can view the thumbnail view. The user checks the predicted final form of the job on the web browser.

FIGS. 32 to 36 show examples of thumbnails views displayed on the web browser in accordance with data transmitted from the comprehensive proof manager 114.

This web browser screen for comprehensive proof checking includes selection buttons 1601 for selecting either page order or print order, a page property key 1602, a document property key 1603, and a job property key 1604, which allow a user to switch the paper size and the paper type in units of pages, documents, or jobs. It is also possible to specify the number (N-up) of pages per sheet, the order in which pages are placed, the necessity of finishing, and the type of necessary finishing process.

Even in the case in which a job received from a user includes a plurality of documents that are different in file type or that are produced in different applications, thumbnail images are displayed on the checking screen in units of documents in response to a drag-and-drop operation.

Figure 32:
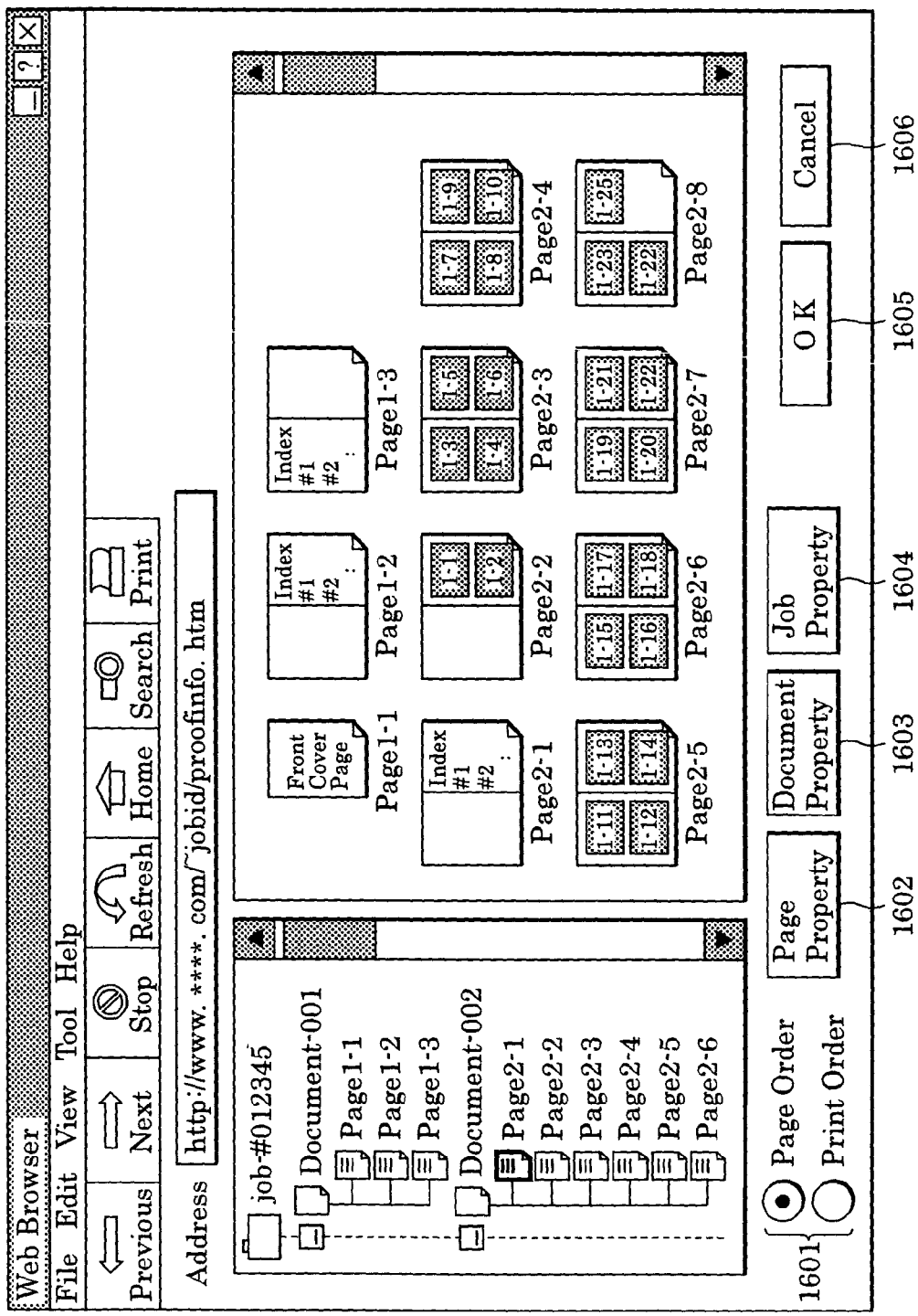
FIGS. 32 to 36 are diagrams showing examples of preview images provided by the comprehensive proof manager shown in FIG. 1.
Figure 33:
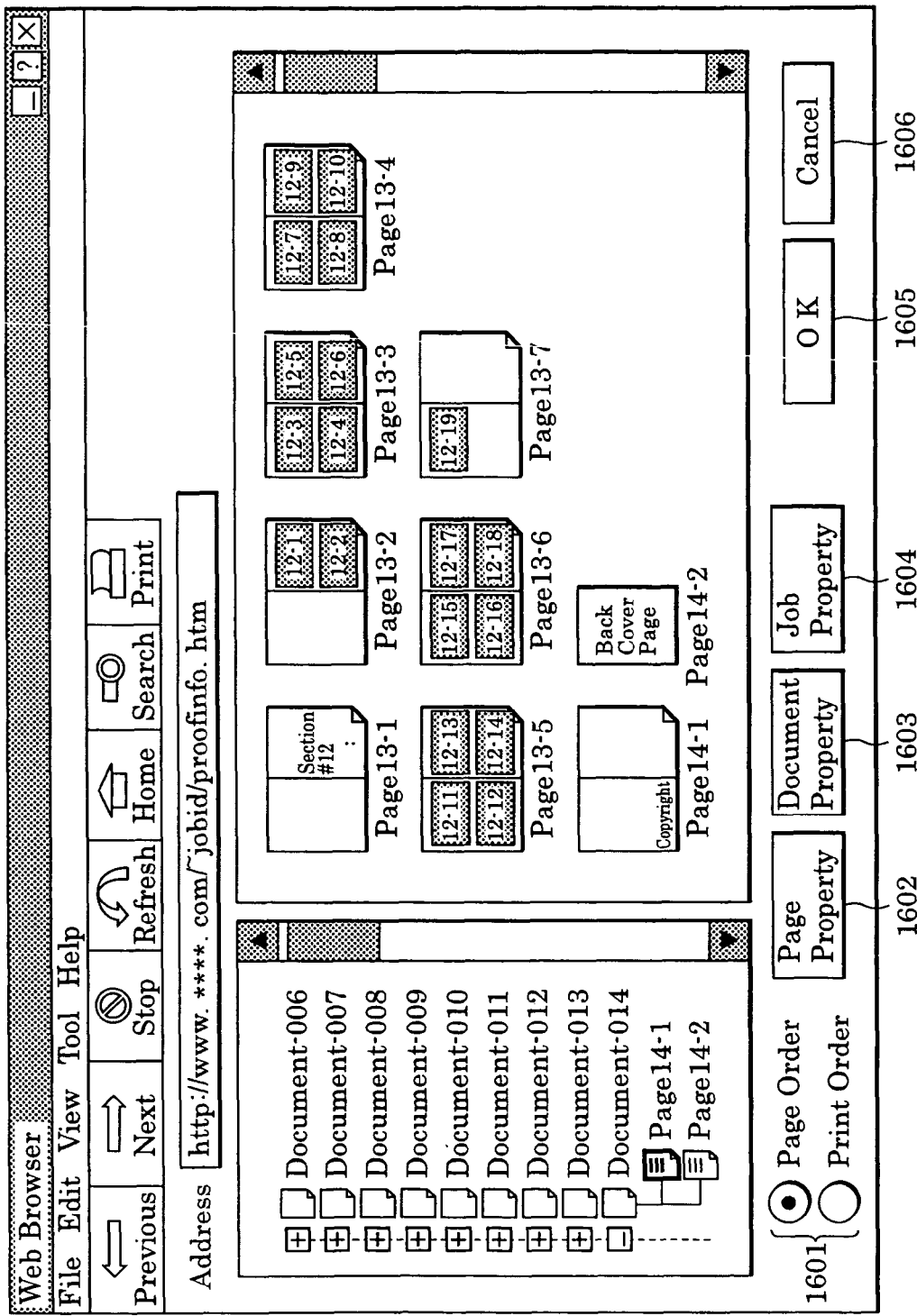

In examples shown in FIGS. 32 and 33, the thumbnail view is displayed in the page order. The layout is specified to be in 2-in-1 form for the 1st chapter (Document-001) and 14th chapter and 4-in-1 form for the other chapters. That is, in these examples shown in FIGS. 32 and 33, the number of pages placed on one sheet is varied in units of chapters (documents).

Figure 34:
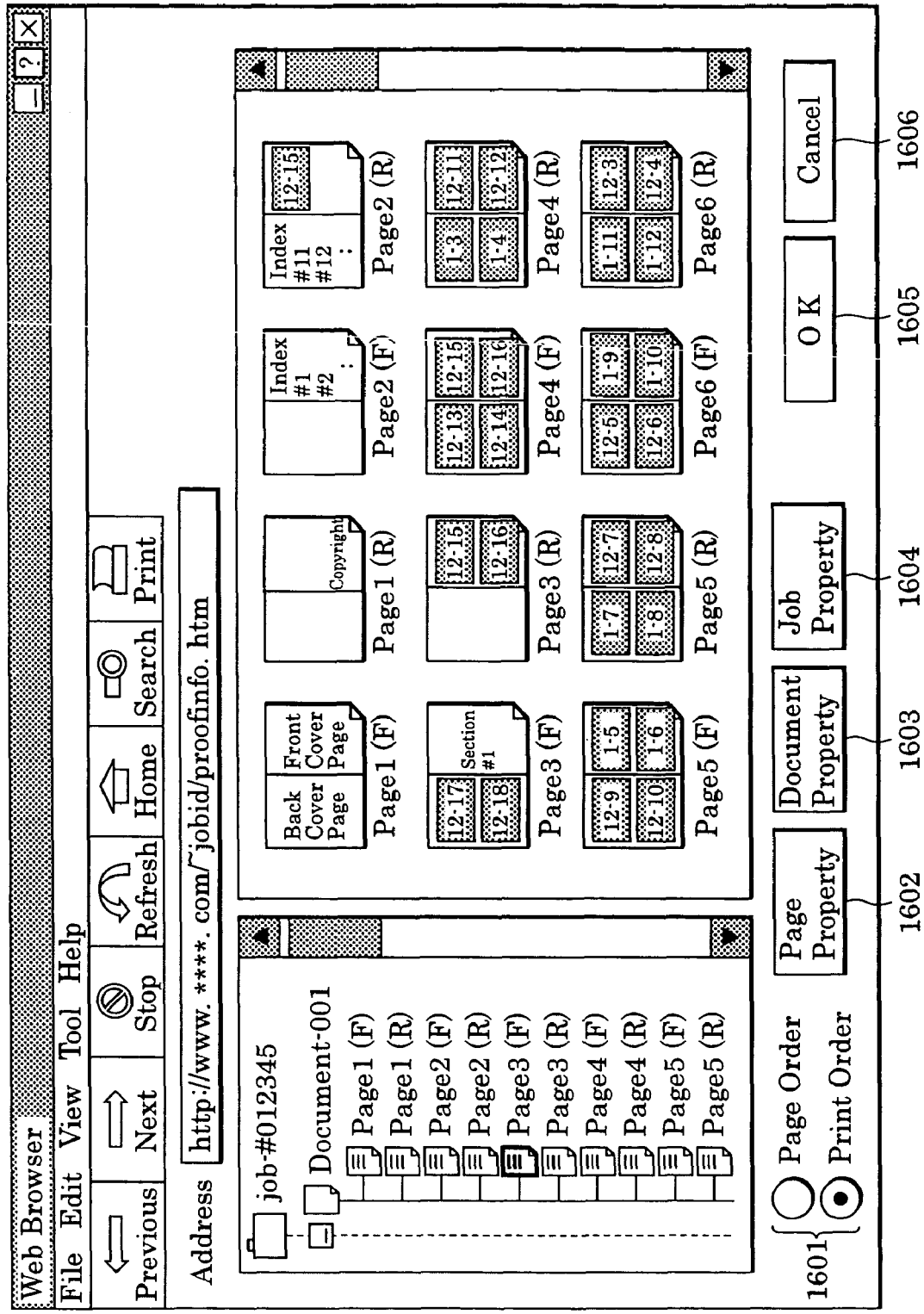

In the example shown in FIG. 34, the thumbnail view is displayed in the print order in accordance with the selection by the buttons 1601. In this specific example, pages are printed in the layout for the saddle binding.

Figure 35:
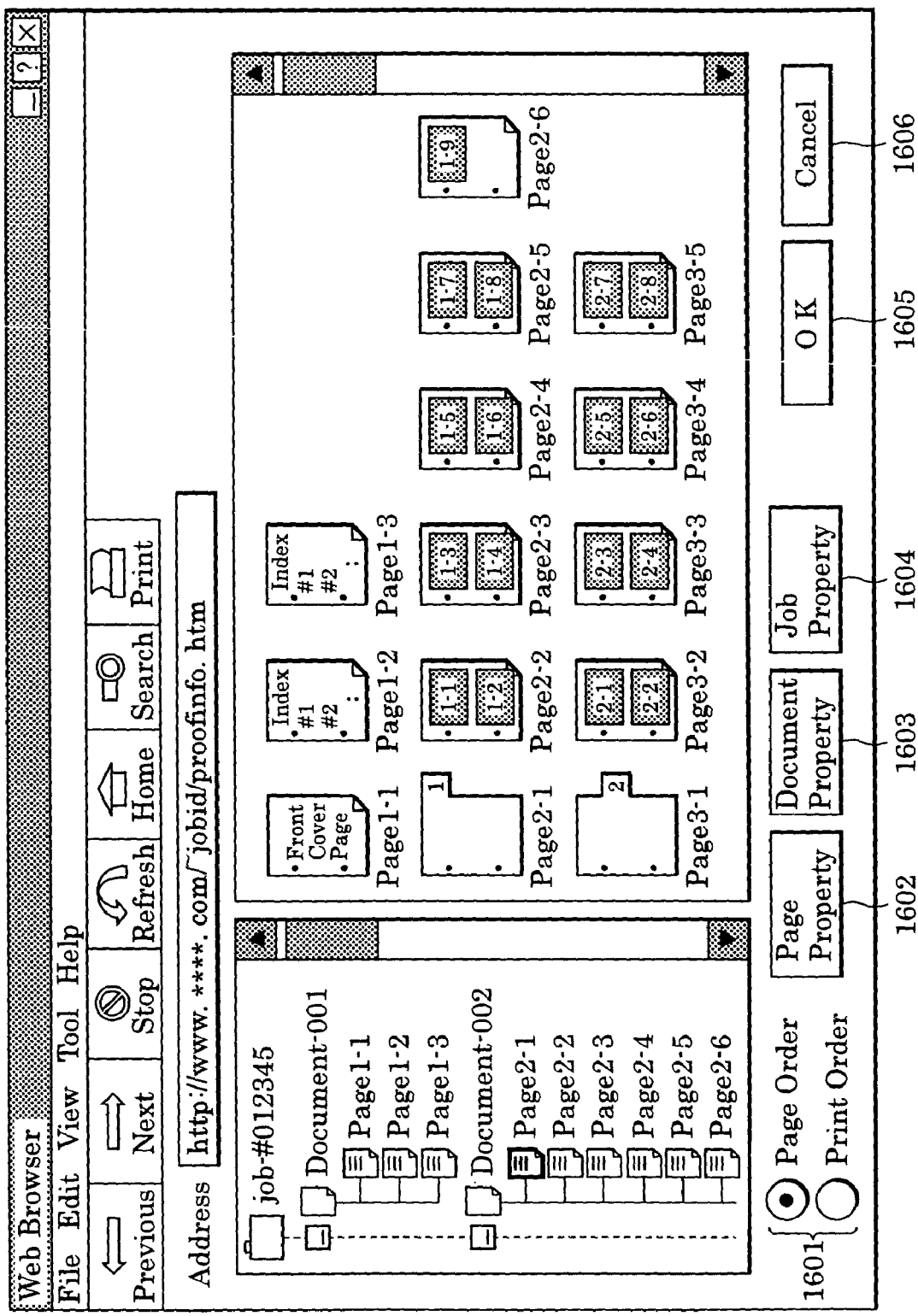
Figure 36:
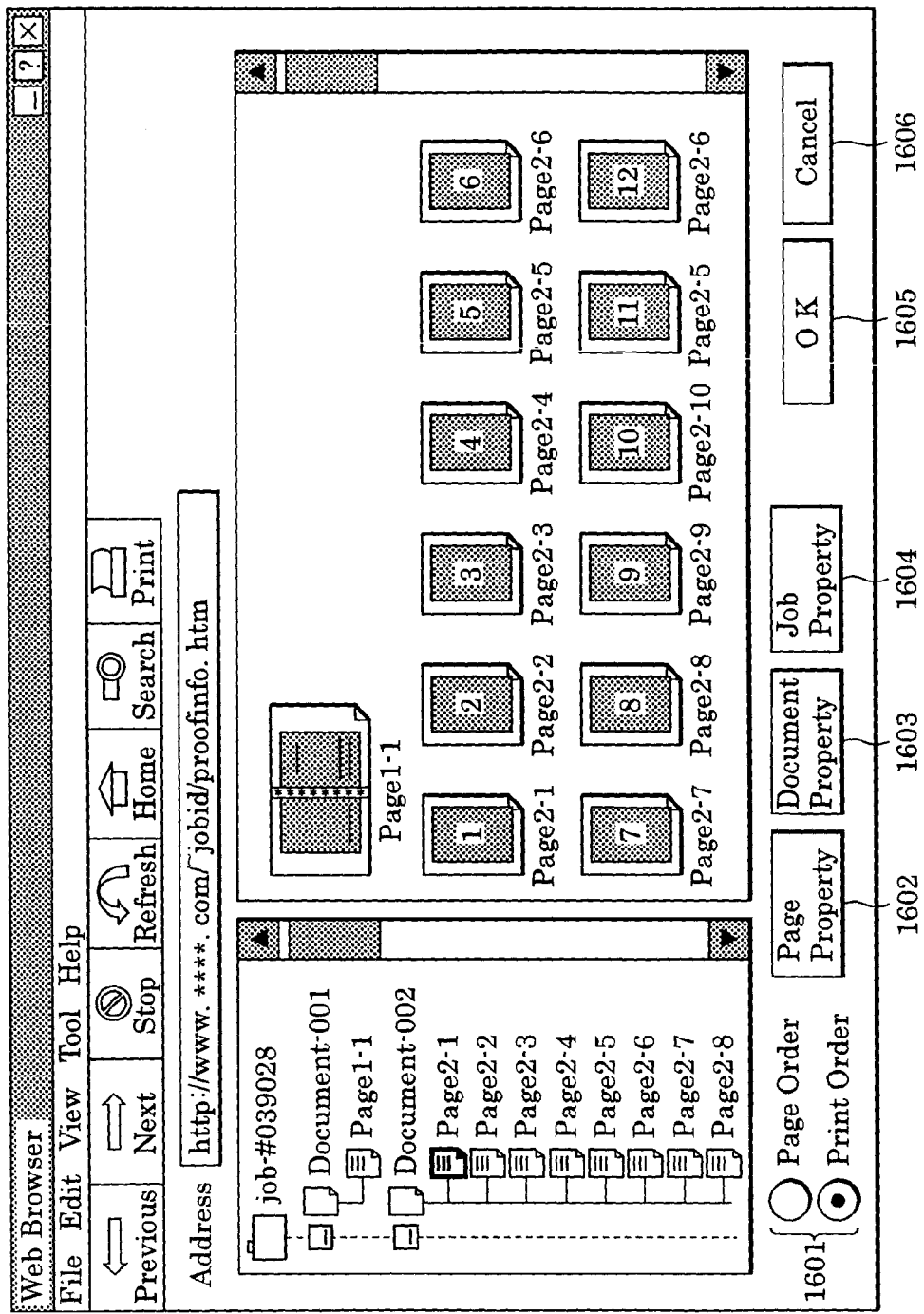

In the example shown in FIG. 35, tab paper is used for particular pages. That is, printing media are switched depending on pages. Positions of punched holes are indicated in the thumbnail view. In the example shown in FIG. 36, the thumbnail view indicates that larger size paper is used for cover and back cover pages than the other pages such that printed sheets can be case-bound.

Each of the window screens shown in FIGS. 32 to 36 includes a folder pane indicating the file structure and a pane indicating the thumbnail view. If any one of the pages in the thumbnail view is double-clicked, an enlarged preview image of the clicked page is displayed.

In the preview window screen such as those shown in FIGS. 32 to 36 or in a screen in which a PDF file downloaded from the web server 1541 is displayed, the user determines whether the proof is good.

If it is determined that the proof is good, the user sends e-mail to the address assigned to the comprehensive proof manager 114 or a particular operator in the provider environment to notify that the proof is good and that printing should be started.

However, if the proof is not good, the user sends e-mail to notify that the proof is not good and re-proof is required before printing is started. In this case, what is not good is described in the e-mail.

When the comprehensive proof manager 114 receives e-mail indicating that the proof is good and printing should be started, the comprehensive proof process is ended, and the printing process is started. However, when the comprehensive proof manager 114 receives e-mail indicating that the proof is not good and re-proof is required, an operator in the provider environment again performs editing and proof printing in accordance with the comment in the e-mail indicating what is not good.

As described above, by providing a thumbnail preview image on the window such as those shown in FIGS. 32 to 36 or by providing a PDF file (not shown) to a user, it becomes possible for the user to easily preview online expected forms of printed pages. This also makes it possible for the user to easily correct an error in proof or make a modification. In contrast to the conventional technique in which checking of proof is a complicated and troublesome task for users, the proof system according to the present embodiment allows users to easily check proof. Besides, proof is quickly provided to users at low cost.

On the other hand, if is determined in step S1522 in FIG. 31 that the thumbnail preview image is not specified as the form of proof, the process proceeds to step S1524. Note that after completion of step S1523, the process also proceeds to this step S1524. In step S1524, if it is determined whether proof in the form of a PDF file is requested. If so, the process proceeds to step S1525, in which a PDF file is produced, for example, using Acrobat Distiller® available from Adobe Systems® and presented to the user in a manner specified by the user (for example, via the web browser, uploading to an FTP site, or sending as a file attached to an e-mail).

On the other hand, in the case in which it is determined in step S1524 that a PDF file is not requested, the process proceeds to step S1526. Note that when step S1525 is completed, the process also proceeds to step S1526. In step S1526, it is determined whether proof output is required. If not, the process proceeds to step S1530, in which a URL of a web site where a PDF file is uploaded is described in e-mail and a thumbnail image or a PDF file is sent with the e-mail to the user.

On the other hand, if it is determined in step S1526 that proof output is required, proof is output (step S1527) and a determination is made as to whether sending by mail is specified as a method of delivery of the proof output (step S1528). If so, the proof output is delivered by mail. However, if not, the proof output is delivered to the user another way.

If the user in the user environment 100 receives the e-mail in step S1501, the process proceeds to step S1502. In step S1502, the user determines whether to display the thumbnail image. If so, the process proceeds to step S1503, in which the user actives a web browser and accesses the web page of the web server 1541 by inputting the URL in the web browser. In the web page, the user ID and the password of the user are input to acquire the thumbnail preview screen from the web server 1541.

In step S1504, the user checks the thumbnail preview image acquired from the web server 1541 via the thumbnail preview screen (FIGS. 32 to 36). Thereafter, the process proceeds to step S1505.

On the other hand, in the case in which it is determined in step S1502 that displaying of a thumbnail image is not performed, the process proceeds to step S1505.

In step S1505, a determination is made as to whether acquisition of a PDF file is necessary. If so, the process proceeds to step S1506, in which the PDF file is downloaded from the web server 1541. Thereafter, the process proceeds to step S1507.

When downloading of a PDF file in step S1506 is not performed, the process directly proceeds to step 1508.

In step S1508, the user checks the proof (which was received in step S1507). If the user determines that the proof is good and thus printing should be started, the process proceeds to step S1510.

On the other hand, if the user determines in step S1508 that the proof is not good (and thus reproof is necessary before printing is performed), the process proceeds to step S1509, in which the user describes in an e-mail what is not good. Thereafter, the process proceeds to step S1510.

In step S1510, an e-mail message indicating the result of checking of the proof (indicating that printing should be performed or reproof is needed) is produced and transmitted to the comprehensive proof manager 114.

In the case in which the proof is not good, the user indicates what is not good including associated comments in step S1509. The description of what is not good and the associated comments may be described in an attachment, in the body of the e-mail or in a combination of the body of the e-mail and an attachment. Information indicating whether the proof is good or not good may be described in the body of the e-mail and/or in a title of the e-mail.

If the comprehensive proof manager 114 receives this e-mail (step S1531), then in step S1532 the comprehensive proof manager 114 determines whether or not the checking of the proof has been passed. If it is determined that the checking of the proof has been passed (and printing should be performed), JDF data, which will be described later, is rewritten so as to indicate that the process proceeds to the printing step.

The determination in step S1532 may be made by a computer program based on the tile or the like of the received e-mail or by a human operator based on the contents of the e-mail. In the latter case, the human operator input data indicating the result of the determination.

On the other hand, if it is determined step S1532 that the checking of the proof has not passed and thus reproof is necessary before printing is started, the process proceeds to step S1533, in which an operator in the provider environment again performs editing and proof printing in accordance with the comment in the e-mail indicating what is not good. After step S1533 is completed, the process returns to step S1521.

Although in the process shown in FIG. 31, the information indicating the result of the checking of the proof is sent via e-mail in step S1510, the information may be provided to a human operator of the image processing system by using a telephone or facsimile. In this case, when the human operator receives the information, the human operator inputs data indicating whether the proof has been passed or not.

Print Manager and Printer Engine

Figure 37:
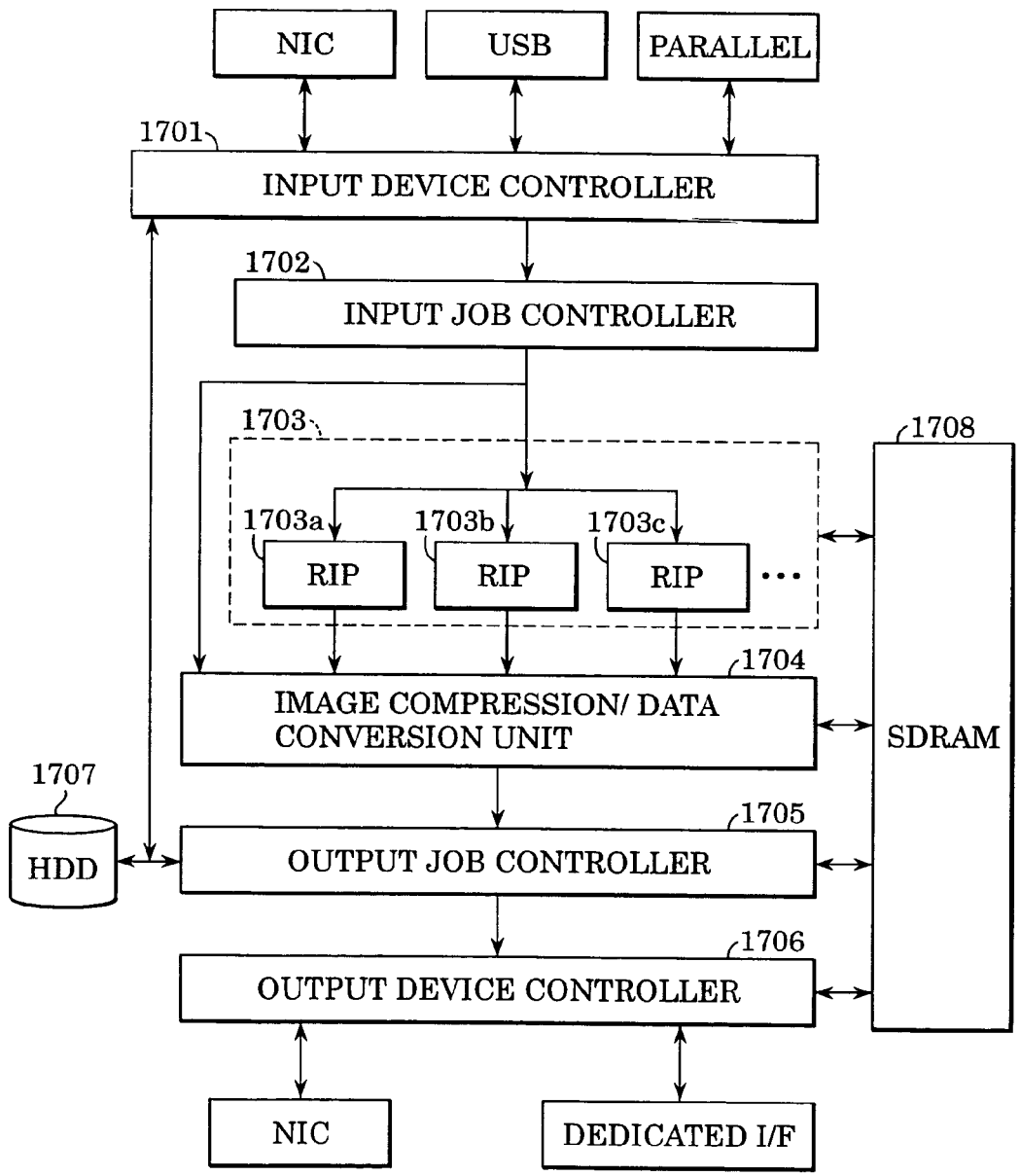
FIG. 37 is a block diagram showing a flow of data in a print manager shown in FIG. 1.

FIG. 37 is a block diagram showing a flow of data in the print manager 115 shown in FIG. 1.

In the example shown in FIG. 1, the print manager 115 controls the color MFP 124, the monochrome MFP 125a and the monochrome MFP 125b, which are all connected to the print manager 115. Note that the MFP 102 in the user environment may also include components corresponding to the print manager, the printer engine, and the online finisher, which are described below.

If the process control manger 111 determines that the job should be transferred to the print process in response to a print command issued via the job submit screen (FIG. 45 or 46), the job data is input to the print manager 115 via the NIC (network interface card), USB (universal serial bus), or parallel interface. The input job data is transferred to the server (in the print manager 115) via the input device controller 1701. Various client applications are linked to the server to realize necessary capabilities. The job data acceptable by the print manager 115 is in the form of PDL (Page Description Language) data or JCL (Job Control Language) data. Job data in the form of PDL or JCL data includes state information associated with a printer and server, and use of the PDL or JCL format makes it possible to handle various requirements of many clients. The input device controller 1701 can provide an output in which all constituent elements of valid PDL and JCL data.

An input job controller 1702 produces a job list for use to access jobs input to the server. This module (input job controller 1702) includes functions of: job routing to determine the route of the job; job splitting to split a given job into a plural of parts that will be separately rasterized; and job scheduling to determine the order in which jobs are processed.

A RIP (Raster Image Processor) module (unit) 1703 performs raster image processing on PDL data of the job to produce bit map data with a proper size and resolution. There are a plurality of RIPs RIP 1703a, a RIP 1703b, a RIP 1703c shown in FIG. 37. As shown in FIG. 37, there may be more RIPs if necessary. These RIPs 1703a, 1703b, 1703c, and so on are generically denoted as the RIP 1703. Rasterizing is possible for not only the Post Script format but also for many other formats such as PCL, TIFF (Tagged Image File Format), JPEG, and PDF.

An image compression/data conversion unit 1704 performs data compression or format conversion on the bitmap image data output from the RIP unit 1703. When data format of image data is converted, a format that best matches a printer to be used is selected. For example, when a job is handled page by page, TIFF or JPEG image data is rasterized by the RIP unit and the resultant bitmap data is converted into PDF data with a header.

An output job controller 1705 manages the output treatment of job page images according to the given settings. Pages are printed by a printer or stored on the hard disk 1707. After printing is completed, a selection is made as to whether the job is kept on the hard disk 1707 or deleted. If the job is retained on the hard disk 1707 after the printing of the job is completed, the job can be used again. The output job controller 1705 manages the output job using both the hard disk 1707 in conjunction with the memory (SDRAM) 1708.

An output device controller 1706 determines which device the job should be output to, and also determines which printers should be clustered for use to print a given job. The print data is sent to a device selected by the output device controller 1706 via an interface of the device. The output device controller 1706 also serves to monitor the status of MFPs (102, 124, and 125) and informs the print manager 115 of the status of each MFP.

Although in the example shown in FIG. 37, the print manager 115 includes the RIP unit 1703, the RIP unit 1703 may be disposed in the MFP 102 (or MFP 124 or MFP 125) or may be disposed separately from the print manager 115 and other devices. In either case, the print manager 115 controls the MFP 102 (or MFP 124 or MFP 125) and the RIP unit 1703 and rasterizes the input PDL data and performs printing according to the rasterized PDL data.

Setting of Cluster Printer

A cluster printer refers to a virtual printer produced by combining a plurality of printers. A cluster printer is created via configuration setting performed by the print manger and the process control manager. A process of creating a cluster printer by combining preregistered printers such as MFPs 124 and 125 is shown in the flowchart of FIG. 38.

Figure 38:
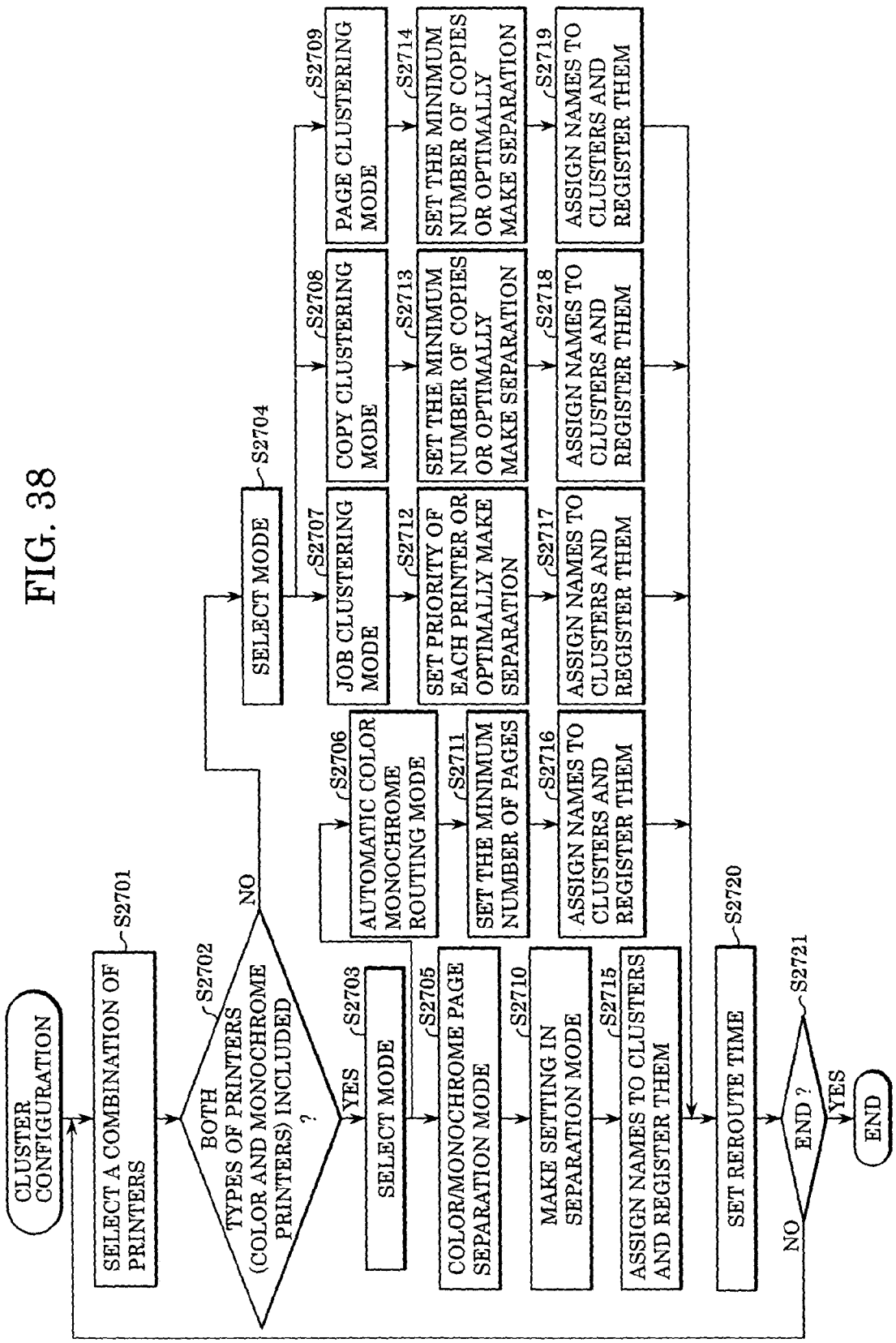
FIG. 38 is a flow chart showing an example of a process of registering a cluster printer in an image processing system according to the present invention.

FIG. 38 shows an example of a flow of registering a cluster printer in the image processing system according to the present invention. In FIG. 38, S2701 to S2721 denote step numbers.

First, a human operator selects two or more printers from preregistered printers (step S2701). For example, when there are three registered printers A, B, and C, there can be four combinations A&B, A&C, B&C, and A&B&C. A cluster printer composed of the same combination of printers may be assigned two or more different names for respective modes.

Then, in step S2702, a determination is made as to whether a selected combination of printers includes different types of printers as is the case with a combination of a color printer and a monochrome printer. If it is determined that the selection combination includes both color and monochrome printers, an operation mode is selected from a color/monochrome page separation mode and a color/monochrome automatic routing mode (step S2703).

In the color/monochrome page separation mode, when a job including both color and monochrome pages is given, the job is separated into color pages and monochrome pages, and pages including color information are output by a color printer and pages including no color information are output by a monochrome printer. In the color/monochrome automatic routing mode, if the job includes at least one color page, all pages of the job are printed using a color printer. On the other hand, when the job includes only monochrome pages, the job is automatically routed to a monochrome printer. Both modes allow a reduction in total cost by properly using monochrome printers which operate at a lower cost per sheet than color printers.

If the color/monochrome page separation mode is selected (step S2705), setting associated with the color/monochrome page separation mode is performed (step S2710), and the cluster is named and registered (step S2715). Thereafter, the process proceeds to step S2720.

On the other hand, if the color/monochrome automatic routing mode is selected (step S2706), the minimum number of pages (to be handled by one printer) is set (S2711), and the cluster is named and registered (step S2716). Thereafter, the process proceeds to step S2720.

If it is determined in step S2702 that the printers includes the selected combination are the same in type as is the case with a combination of only color printers or a combination of only monochrome printers (that is, if it is determined that the selected combination does not include different types of printers), an operation mode is selected from the following three modes: job clustering mode; copy clustering mode; and page clustering mode (step S2704).

The job clustering mode refers to a mode in which jobs are sequentially distributed to currently available printers or a printer that is predicted to become available the soonest such that the load balance is optimized.

The copy clustering mode refers to a mode in which, for example, when a job is to be processed so as to make one hundred (100) copies using three (3) printers having the same throughput, thirty-three (33) copies, thirty-three (33) copies, and thirty-four (34) copies (33 copies plus a remainder 1) are assigned to the respective printers such that the job can be completed in a minimum amount of time.

The page clustering mode refers to a mode in which, for example, when a job including one thousand (1000) pages is given, five hundred (500) pages are assigned to two respective printers.

If, in step S2704, the job clustering mode (S2707) is selected, the priority of each printer or the optimum separation is set (step S2712), and the cluster is named and registered (step S2717). Thereafter, the process proceeds to step S2720.

On the other hand, if the copy clustering mode (S2708) is selected in step S2704, the minimum number of copies or the optimum separation is set (step S2713), and the cluster is named and registered (step S2718). Thereafter, the process proceeds to step S2720.

If, in step S2704, the page clustering mode (S2709) is selected, the minimum number of pages or the optimum separation is set (step S2714), and the cluster is named and registered (step S2719). Thereafter, the process proceeds to step S2720.

The same combination of printers may have three different cluster printer names for use in the respective modes. Each cluster printer can be treated as a virtual high-speed printer.

In step S2720, the reroute time is set. The reroute time refers to a waiting time to wait when a paper jam or an error occurs in a printer being used, before the job is rerouted to another printer. In step S2721, it is determined whether setting is completed. If so, the process is ended. However, if the setting is not yet completed, the process returns to step S2701.

Figure 39:
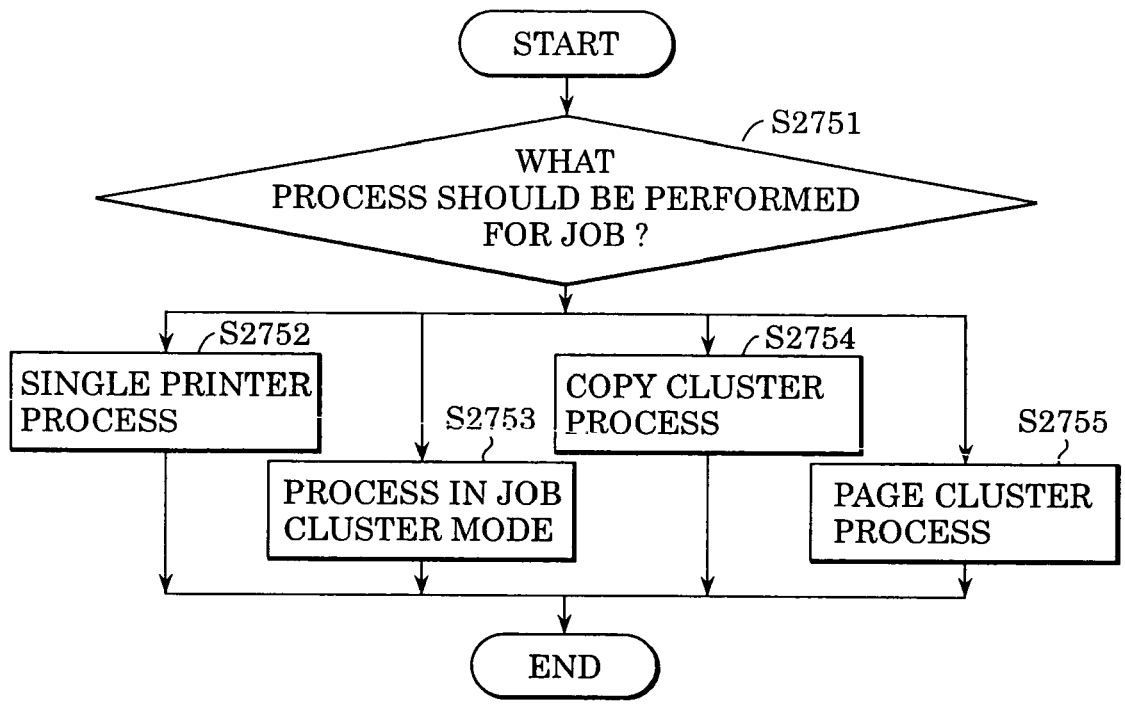
FIG. 39 is a flow chart showing an example of a process of printing a job using one of cluster printers under the control of a print manager shown in FIG. 1.

FIG. 39 is a flow chart showing an example of a cluster printing process performed by the printer manager 114 shown in FIG. 1. In FIG. 39, S2751 to S2755 denote step numbers.

If a job is submitted to a registered cluster printer, it is determined which cluster printer should be used for the job (step S2751), and the job is printed using the selected cluster printer in the specified mode, that is, in the single printer mode (S2752), the job cluster mode (S2753), the copy cluster mode (S2754), or the page cluster mode (S2755). When the printing is completed, the process is ended.

Figure 40:
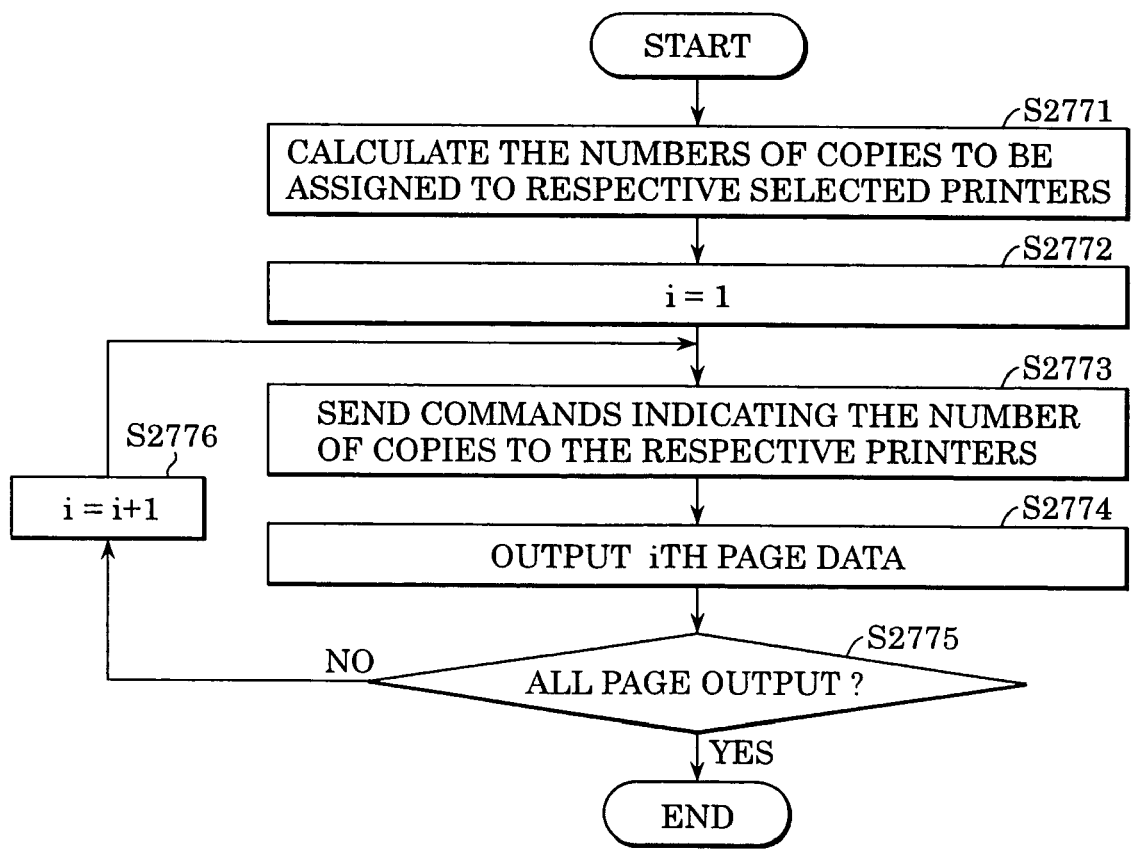
FIG. 40 is a flow chart showing an example of a process of printing a job using a cluster printer in a copy clustering mode.

FIG. 40 is a flow chart showing the details of the process in the copy cluster mode in step S2754 shown in FIG. 39. In FIG. 40, S2771 to S2776 denote step numbers.

First, in step S2771, the number of copies to be assigned to each selected printer is calculated. Thereafter, a variable i indicating the number of pages is initialized (step S2772). A command indicating the number of copies assigned to each printer is sent to the printer (step S2773). Thereafter, ith-page data is supplied to each printer (step S2774).

In step S2775, it is determined whether all pages have been output. If it is determined that all pages have not been output, the process proceeds to step S2776, in which i is incremented. The process then returns to step S2773 and is repeated.

On the other hand, if it is determined in step S2775 that all pages have been output, the process is ended.

By printing the given job in parallel using a plurality of printers registered as a cluster printer in the above-described manner, it becomes possible to perform printing in a shorter time.

Post Process Manager

The post process manager 116 shown in FIG. 1 is a computer responsible for controlling the offline finishers. More specifically, the post process manager 116 manages the status of the offline finishers that perform finishing processes on printed sheets output from the MFP 124 (or 125), and the post process manager 116 issues a job process command to the offline finishers.

The offline finishers controlled by the post process manager 116 include the paper cutting machine 131, the saddle binder 132, the case binder 133, the folding machine 134, the enclosing machine, 135 and the collator 136. The post process manager 116 periodically acquires information indicating the status of each offline finisher and the status of jobs by means of polling, and the post process manager 116 manages the post process on jobs depending on the detected status.

Post Process

Figure 41:
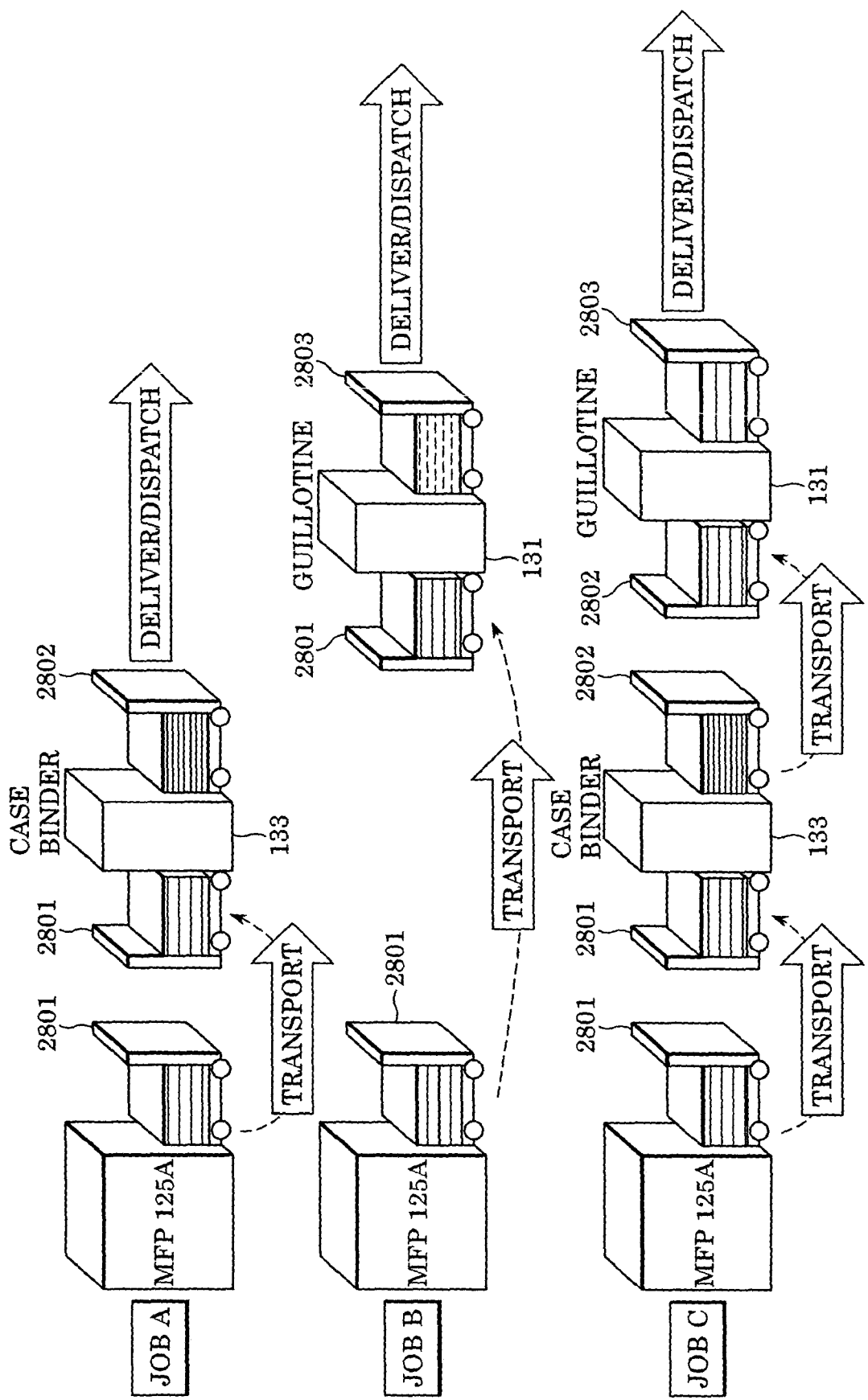
FIG. 41 is a diagram showing a flow of a post process performed on a printed job in the image processing system shown in FIG. 1.

Now, referring to FIG. 41, the post process performed in the image processing system shown in FIG. 1 is described.

FIG. 41 is a diagram showing a flow of the post process performed on a printed job in the image processing system shown in FIG. 1. Printed sheets output from the MFP 124 (or 125A) are stacked on a high-capacity stacker disposed at the side of the paper exit of the MFP. The stacker has a cart such that an operator can easily convey the stacker on which printed sheets are stacked to one of finishers 131 to 136 controlled by the post process manager 116.

For a job A, printed sheets output from the MFP 125A are conveyed by a cart 2801 to the case binder 133, and case-bound copies output from the case binder 133 are conveyed by a cart 2802 for shipment. For a job B, printed sheets output from the MFP 125A are conveyed by the cart 2801 to the paper cutter 131, and cut sheets output from the paper cutter 131 are conveyed by a cart 2803 for shipment. For a job C, printed sheets output from the MFP 125A are conveyed by the cart 2801 to the case binder 133. Case-bound copies output from the case binder 133 are conveyed by the cart 2802 to the paper cutter 131, and cut copies are conveyed by the cart 2803 for shipment.

The processes performed on the jobs A to C are controlled in accordance with JDF data produced by the process control manager 111. To properly control the processes, the web server of the process control manager 111 communicates with the post process manager 116 to acquire information indicating the status of all finishers that are under the control of the post process manager 116.

File Storage Manager

The file storage manager 117 shown in FIG. 1 stores files received from users such that a file can be used when an order for reprint is received from a user. Formats acceptable for files stored are the PDL format and the Print Ready format (such as the Bitmap format and the Tiff format). Files in the Print Ready format are generally large in size, and thus files in the Print Ready format may be stored in another storage medium (such as a compact disk-read-only memory (CD-ROM), magnet-optical (MO), or ZIP). For PDL files, old ones or ones that are large in size may be stored in another storage medium. When a user requests, a file is returned together with output sheets/copies in a final processed form to the user.

When a user wants to reprint data stored by the file storage manager 117, an order for reprint is submitted by issuing a restore command.

Delivery/Dispatch Manager

The delivery/dispatch manager 118 shown in FIG. 1 is a computer linked to a transport service such as door-to-door delivery service, courier service, or mail service, and the delivery/dispatch manager 118 manages the delivery status or delivery schedule based on tracking numbers or airway bill numbers.

Job Flow

Referring again to FIG. 1, a data flow in the provider environment in the image processing system according to the present embodiment is discussed. Data are transmitted among various computers and devices, and data transmission is managed by the process control manager 111.

In data transmission, data are described in the PPF (Print Production Format) format established by CIP3 (International Cooperation for Integration of Prepress Press and Postpress) or a newer format called JDF (Job Definition Format) established by CIP4 (International Cooperation for Integration of Processes in Prepress, Press and Postpress).

The PPF is based on the Post Script® format and is used as a standard format usable over an entire work flow of a print process including prepress, press, and postpress. That is, the PPF allows processing data and management data to be transferred among different processing steps in the print process. More specifically, the PPF is capable of handling, in addition to management information, information specifying ink adjustment, cutting position and/or other processing conditions. This allows achievement of high quality, an error reduction, an improvement in operating speed, and highly efficient usage of production apparatuses.

The JDF is based on the PPF and is capable of handling additional information associated with processing conditions or control attributes in prepress described in the PJTF (Portable Job Ticket Format) format proposed by Adobe Systems®. The JDF provides a better capability of handling information over a whole work flow including prepress, press, and postpress in a unified manner and makes it possible for a process control manager to manage a process in a more effective way, and provides good compatibility with existing systems.

The JDF supports an operation instruction description in a job ticket according to the PJTF format. The operation is performed in each process in accordance with the operation instruction, the history information, and the management information described in the job ticket, and the job ticket is transferred to a next process after the current process is completed.

In the JDF, a job ticket is described in a language called XML (eXtensible Markup Language). Furthermore, in the JDF, templates called schemata are defined to describe XML elements and attribute arrays, and XML data is rewritten in accordance with the defined schemata shown in FIG. 42.

FIG. 42 is a diagram showing a process control process performed by the process control manager 111 shown in FIG. 1. A manner in which JDF data is rewritten when the data is transferred from one process to another is shown in FIG. 42.

As shown in FIG. 42, when job data 2901 is input to the order/document reception manager 112, a JDF application 2902 in the process control manager 111 produces JDF data.

The produced JDF data is further rewritten by the process control manager 111, the order/document reception manager 112, the document edit/scan manager 113, the comprehensive proof manager 114, the print manager 115, the post process manager 116, the file storage manager 117, and the delivery/dispatch manager 118 when each manager receives the JDF data.

In the example shown in FIG. 42, the JDF data is transferred to the print manager 115 and further therefrom to the post process manager 116. The transferred JDF data is interpreted by a JDF parser 2904 (or the JDF parser 2907) and addition, deletion, and/or modification are performed by each manager. In FIG. 42, 2903a to 2903e denote JDF data, 2905 denotes a PDL controller, 2906 denotes a printer interface, and 2908 and 2909 denote finisher interfaces.

Even when printed paper sheets are conveyed manually by an operator, information indicating the job processing status is rewritten in the JDF data and the JDF data is transferred from one process to another via each JDF parser. The JDF data at each stage is managed by the process control manner 111 such that a user can recognize the current status of each job.

Management of Print Job by Process Control Manager

Figure 43:
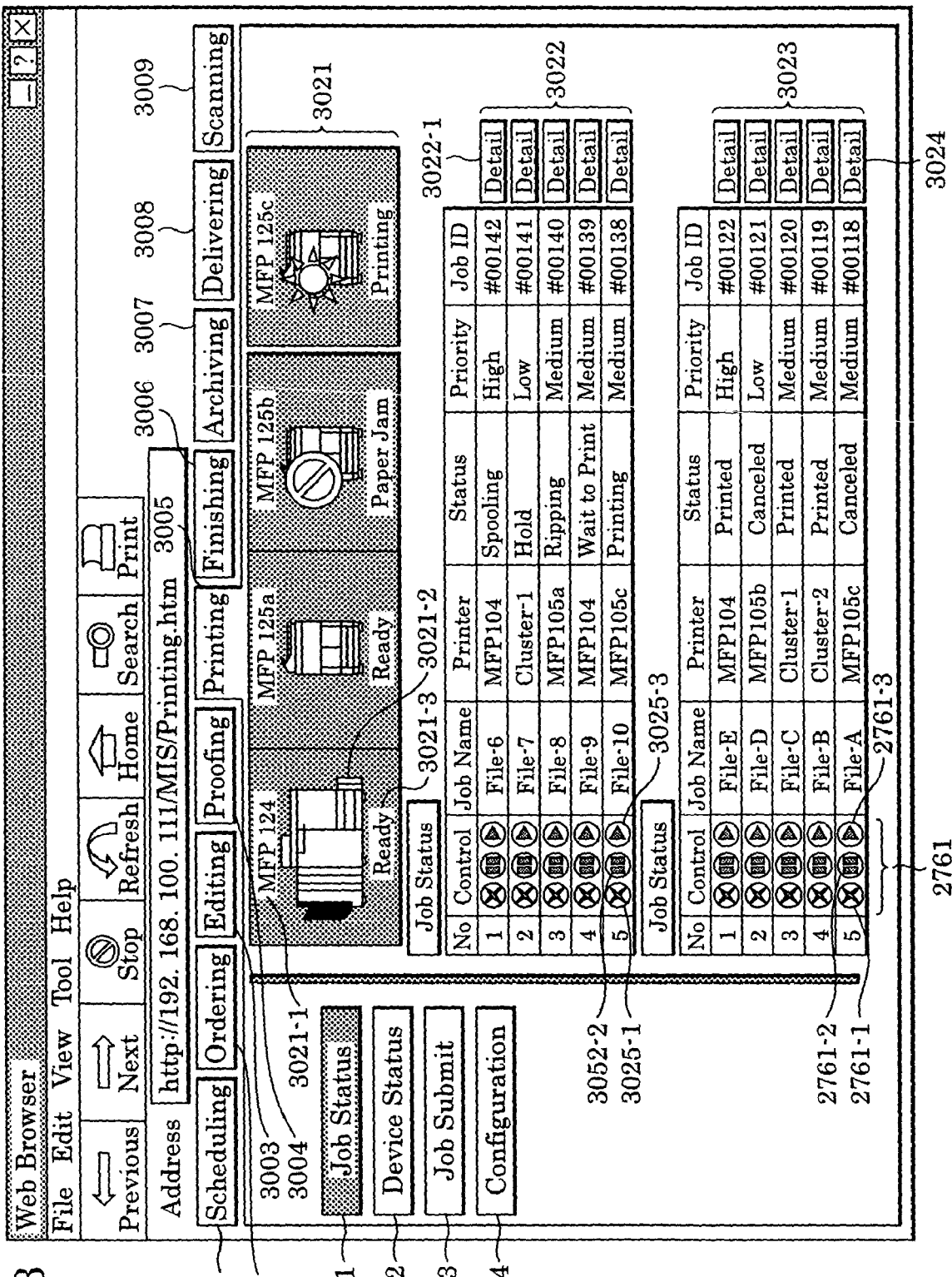
FIGS. 43 to 46 are diagrams showing print process control screens provided by a print manager shown in FIG. 1.
Figure 44:
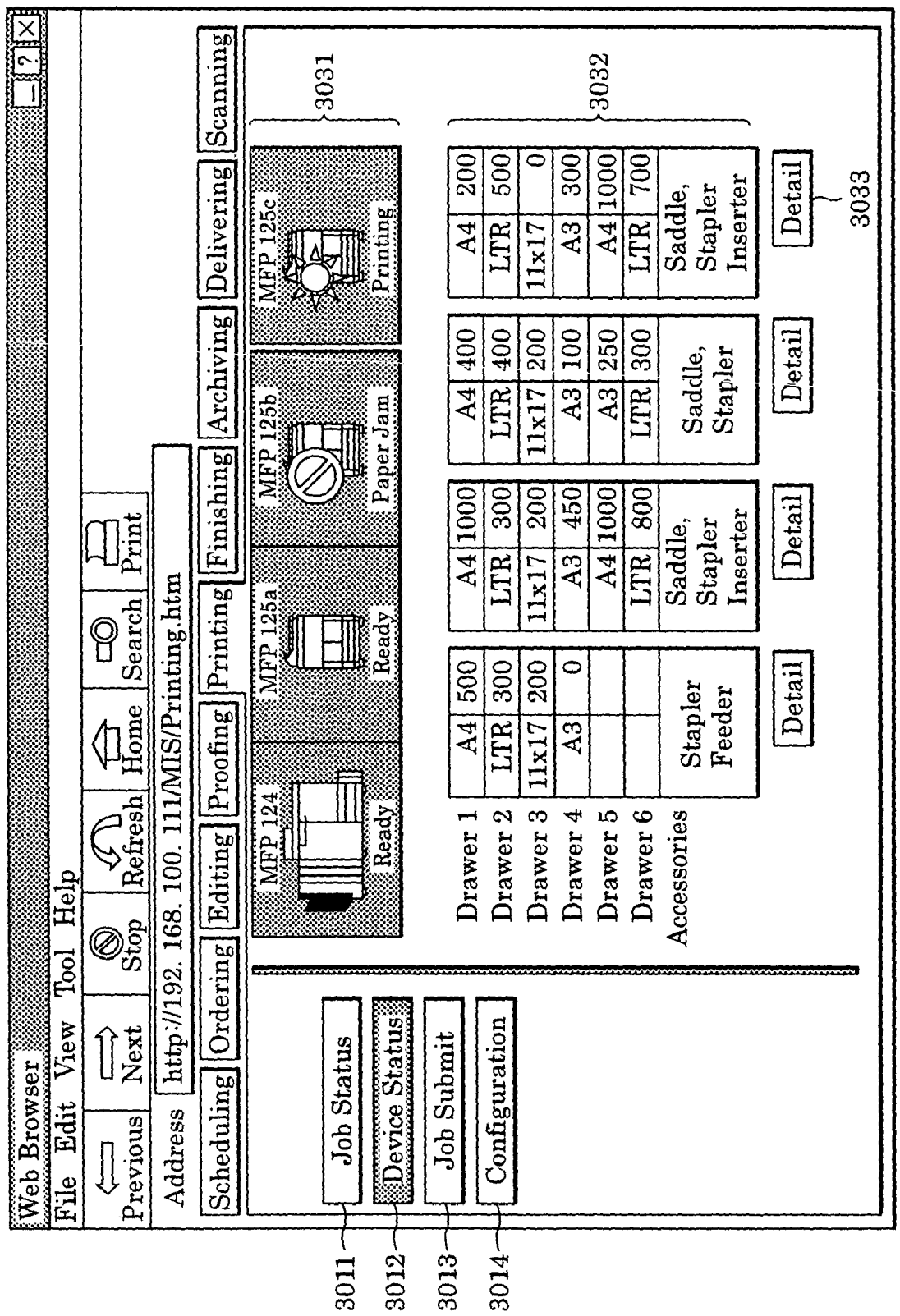
Figure 45:
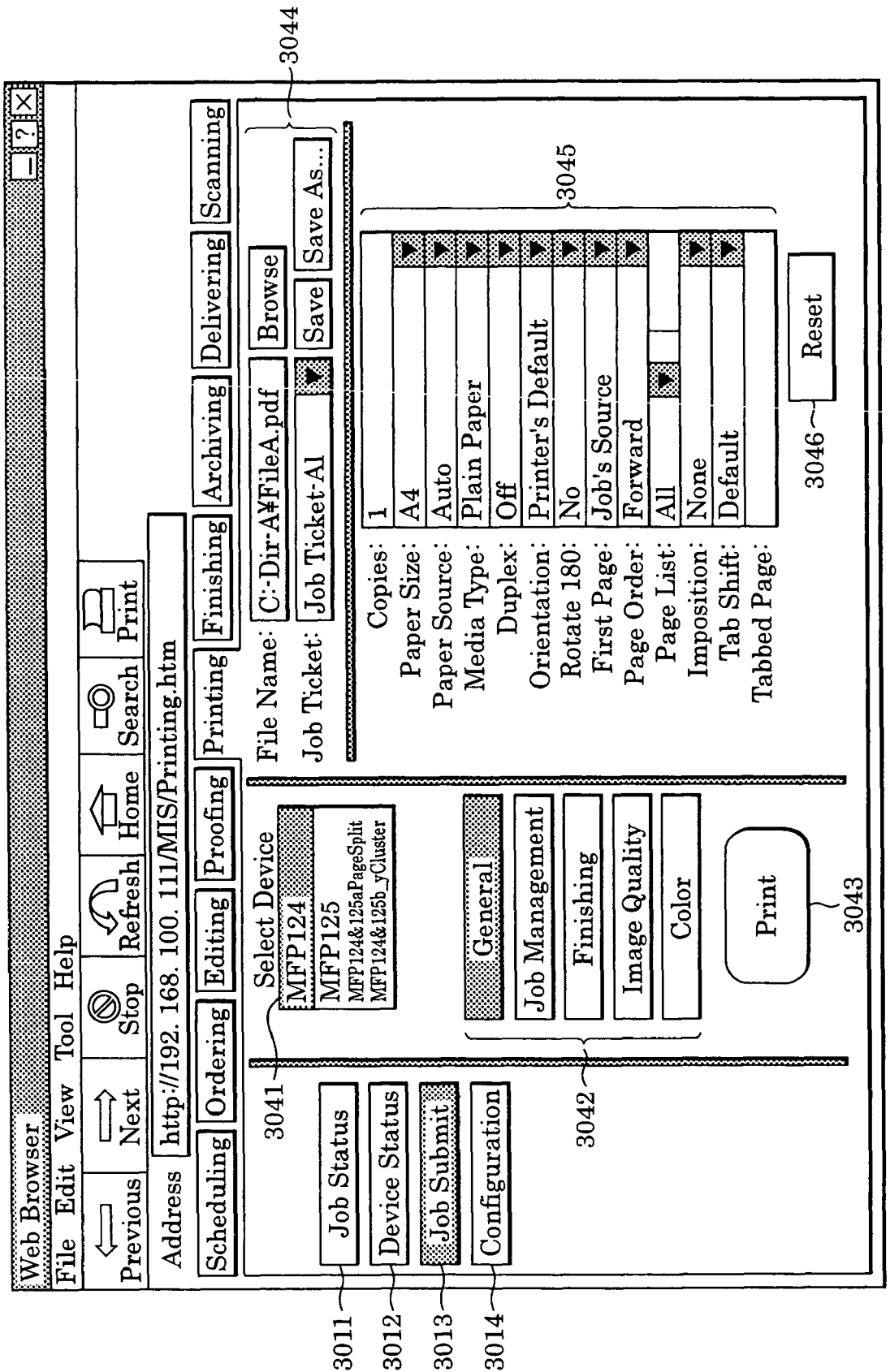
Figure 46:
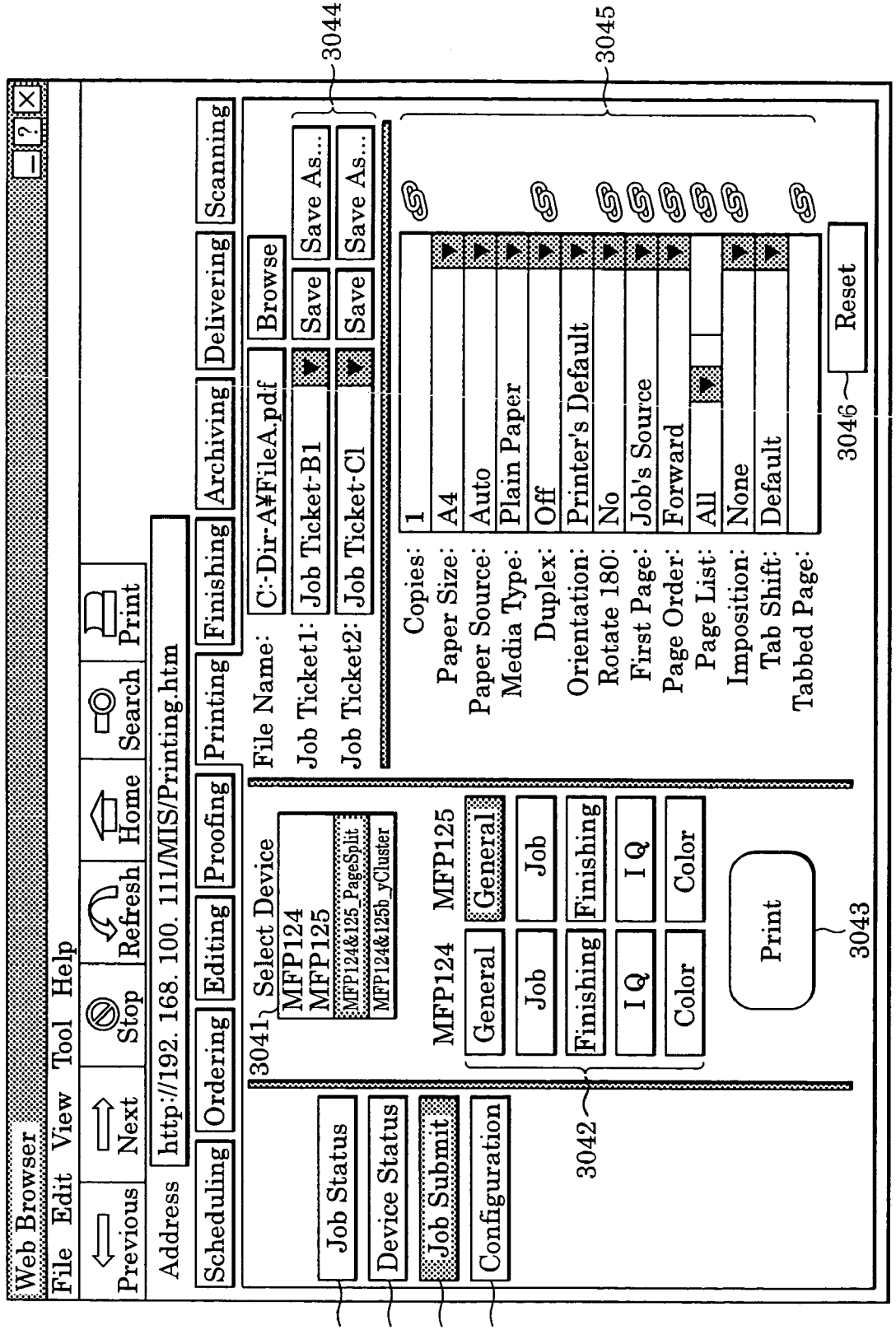

FIGS. 43 to 46 are diagrams showing a print process control screen provided, in various situations, by the print manager 114 shown in FIG. 1. FIG. 43 shows the print process control screen indicating job statuses in the print process. FIG. 44 shows the print process control screen indicating device statuses in the print process. FIGS. 45 and 46 show the print process control screen in a situation in which a job is submitted in the print process.

The print process control screen described above appears on a client computer in the user environment 100 when the web server of the process control manager 111 is accessed by inputting the IP address (192.168.100.11 in this specific example, or a server name if DNS (domain name service) is supported) in the URL address field of the web browser running on the client computer.

The print process control screen includes a scheduling tab 3001 for scheduling of respective managers, an ordering tab 3002 for checking the order reception status of the order/document reception manager, an editing tab 3003 for editing, a proofing tab 3004 managing the proofing status of customers by the proof manager, a printing tab 3005 for managing print jobs and starting print jobs, a finishing tab 3006 for managing the post process by the post process manager, an archiving tab 3007 for managing the archive status of jobs by the file storage manager, a delivery tab 3008 for managing invoices and delivery status by the delivery/dispatch manager, and a scan tab 3009 for managing scan jobs by the scan manager. For example, if the printing tab 3005 is selected, the web server of the print manager 115 (which may be the same web server as the web server of the process control manager 111) is accessed, and the print process control screen (FIG. 43) indicating job statuses in the print process appears.

In the examples shown in FIGS. 43 to 45, the print process control screen, in a state in which the printing tab 3005 is selected, includes a job status key 3011 for managing jobs, a device status key 3012 for managing the MFP 124 or 125, a job submit key 3013 for submitting print jobs, and a configuration key 3014 for making various settings such as a setting of a printer or registration of a cluster printer. In the example shown in FIG. 43, the print process control screen is in a state in which the job status key 3011 is selected. In the example shown in FIG. 44, the print process control screen is in a state in which the device status key 3012 is selected. In the examples shown in FIGS. 45 and 46, the print process control screen is in a state in which the job submit key 3013 is selected.

In the print process control screen shown in FIG. 43 in the state in which the job status key 3011 is selected, a device name 3021-1 of an MFP on the network, a device icon (which varies depending on the status) 3021-2, and text information (such as "Ready", "Paper Jam", "Printing", etc.) 3021-3 indicating the status are displayed in a device display area 3021.

In a job status area 3022, statuses of jobs existing in the server are displayed. In a status field in this area 3022, the status (such as "spooling" (data is being received before ripping), "ripping", "wait to print", or "printing") of each job is indicated. For a job that was specified to wait in the server when the job was submitted, the job is held before it is rasterized. When an error or a paper jam occurs, the user is informed of the error or paper jam. When printing of a job is completed, the job is transferred to a job history display area 3023 (that is, the job is treated as a finished job). Information indicating the status of each network device is acquired by periodically sending an inquiry from the process control manager 111 and/or sending information indicating an occurrence of a change in status from a network device when the change occurs.

In the job history display area 3023, the history of jobs is displayed. For jobs that have been normally finished, "Printed" is displayed in a status filed in the job history display area 3023. If a job is cancelled, "Canceled" is displayed.

In the job status display area 3022 or the job history display area 3023, if a detail key 3022-1 is clicked using a pointing device or the like (not shown), a detailed status of a job being in process or a finished job is displayed. The detailed status information may include job name, target printer, job status, job priority, job ID, client name, the number of pages of the job, the number of copies, paper size, predicted output time, and/or comment indicating a request of a client. The predicted output time may be calculated from the spool order, the predicted rasterizing time, and/or the printer speed.

In the job status display area 3022, control keys 3025 are used by a particular human operator (human manager) authorized for a corresponding job. The control keys 3025 include a job cancel key 3025-1, a job pause (hold) key 3025-2, and a job resume key 3025-3, disposed in a horizontal line from left to right.

In the job history display area 3023, control keys 2761 are used to control jobs displayed in the job history display area 3024. The control keys 2761 include a job archive key 2761-1 to archive a job in a particular storage area on the network, a job delete key 2761-2, and a job reprint key 2761-3. In response to clicking a control key, an operator operates the server.

The network interface of each of the MFPs 124 and 125 and the printer 107 has a database according to the standard called MIB (Management Information Base). Via the network interface, it is possible to communicate with devices or computers on the network by using SNMP (Simple Network Management Protocol) to acquire information indicating the status of devices or computers (such as the MFP 124 and 125) on the network.

The MIB database includes information indicating the type of a finisher connected to each MFP such as the MFP 124 or 125, an occurrence of an error or a paper jam, a status (in printing process or in an idle state) of each MFP, capabilities of each MFP, settings of the network, job history, and status of use. The print manager acquires information indicating statuses of MFPs and other apparatuses from the MIB database and updates the status HTML file according to the acquired information such that clients can access the information indicating the current status of each apparatus.

If the device status key 3012 is clicked using the pointing device or the like (not shown), device status information is displayed in the print process control screen as shown in FIG. 44. In a device status display area 3031, information indicating the status of each device, such as the paper size available in each device, the number of remaining sheets (on a paper stacker or in a cassette), and accessories such as a finisher available in each device is displayed. The number of remaining sheets is detected using a dedicated sensor, and the value has an error of the order of 10 sheets although a no-paper state can be correctly detected. If a detail key 3033 is clicked using the pointing device (not shown), information indicating the details of the status (color/monochrome, resolution, printing speed, etc. is displayed.

If a job submit key 3013 is clicked using the pointing device, information associated with job submission is displayed in the process control screen as shown in FIG. 45.

The job submit screen is used in a similar manner to the printer driver screen described above except that the job submit screen can be used without having to open a file in an application on a client computer. That is, a file or a job to be printed is directly supplied to the print manager 115 without passing through an application. In the job submit screen, it is possible to attach additional information to a document file to be printed as described below.

In general, the printer driver has two roles. First, when data produced by an application running on a client computer is given, the printer driver converts the given data into PDL data (such as Post Script data or PCL data). Second, the printer driver transfers the converted data to a print manager 115 (or a printer). The data conversion by the printer driver is necessary because rasterizing is possible only for one format.

In contrast, in the job submission, a job is simply transferred together with a job ticket to the print manager 115 via a GUI. This has become possible because of development of a RIP module capable of rasterizing not only PS data but also data in other various formats (such as pdf, tif, and jpg), or because of development of a print manager 115 including a plurality of software RIP modules (for example, modules for PS and PCL) that allow data in different formats to be rasterized and thus that make it possible for the print manager 115 to directly accept PDL data in different formats (pdf, tiff, jpg, etc.).

When the interface of the MFP 124 (or the MFP 125) is capable of rasterizing only PS data but not capable of rasterizing bitmap data, the print manager 115 converts given data into PS data, compresses the PS data into the JBIG format or the G4 (CCITT) format, adds a PS header to indicate that the data is of the PS format, and supplies the resultant data to the MFP 124. This makes it possible for various printers to print data in various formats.

In job submission, a target device to which a job is to be submitted is selected in column 3041 in FIG. 45. The target device can be selected from the MFP 124, the MFP 125, and cluster printers realized by combining the MFP 124 and the MFP 125. When a cluster printer, which is a virtual printer realized by combining a plurality of printers, is selected in the destination selection column 3041, the GUI 3042 is switched so as to allow a user to make settings for each printer of the cluster printer.

In a file selection column 3044, a file name is specified by directly inputting the file name and a directory, or by selecting from files that are stored on the server computer (or on the network) and that appear in response to clicking a browse button at the right-hand side of the file selection column 3044.

After the setting is completed, if a print key 3043 is clicked, data indicating the setting and the specified file are transferred to the print manager 115 and added as a print job to a queue.

The above-described data indicating the setting transmitted together with the file is called a job ticket. In the job ticket, items such as those shown in 3045 are described. In the examples shown in FIGS. 45 and 46, general items are displayed on the screen for setting the job ticket. The item group can be switched by clicking one of item group keys 3042 (including a general item key, job control item key, finishing item key, image processing item key, and a color item key). In response, items of the specified item group are displayed.

After settings of the respective items are performed, the resultant job ticket is transmitted together with image data to the print manager 115, which performs RIP process, printing, and/or post process in accordance with the job ticket.

Figure 50:
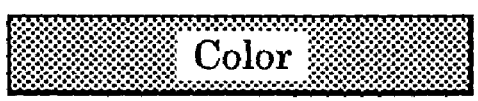

In the present embodiment, items in each item group are set as follows.
(1) General items: the number of copies, paper size, paper source, medium type, duplex, etc. (FIG. 45 or 46)
(2) Items associated with job control: job priority, job saving, etc. (FIG. 47).
(3) Items associated with finishing: stapling, punching, booklet, etc. (FIG. 48)
(4) Items associated with image quality: sharpness, brightness, toner reduction, etc. (FIG. 49)
(5) Items associated with color setting: setting of a gamma conversion table, setting of an ICC profile, etc. (FIG. 50)

When a cluster printer including a plurality of printers is used, the items described above from (1) to (5) can be set for each printer, as shown in FIG. 46.

In the job ticket, items specific to each device can be set. If the job ticket is prepared in advance, the job can be processed more smoothly. The job ticket can be stored (for reuse) by clicking a save key. The saved job ticket can be called by clicking a job ticket call key. Clicking a "save as" key saves a job ticket using a new name. If a delete key (not shown) is clicked, a job ticket is deleted. These keys are disposed in an area 3044. In the area 3044, a browser key and a file name input field for selecting a print file from those stored on the user's computer or accessible computers on the network are also disposed.

If a reset key 3046 is clicked, settings of a job ticket are reset into default values.

Management of Finishing Job by Process Control Manager

Figure 51:
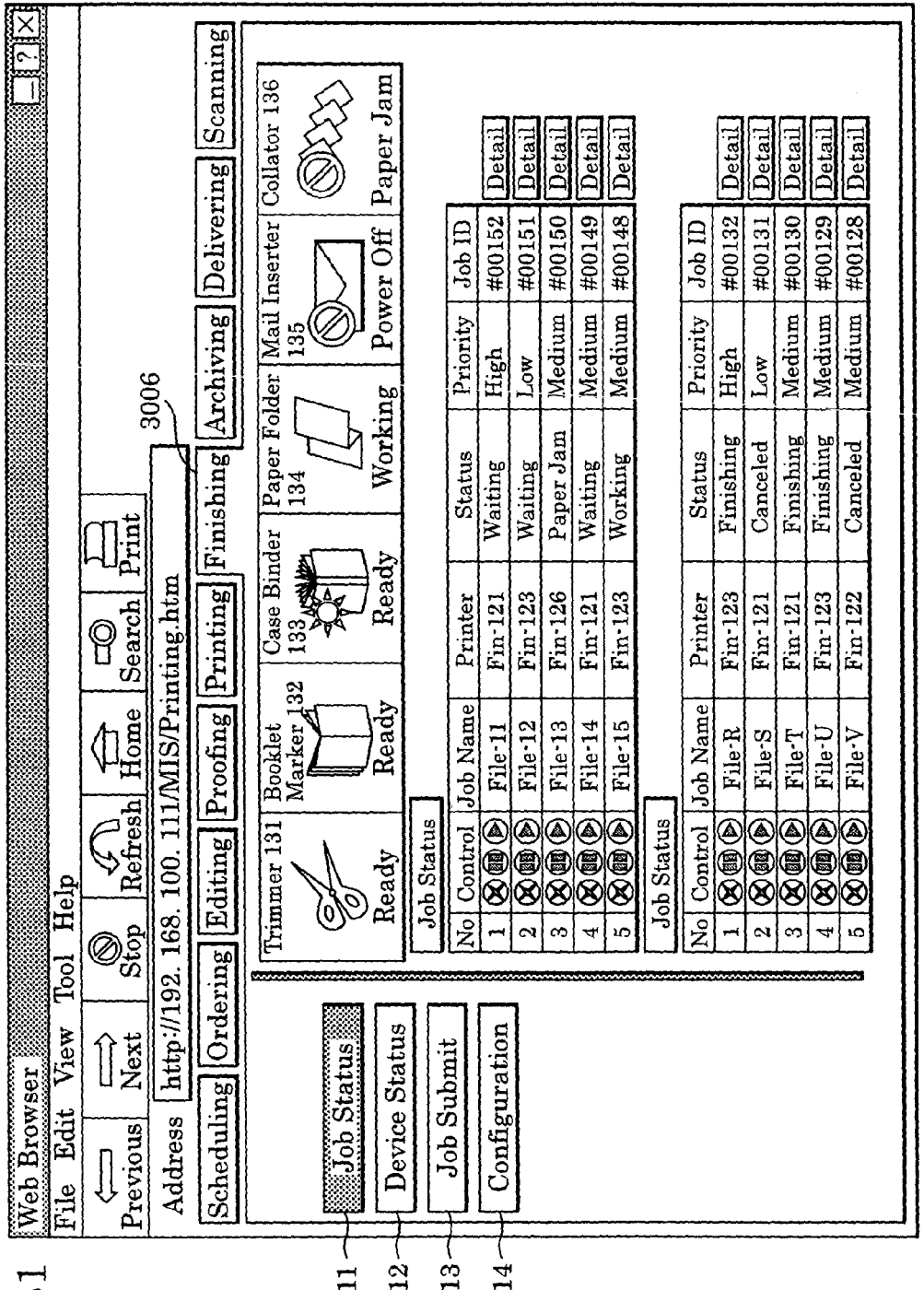
FIG. 51 is a diagram showing a post process control screen provided by a post process manager shown in FIG. 1.

FIG. 51 is a diagram showing a process control screen for managing the post process provided by the post process manager 116 shown in FIG. 1. The status of each finisher under the control of the post process manager 116 can be monitored via this screen, and each finisher can be controlled.

In the web browser, if the IP address of the web server of the process control manager 111 is input in the URL address field, the web server of the process control manager 111 is accessed and a service screen appears on the browser. If a finishing tab 3006 is selected in this service screen, the web server of the post process manager 116 (this web server may be the same as the web server of the process control manager 111) is accessed, the screen shown in FIG. 51 appears.

In FIG. 51, if a job status key 3111 is clicked, the operating status of each finisher and the status of each job are displayed. This allows a user to recognize which jobs are in process and which jobs are completed.

If a device status key 3112 is clicked using the pointing device, a device status screen (not shown) appears. Via this device status screen, it is possible to manage the functions and accessories of each finisher.

If a job submission key 3113 is clicked using the pointing device, a job submission screen (not shown) appears. It is possible to issue a command to apply a particular job to a particular finisher via this job submission screen. For example, for the paper cutter 131, the cutting position and/or the cutting direction are specified via the job submission screen. For the paper folder 134, the folding order and/or the folding direction are specified.

If a configuration key 3114 is clicked using the pointing device, a configuration screen (not shown) appears. Registration of a new finisher, deletion of an existing finisher, and settings of functions of a finisher are performed via this configuration screen.

Process Scheduling

As described above, the process control manager 111 communicates with the order/document reception manager 112, the document edit/scan manager 113, the comprehensive proof manager 114, the print manager 115, the post process manager 116, the file storage manager 117, and the delivery/dispatch manager 118 to manage the status of each job and control the cooperation among these managers. In addition, scheduling is performed via the communication.

Figure 52:
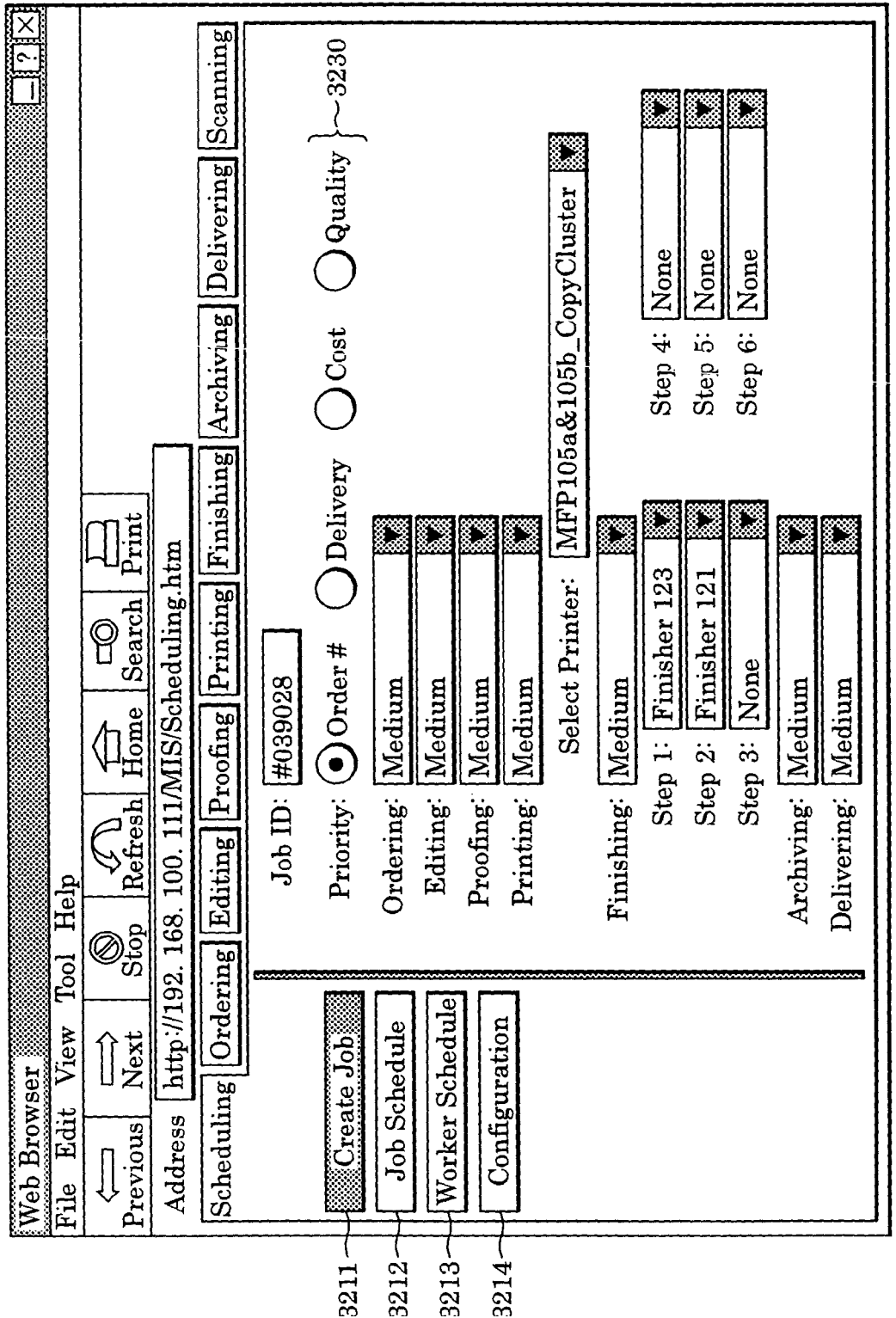
FIG. 52 is a diagram showing a job creation screen provided by a process control manager shown in FIG. 1.

FIG. 52 is a diagram showing a job creation screen provided by the process control manager 111 shown in FIG. 1. This job creation screen can be accessed by inputting the IP address of the web server of the process control manager 111 in the URL address field of the web browser on the client computer 103.

In the example shown in FIG. 52, the screen is in a state in which a "create job" key 3211 is selected. When the order/document reception manager receives an order for a job, an operator specifies, via the job creation screen, the priority of the job (by checking one of priority selection keys 3230 to give highest priority to the order, the delivery, the cost, or the quality), a printer to be used, and a finisher to be used.

In response, the process control manager 111 issues a new job and JDF data, and the process control manager 111 starts management of this job.

If a scheduling key 3212 is clicked using the pointing device, the process control manager 111 performs scheduling for the job in accordance with the conditions input via the job generation screen. The result of the scheduling is displayed in the job scheduling screen as shown in FIGS. 53 to 56.

If a configuration key 3214 is clicked by using the pointing device or the like (not shown), a job configuration screen (not shown) appears.

FIGS. 53 to 56 are diagrams showing examples of the job scheduling screen provided by the process control manager 111 shown in FIG. 1. Note that similar parts to those in FIG. 52 are denoted by similar reference numerals.

Figure 53:
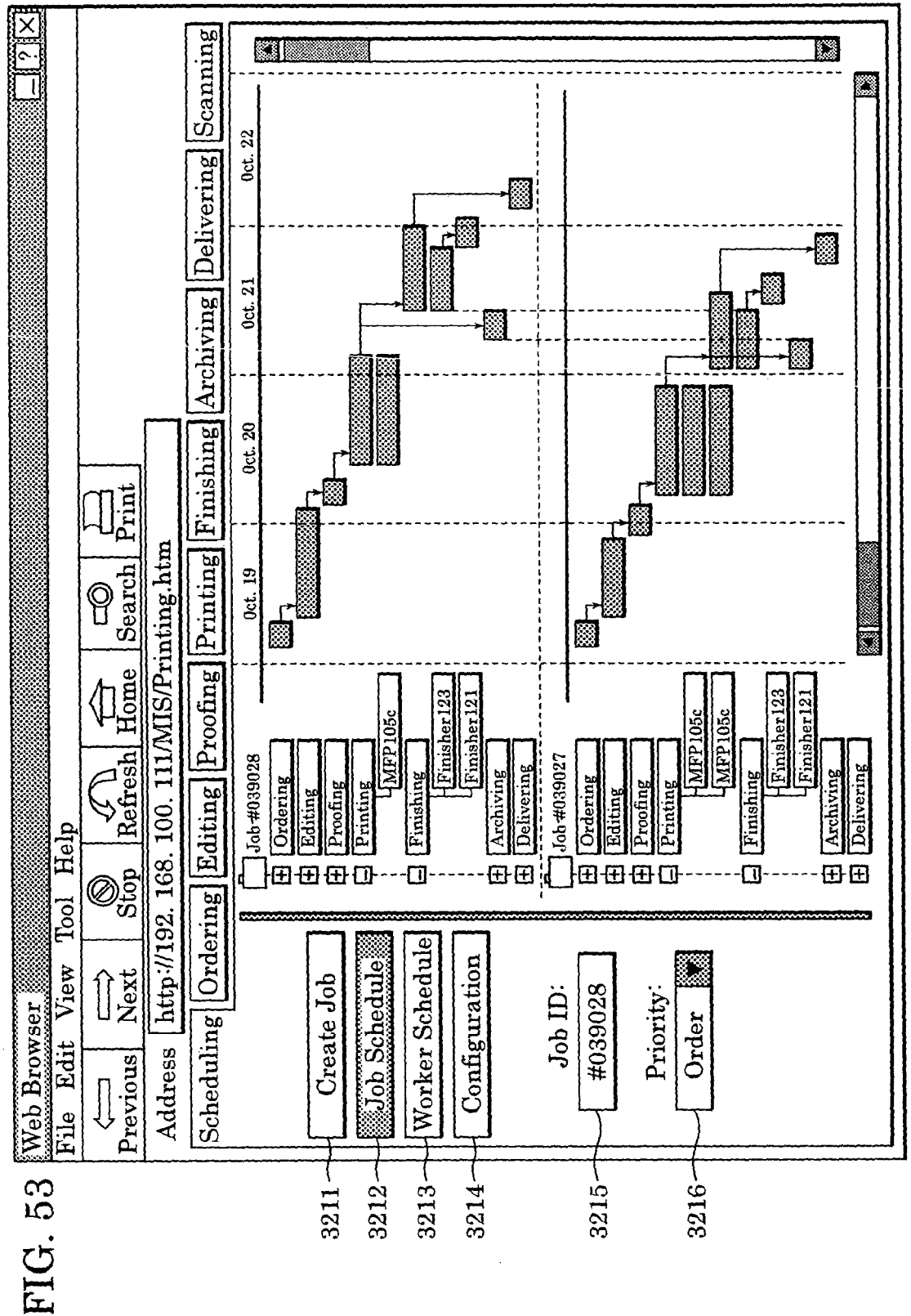
FIGS. 53 to 56 are diagrams showing job scheduling screens provided by a process control manager shown in FIG. 1.

In the job scheduling screen, as can be seen, for example, in FIG. 53, scheduled times to be spent by the respective managers are indicated by horizontal bars in the form of a chart in which cooperation among the managers can be seen at a glance. The schedule chart is managed in units of jobs. If a job ID is input in a job ID input column 3215, the schedule for the job with the input job ID is displayed in the schedule chart together with schedules of adjacent jobs.

In the schedule chart, the scheduled time needed for each of processes to be performed under the control of the process control manager 111 is indicated by a bar whose length corresponds to the scheduled time.

In the specific example shown in FIG. 53, #039028 is input as a job ID in the job ID input column 3215, and the schedule for the job with the job ID #039028 is displayed in the schedule chart. If a "more" mark ("+") at the left-hand side of each process name is clicked by using the pointing device of the like (not shown), the details of the schedule of that process are indicated if the detailed schedule are set. If a "less" mark ("−") is clicked, the detailed schedule is hidden.

The schedule chart for the job with job ID #039028 indicates that a rather large time lag will occur between the printing process managed by the print manager 115 and the finishing process managed by the finishing manager 116. This occurs because, in accordance with the selection of "order" in priority selection buttons 3230 in FIG. 52, schedules are made in the same order as the order in which orders for jobs are received. More specifically, the finishing process using the finishers 121 and 123 for the job with the job ID #039028 has to wait for completion of the finishing process using the same finishers for the job with the job ID #039027. This causes a bottleneck in the schedule.

When a short delivery time is requested by the customer of the job with the job ID #030928, the schedule can be shortened if higher priority is given to the job with the job ID #030928 than the other jobs. That is, if schedules for other jobs conflicting with the job #030938 are delayed, the schedule for the job #030928 is shortened.

To perform rescheduling for the job #030928 for the above purpose, the selection in terms of priority is changed from the order-priority mode to the delivery-priority mode by selecting the "delivery" button. In response, rescheduling is performed, and the result is displayed in the schedule chart as shown in FIG. 54.

Figure 54:
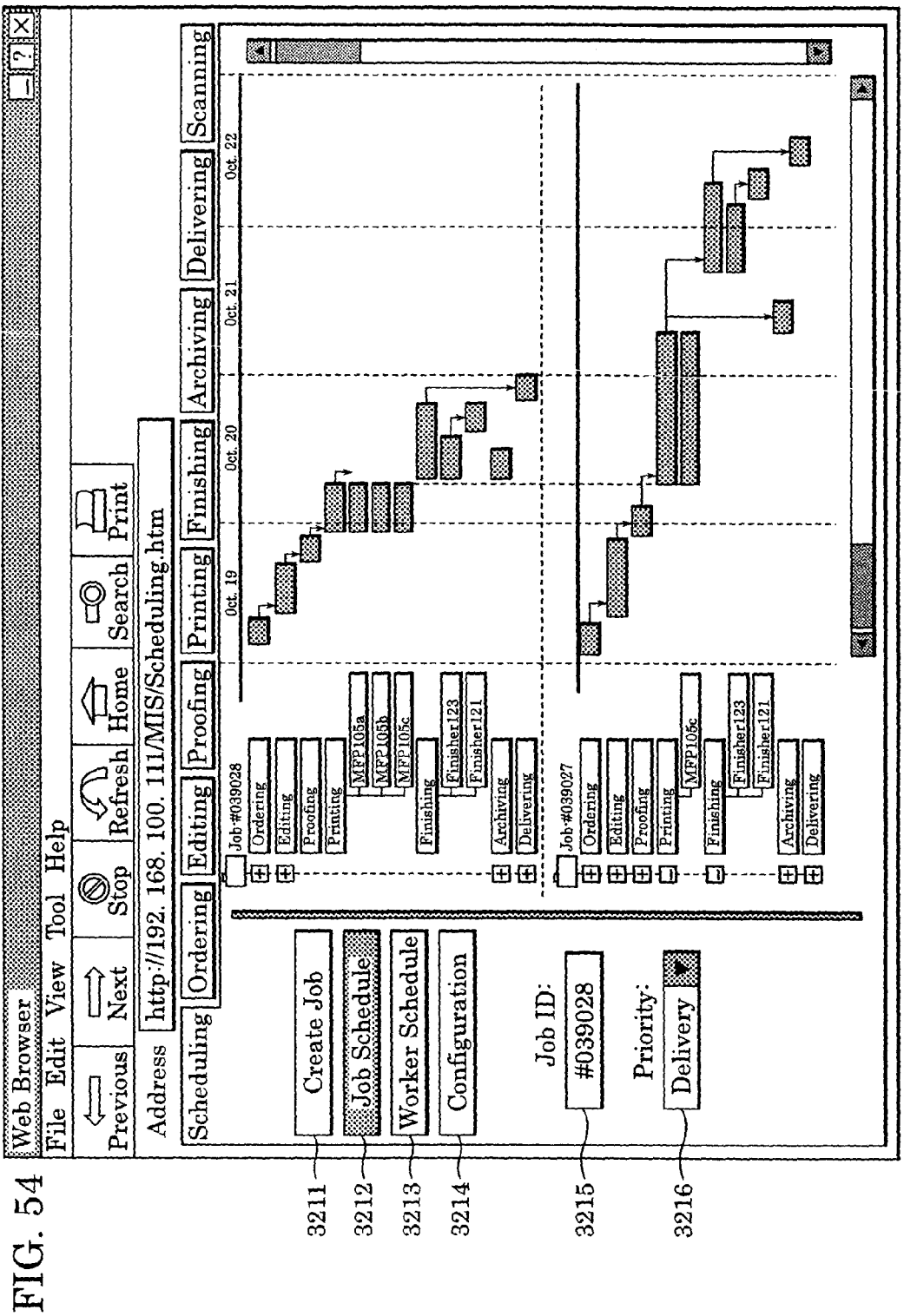

In the schedule in the delivery-priority mode, as can be seen from FIG. 54, the delivery time for the job with the job ID #030928 is shortened by 2 days compared with the delivery time in the order-priority mode.

The shortening of the schedule for the job with the job ID #030928 is achieved by using a cluster printer including three printers instead of using a single MFP, and by changing the order in which to perform the post processes managed by the post process manager 116 such that the post the process for the job with job ID #030928 is performed earlier than the other jobs. If necessary, the delivery time may be further shortened by reducing the times needed to perform respective processes by increasing the number of operators who work for the respective processes and/or by increasing the working time per day.

Figure 55:
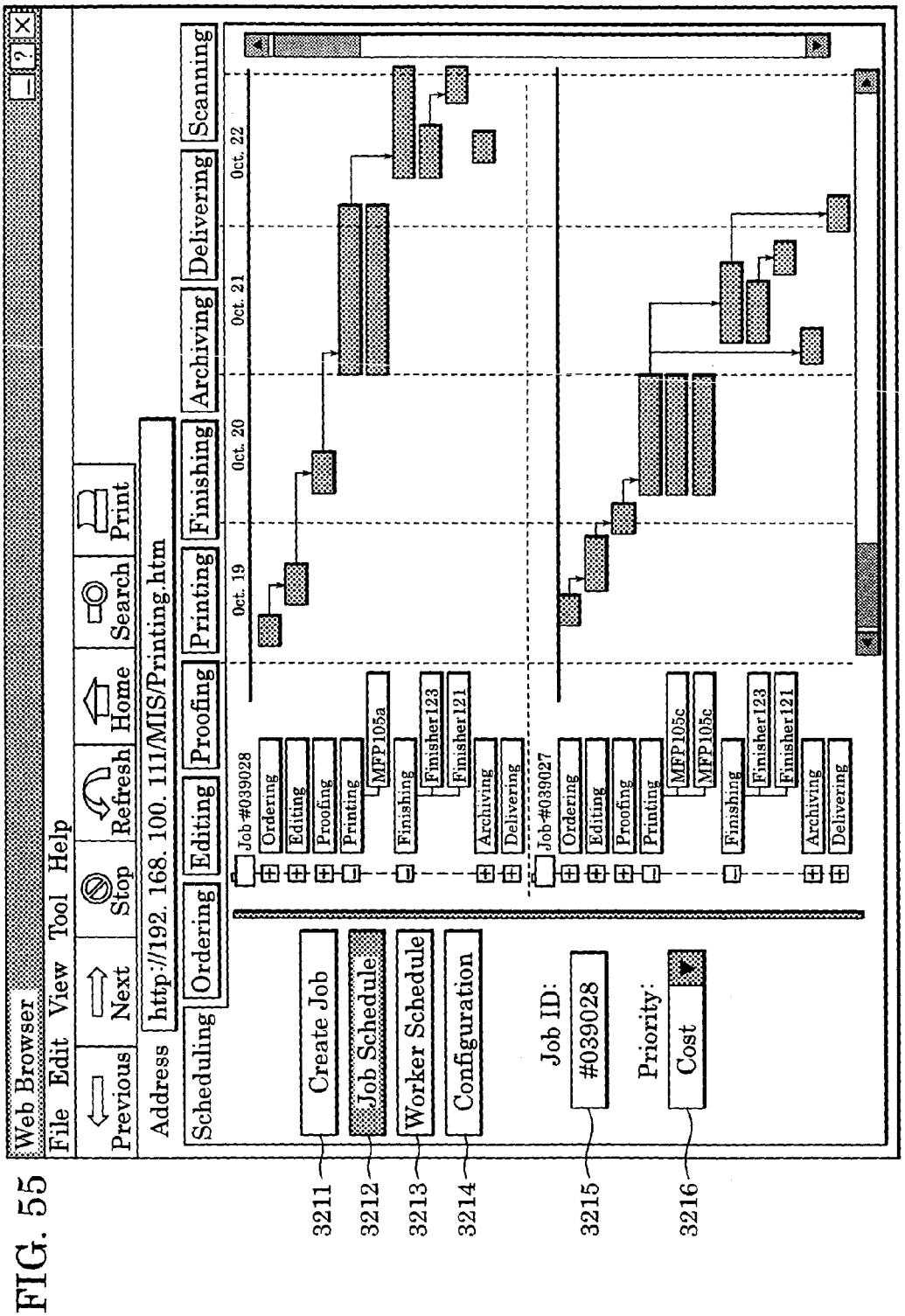
Figure 56:
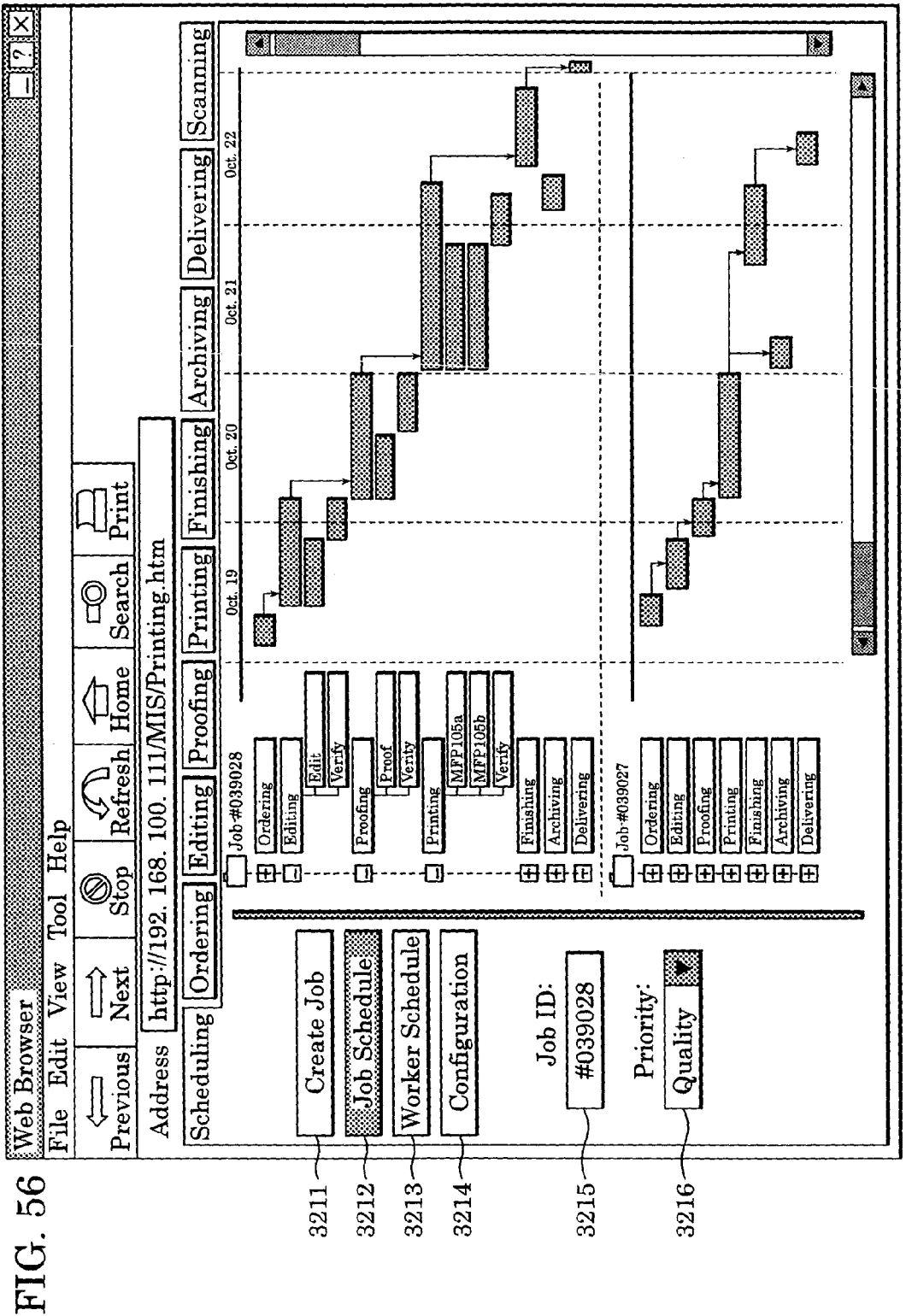

In addition to the scheduling in the order-priority mode or the delivery-priority mode, the scheduling is also possible in the cost-priority mode or the quality-priority mode by selecting the cost button or the quality button in the priority key set 3216. If the cost button in the priority key set 3216 is selected, scheduling is performed in the cost-priority mode and the result is displayed in the form of a schedule chart, for example, as shown in FIG. 55. On the other and, if the quality button in the priory key set 3216 is selected, scheduling is performed in the quality-priority mode and the result is displayed in the form of a schedule chart, for example, as shown in FIG. 56. As described above, each job is scheduled in the order-priority, delivery-priority, cost-priority, or quality-priority mode depending on a request issued by a customer.

In the example of the job schedule chart shown in FIG. 55, the schedule for the job with the job ID #039028 is made in the cost-priority mode such that each process has a certain margin that allows a delivery-priority job to be accepted in the future. In other words, the schedule for the job with the job ID #030928 is made such that the delivery time has a margin relative to the delivery time specified by the customer. That is, the margin in the delivery time allows a reduction in cost requested by the customer.

However, if the schedule for a cost-priority job is overtaken whenever a new delivery-priority job occurs, the delivery time for the cost-priority job can become late to an unacceptable degree. To avoid such a too large delay in delivery time, a deadline may be defined for the job. When a job is given, the process control manager 111 or a human manager may determine the deadline based on a delivery time requested by a customer.

In the example of the job schedule chart shown in FIG. 56, the schedule for the job with the job ID #030928 is made in the quality-priority mode such that a step of checking quality of each process is added at the expense of a delay in delivery time.

As described above, by selecting one of priority key set 3216, scheduling can be performed in a mode selected from the order-priority, delivery-priory, cost-priority, and quality-priority mode. In addition or instead, in the scheduling, priority may be given to other factors such as operating rates of devices or working efficiency of operators.

Figure 57:
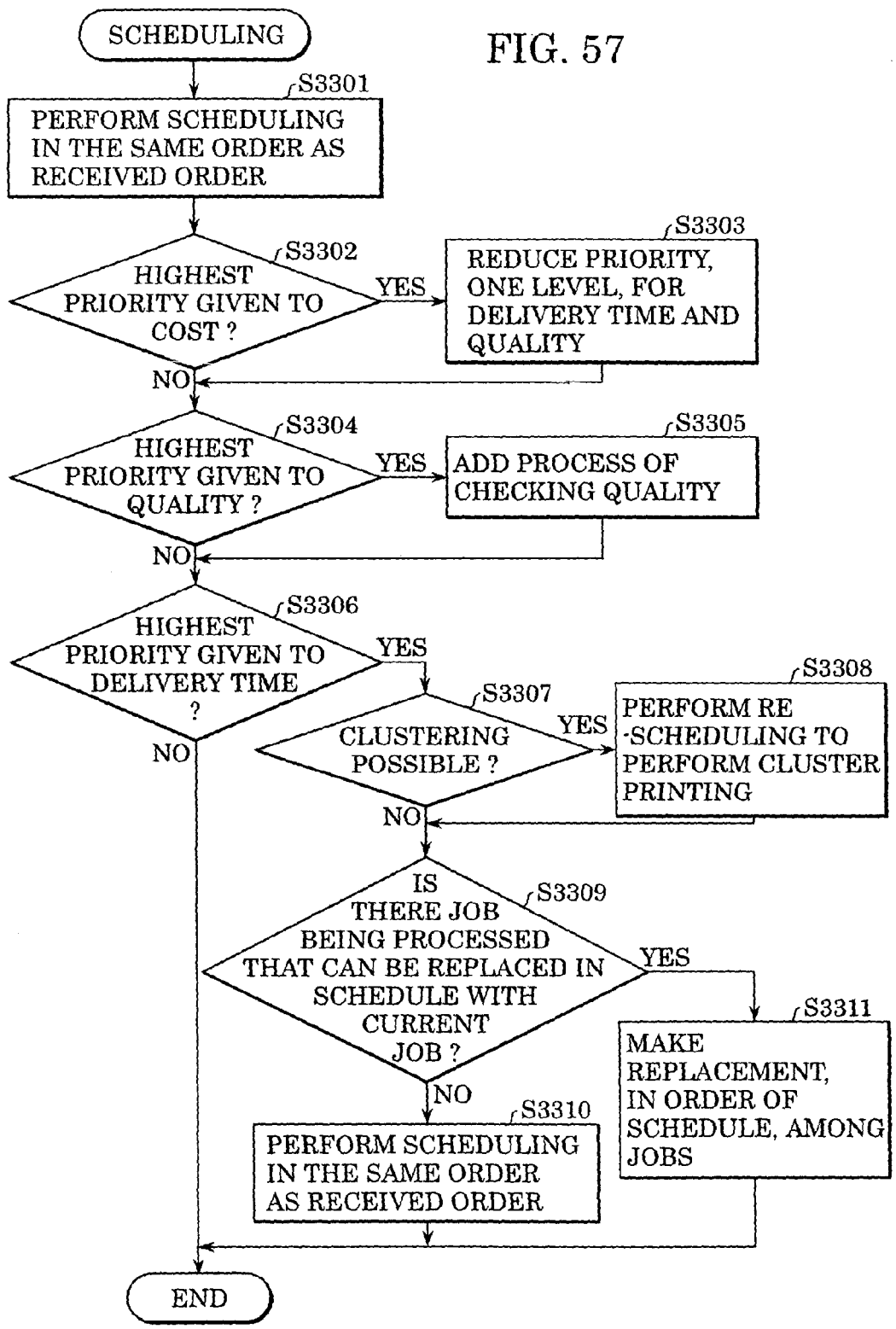
FIG. 57 is a flow chart showing an example of a scheduling process performed by a process control manager shown in FIG. 1.

FIG. 57 is a flow chart showing an example of a scheduling process performed by the process control manager 111 shown in FIG. 1. In this scheduling process, the schedule for a given job is made depending on specified priority while arbitrating conflicts with other jobs. In FIG. 57, S3301 to S3311 denote step numbers. In the example shown in FIG. 57, order-priority scheduling is set as a default priority mode.

First, a schedule is produced in the order-priority (default) mode (step S3301), and it is determined whether the cost-priority mode is selected (step S3302). If the priority mode is selected, then in step S3303, re-scheduling is performed in the cost-priority mode such that the schedule has a margin that allows intrusion of other future jobs (the priority level of delivery time and/or quality is lowered). After step S3303 is completed, the process proceeds to step S3304. On the other hand, if it is determined in step S3302 that the cost-priority mode is not selected, the process proceeds to step S3304.

In step S3304, it is determined whether the quality-priority mode is selected. If the quality mode is selected, re-scheduling is performed in the quality-priority mode such that steps of checking quality are added (step S3305). Thereafter, the process proceeds to step S3306. On the other hand, in the case in which it is determined in step S3304 that the quality-priority mode is not selected, the process proceeds to step S3306.

In step S3306, it is determined whether the delivery-priority mode is selected. If the delivery-priority mode is selected, it is further determined whether clustering of printers is possible (step S3307). If clustering of printers is possible, re-scheduling is performing using a cluster printer (step S3308). Thereafter, the process proceeds to step S3309. In the case in which it is determined in step S3307 that clustering of printers is not possible, the process proceeds from step S3307 to step S3309.

In step S3309, it is determined whether a period can be created by delaying another scheduled job, and the present job can be performed in the created period. If so, re-scheduling is performed such that the present job is moved up in schedule by delaying another job (step S3311). The obtained result is displayed in the form of a schedule chart.

In the case in which it is determined in step S3309 that there is no other scheduled job that can be delayed to move up the present job, re-scheduling is performed in the order-priority (step S3310), and the obtained result is displayed in the form of a schedule chart.

In the embodiment described above, scheduling for each job is performed in a priority mode selected from the order-priority, delivery-priority, cost-priority, and quality priority modes. In addition or instead, scheduling may be performed so as to reduce the cost in a priority mode selected from, for example, a mode in which high priority is given to system optimization and a mode in which high priority is given to the system operating rate.

Instead of simply selecting one priority mode from the order priority, delivery priority, cost priority, quality priority, system optimization priority, and system operating rate priority modes, a combination of two or more of these modes may be selected, and scheduling may be performed in the selected combined mode.

The scheduling mode can be switched even after scheduling is performed in a certain mode. If the scheduling mode is switched, the process control manager 111 performs re-scheduling and updates the schedule chart according to the result of the re-scheduling.

As described above, in the printing or POD market, when jobs are given, the schedule of processes including the order/document reception process, the document edit process, the proof process, the printing process, the post process, the file storage process, the delivery/dispatch process, and the scan process is made in an optimum manner, and the processes are performed in an efficient manner according to the schedule.

Displaying the determined schedule in the form of a schedule chart makes it possible to easily control the processes.

For each job, the scheduling is performed in a priority mode selected from the order-priority, delivery-priority, cost-priority, and quality-priority modes depending on the need of the customer while arbitrating conflict with other jobs.

Second Embodiment

In the first embodiment described above, the determination as to whether a process should be performed by the MFP 102 in the user environment or by an apparatus in the provider environment is made by a user. If the user determines that a job should be performed by an apparatus in the provider environment, the user places an order for the job by intentionally clicking the order button.

In a second embodiment described below, in contrast, all available functions are displayed on the operation unit of the MFP, the printer driver screen, or the job submit screen using a browser regardless of whether functions are available in the MFP in the user environment or apparatuses in the provider environment. If a user selects one of these functions, the MFP determines, depending on the selected function, whether the job should be processed by the MFP in the user environment or an apparatus in the provider environment, but the user is not concerned with the determination.

Figure 58:
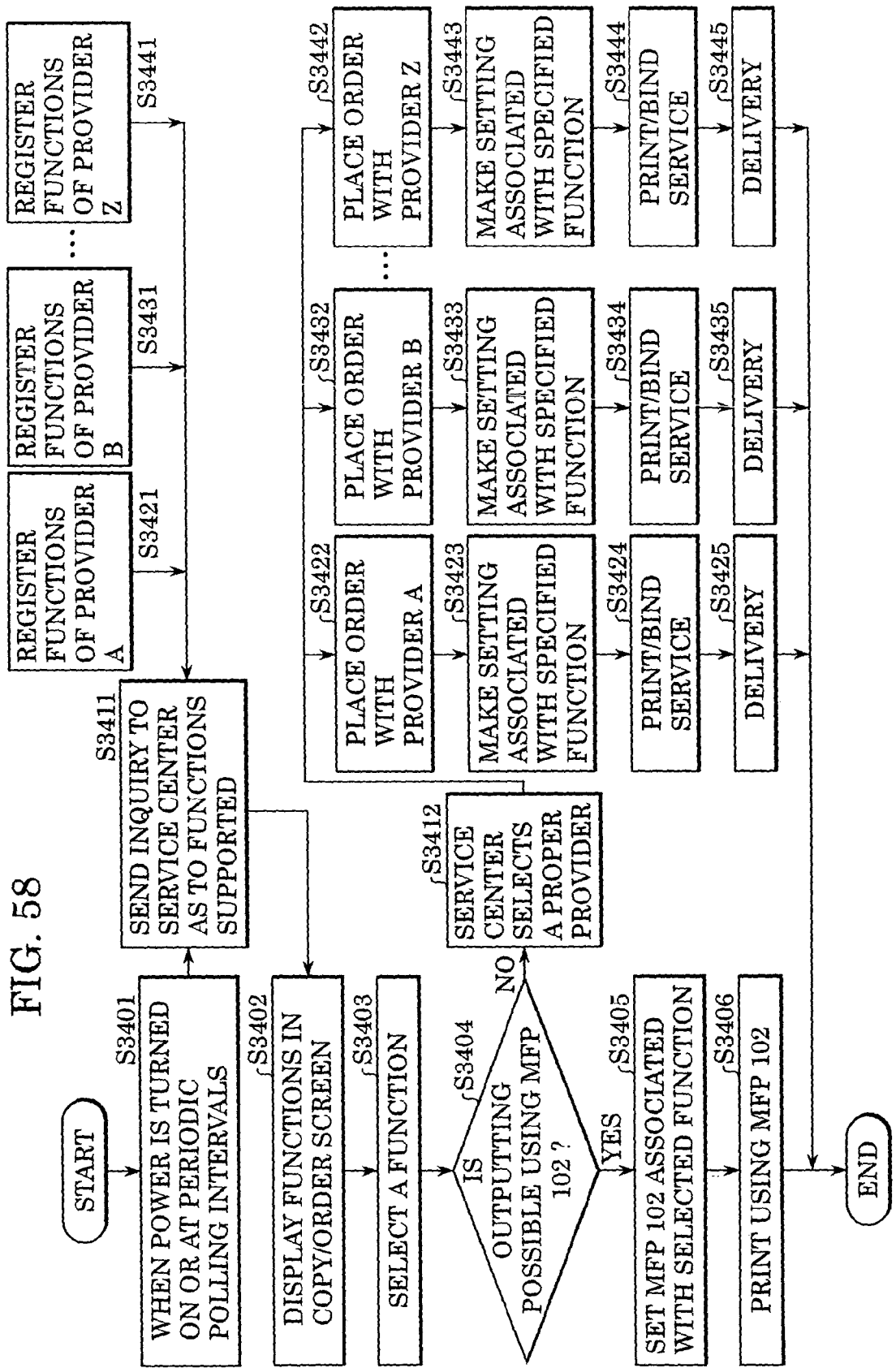
FIG. 58 is a flow chart showing another example of a job ordering process performed in an image processing system according to the present invention.

FIG. 58 is a flow chart showing an example of a job ordering process in an image processing system according to the second embodiment of the invention. In FIG. 58, S3401 to S3406, S3411, S3412, S3421 to S3425, S3431 to S3435, and S3441 to S3445 denote step numbers.

The service center 150 acquires information indicating functions available in respective providers, and registers the functions of the respective providers (steps S3421, S3431, and S3441). The registered functions are displayed on a function screen.

The MFP 102 may send an inquiry to the service center 150 (step S3411) each time the operation control screen such as that shown in FIG. 5 is opened or information indicating the available functions may be acquired in advance from the service center 105 when the power of the MFP 102 is turned on or by periodically polling as shown in FIG. 58 (step S3401) and the information may be displayed immediately when the user opens the function selection screen.

The available functions are displayed on the operation unit of the MFP 102 such that functions of logical OR of functions available in the MFP 102 and all functions supported by providers (provider A to provider Z in the example shown in FIG. 58) accessible via the service center are displayed or such that functions of respective providers are displayed on a provider-by-provider basis. In any case, functions are displayed without distinguishing functions available in the MFP 102 and functions available in external apparatuses (S3402).

The user selects one of the displayed functions (step S3403). The MFP 102 determines whether the selected function is executable by the MFP 102 (step S3404). If it is determined that the function is executable by the MFP 102, setting associated with the selection function is performed (step S3405), and the function (printing) is performed (step S3406). If step S3406 is completed, the process is ended.

On the other hand, if it is determined in step S3404 that the selection function is not executable by the MFP 102, the service center selects a proper provider to perform the selected function (step S3412), and an order is submitted to the selected provider directly or via the service center (step S3422, S3432, or S3442). In response to receiving the order, the selected provider makes settings associated with the function to be performed (S3423, S3433, or S3443), performs the specified function such as printing or binding (S3424, S3434, or S3444), and ships the result (S3425, S3435, or S3445).

In the above process, when the provider receives the order, the provider makes a schedule and quotes the price based on the delivery time and the quality specified by the user. If the price and the schedule are accepted by the user, the order for the job is established, and the provider starts performing the specified process according to the specified conditions. When the process is completed, the provider sends the result to the user.

Figure 59A:
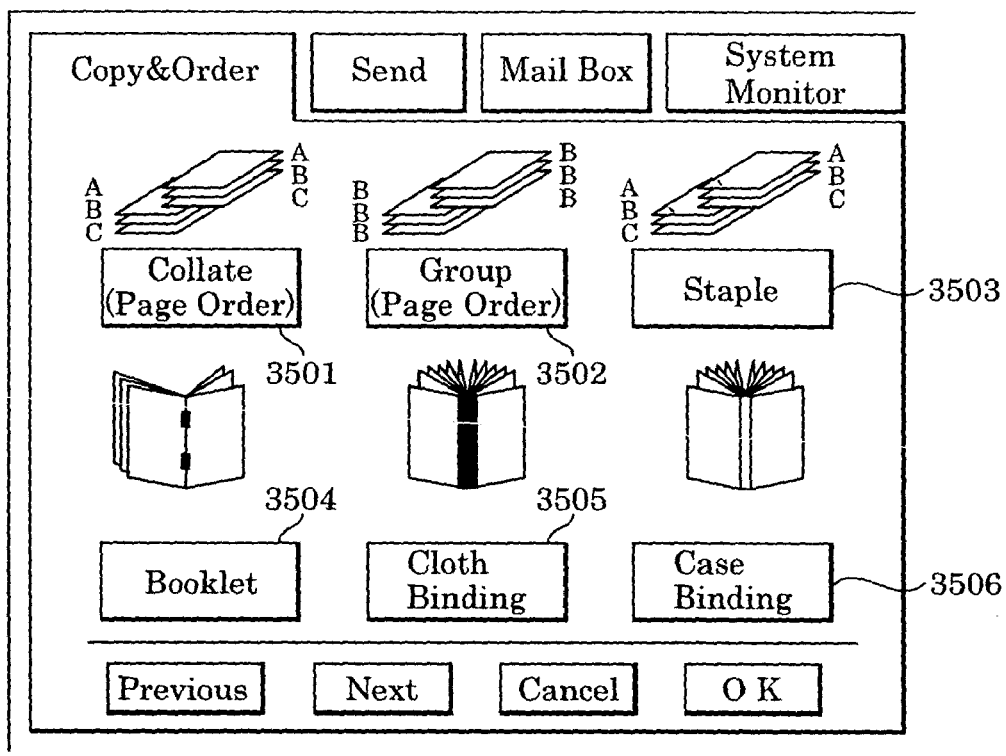
FIGS. 59A and 59B are diagrams showing examples of job setting/controlling screens displayed on an operation unit of an MFP shown in FIG. 1.
Figure 59B:
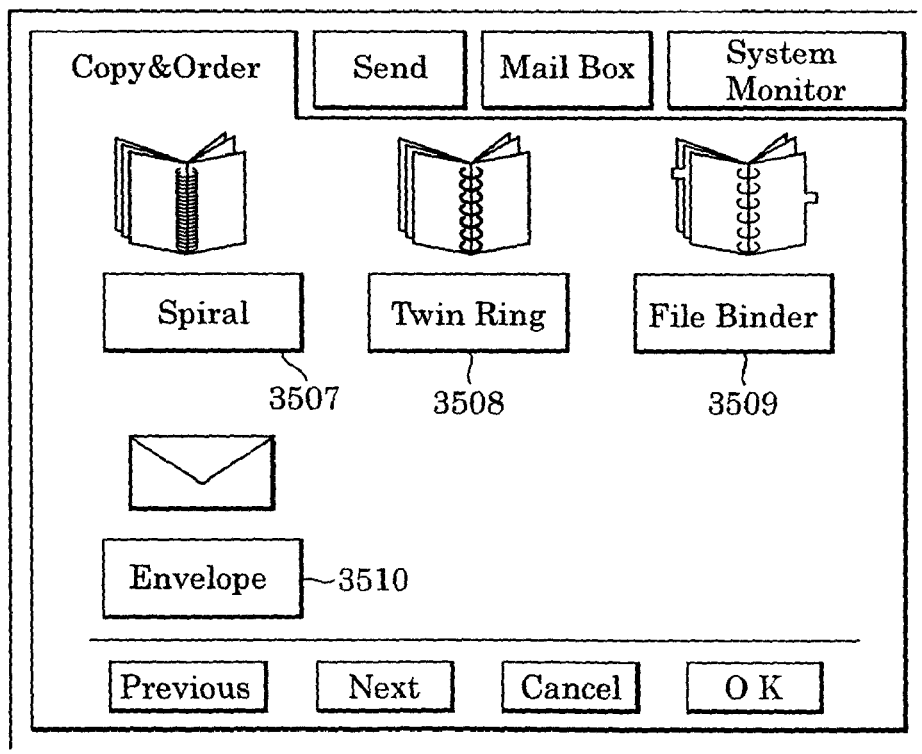

FIGS. 59A and 59B are diagrams showing examples of job setting/controlling screens displayed on the operation unit of the MFP 102 shown in FIG. 1. In these examples shown in FIGS. 59A and 59B, a "Copy & Order" window is opened on the operation control screen. In this "Copy & Order" window, a user can set process conditions and start the process without concern for whether the process is to be performed by the MFP 102 or a provider.

Figure 60:
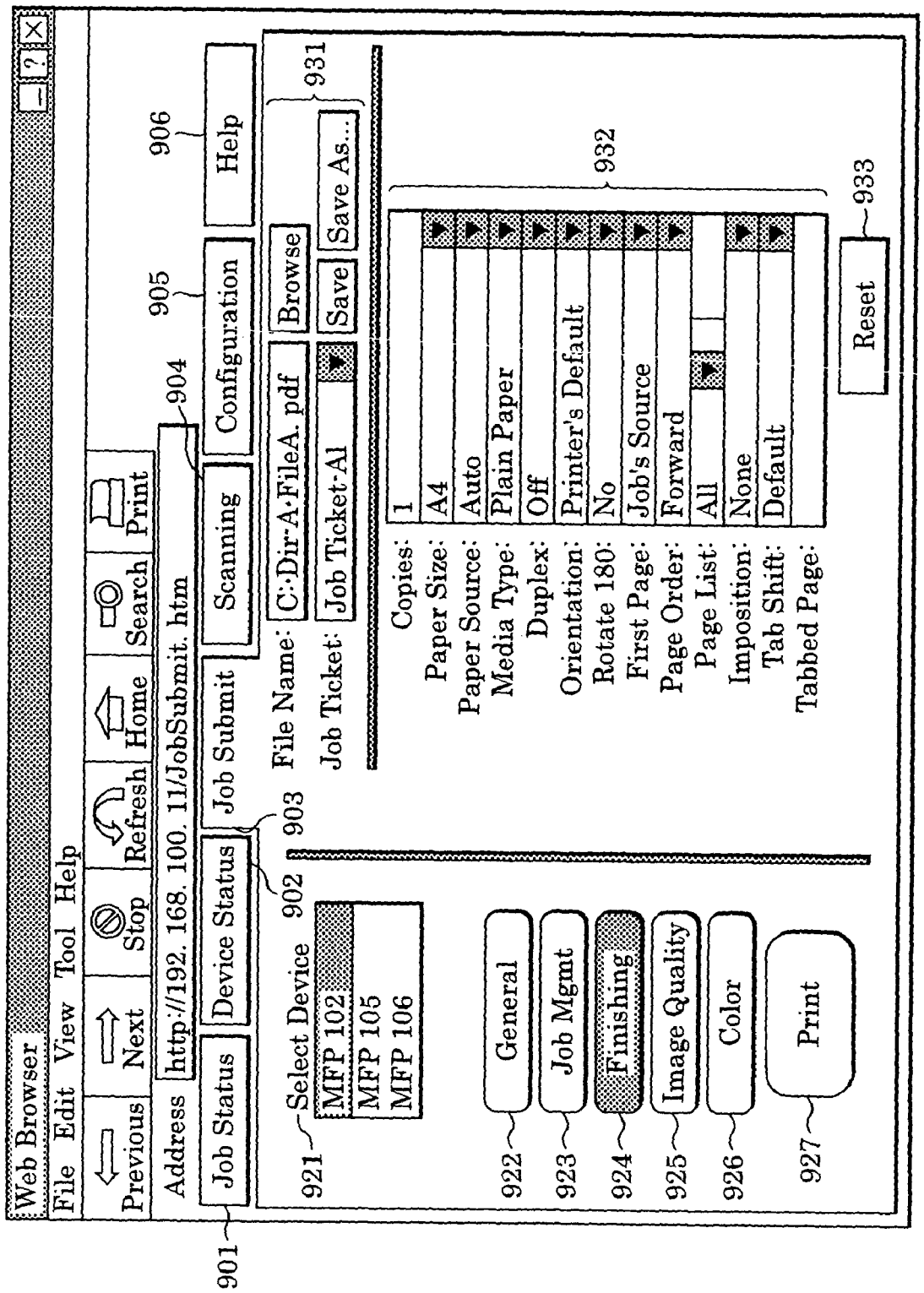
FIG. 60 is a diagram showing an example of a job ordering screen displayed on a client computer shown in FIG. 1.

FIG. 60 is a diagram showing an example of a job order screen displayed on the client computer 103 shown in FIG. 1. In this specific example, a job submit window for placing an order for printing is opened on the job order screen.

In the present embodiment, as shown in FIG. 60, functions that are not supported by the MFP 102 are also displayed on the screen, and a determination as to whether a process should be performed by the MFP 102 or an order for the process should be submitted to a provider is made by the MFP 102 depending on the process selected by the user.

Third Embodiment

In the first embodiment described above, the discussion was focused on the copying operation and the network printing operation, although the MFP has many other functions. That is, the functions of the MFP include some or all of: (A) copying function, (B) network scanner, (C) network printer, (D) facsimile transmission, (E) facsimile reception, (F) Box reception #1, (G) Box reception #2, (H) Box transmission #1, and (I) Box transmission #2.

Of these functions, box transmission functions are described herein. Functions associated with scanning are described later in a fourth embodiment.

When a memory box of the MFP 102 includes a scan job or a print job temporarily stored therein in response to a command issued by a user, the job stored in the memory box can be performed by the MFP 102 or an order for the job can be submitted to a service provider in a similar manner to the first embodiment.

The memory box can be used in two ways as described below. First, a user stores one or more jobs in the memory box, and all jobs stored in the memory box are output later at the same time. Second, one user stores a job in the memory box and another user reads the job from the memory box to process the job (for example, to print the job). Only a particular user authenticated by a user ID and a password can access the memory box.

In the former case, for example, data obtained via scanning or data supplied from the client computer 103 is stored in the memory box of the MFP 102. When a sufficiently large amount of data has been stored in the memory box, all stored data is output at the same time. A mixture of data obtained via scanning and data received from the client computer 103 may be stored in the memory box. Thus, the memory box is very convenient, in particular, when an order for a plurality of jobs is submitted or when a mixture of data obtained via scanning and electronic data is processed.

A user who stores a job in the memory box does not necessarily need to be the same person who places an order for the job stored in the memory box. In general, placing an order results in an occurrence of payment. Therefore, in some cases, persons who are allowed to place an order are limited to particular authorized persons. When a job is stored in the memory box by a user, an authorized user checks the job stored in the memory box by performing test printing or evaluates a preview image. If checking is successfully passed, an order for the job is submitted.

Fourth Embodiment

In the first embodiment described above, providers provide services associated with printing. However, the invention is not limited to such services associated with printing.

Figure 61:
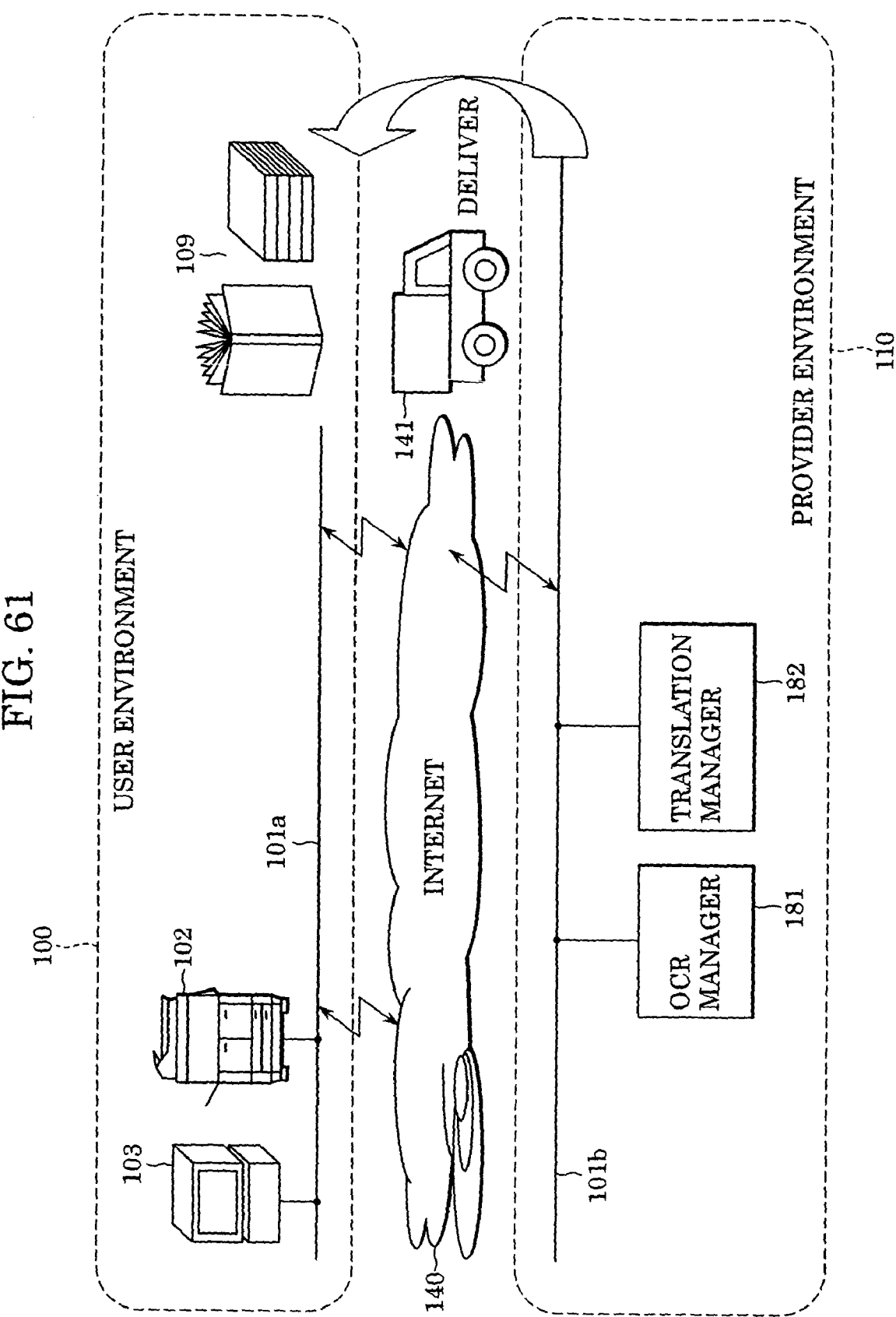
FIG. 61 is a diagram showing an image processing system according to an embodiment of the present invention.

For example, providers in the provider environment 110 shown in FIG. 61 provide OCR (Optical Character Recognition) service 181 and translation service 182.

FIG. 61 shows an example of an image processing system according to the fourth embodiment of the invention. In FIG. 61, similar parts to those in FIG. 1 are denoted by similar reference numerals.

Figure 62:
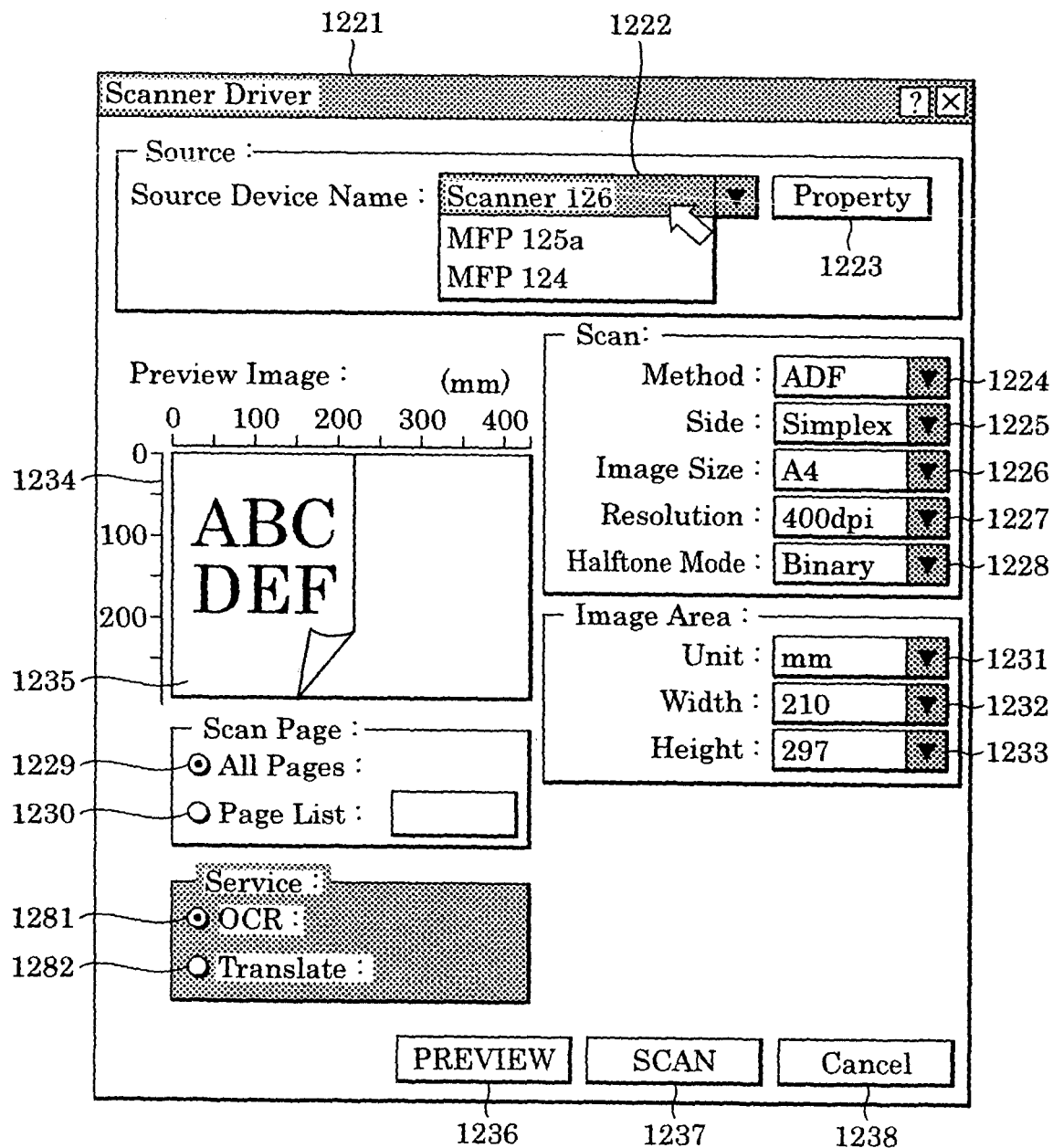
FIG. 62 is a diagram showing an example of a scanner driver setting screen in the image processing system shown in FIG. 61.

FIG. 62 shows an example of a scanner driver setting screen in the image processing system shown in FIG. 61.

As shown in FIG. 61, when data is obtained by scanning a paper document using the scanner of the MFP 102 and the client computer 103 in the user environment 100, service of optical character recognition for the data is provided. If desired, service of translation for the electronic data obtained as a result of optical character recognition is provided. Translation service may also available for other electronic document data.

The scanner driver shown in FIG. 62 additionally includes an OCR button 1281 and a translation button 1282, in addition to other elements shown in FIG. 30. If a user selects the OCR button 1281 or the translation button 1282, an order for the OCR service or the translation service is submitted to a service center or a provider in a similar manner to the first embodiment.

If the provider receives the order, the provider performs optical character recognition or translation in accordance with the order. If the result is output in a physical form, the result is sent to the customer by truck or the like. If the result is output in the form of electronic data, the result is sent to the MFP 102 or the client computer 103 in the user environment 100 via the Internet 140.

If the data arrives at the MFP 102, the MFP 102 informs the user of the arrival of the data. If the user wants to print the received data, the data is printed by the MFP 102.

Fifth Embodiment

In the previous embodiments, a process is performed selectively by the MFP 102 of the user or by a service provider. Instead, processing (printing or copying) by the MFP 102 of the user and placing of an order with a service provider may be concurrently performed.

Furthermore, although in the previous embodiments, an order is submitted to only one service provider at a time, an order may be submitted to a plurality of service provides at a time to complete a job in a shorter time.

Referring to a memory map shown in FIG. 64, a data processing program readable by the information processing system according to the present invention is described below.

FIG. 64 is a diagram illustrating the memory map of a storage medium that stores various data processing programs readable by the information processing system, according to the present invention.

Note that in addition to information shown in FIG. 9, information for managing the programs stored in the storage medium, such as information indicating the version, a producer, or the like, and/or other additional information, such as icons indicating respective programs, depending on an operating system (OS) that reads the programs may also be stored in the storage medium.

Data associated with respective programs are also managed by directories. A program for installing a program on a computer may also be stored on the storage medium. When a program to be installed is stored in a compressed form, a program for decompressing the program may also be stored on the storage medium.

The functions described above with reference to FIGS. 6, 8, 15, 26, 31, 38, 39, 40, 57, and 58 according to the present invention may be realized by executing a program installed from the outside on a host computer. In this case, information including the program according to the present invention may be supplied to information apparatuses or an image output apparatus from a storage medium such as a CD-ROM, a flash memory, or a FD (floppy disk), or from an external storage medium via a network.

A storage medium having software program code stored thereon may be provided to a system or an apparatus for implementing the functions disclosed in the embodiments described above and by reading and executing the program code on a computer (or a CPU or an MPU (micro-processing unit)) disposed in the system or the apparatus.

In this case, the program code read from the storage medium implements the functions disclosed in the embodiments described above.

Note that there is no restriction on the specific form of the program as long as the program can implement the functions of the invention. For example, the program may be in many forms such as object code, an interpreter program, or script data executed on the OS.

Storage media which can be employed in the present invention to supply the program code include a floppy disk, a hard disk, an optical disk, a magneto-optical disk, an MO (magneto-optical), a CD-ROM, a CD-R (compact disk-recordable), a CD-RW (compact disk-rewriteable), a magnetic tape, a non-volatile memory card, a ROM, and a DVD (digital versatile disk).

In this case, the program code read from the storage medium implements the functions disclosed in the embodiments described above.

The program may be provided, for example, as follows. A client computer accesses a particular web page on the Internet via a web browser, and the computer program in the original form according to the present invention or a file including the computer program in a compressed form and an automatic installer is downloaded into a storage medium such as a hard disk. The program code forming the program according to the present invention may be divided into a plurality of files, and the files may be downloaded from different web pages. Note that a web server or an ftp server may provide program files for implementing functions of the invention on a computer.

The program according to the present invention may be stored in an encrypted form on a storage medium such as a CD-ROM, and the storage medium may be supplied to an authorized user. The authorized user may download key information needed to decrypt the encrypted program from a web page via the Internet, and may install on a computer the program decrypted by using the acquired key information.

The functions disclosed in the embodiments may be implemented not only by executing the program code on a computer, but part or all of the processes may be performed by an operating system or the like running on the computer in accordance with a command issued by the program code. The program code stored on the storage medium may be loaded into a memory of an extension card inserted in a computer or into a memory of an extension unit connected to a computer, and part or all of the process may be performed by a CPU disposed on the extension card or the extension unit in accordance with the loaded program code. Such implementation of the functions also falls within the scope of the present invention.

The present invention is not limited to the specific embodiments described above, but many modifications and combinations of two or more embodiments are possible without departing from the scope of the invention.

The details of the MFP resources in the provider, such as a printer engine (monochrome or color), optional devices (such as a finisher and a binder) and a scanner, and the details of processes such as image data processing and print data processing are not described herein because these are known techniques (examples of which may be found, for example, in Japanese Patent Laid-Open No. 2003-162393) and an ordered job can be processed by the provider using these known techniques.

As described above with reference to specific embodiments, the present invention makes it possible for a user to use a function/capability that is not available in an MFP of the user.

For example, when a user's MFP does not have a capability of making a page layout for binding, variable data printing, binding, color printing, or printing a large number of copies in a short time, the user can receive a necessary service from a provider.

As described above with reference to specific embodiments, the present invention provides an image forming system (such as that shown in FIG. 1) including an image forming apparatus (such as the MFP 102 shown in FIG. 1) connected to a network and one or more service providers (such as devices in the provider environment shown in FIG. 1) that provide a particular image processing service (for example, sheet processing such as collating that cannot be performed by the image forming apparatus) via the network. In this image forming system, the image forming apparatus acquires information indicating one or more image processing functions provided by each of the one or more service providers (for example, the MFP 102 acquires information indicating functions executable by respective devices in the provider environment 110), and the apparatuses and/or the system are controlled such that first-type processing functions indicated by the acquired information and second-type processing functions executable by the image forming apparatus are selectively displayed on the same operation control screen. For example, in a first mode, functions executable by the MFP 102 are displayed in the operation control screen (FIG. 7A) on the operation unit of the MFP 102 such that a user can select an arbitrary one of the displayed functions. In s second mode, functions executable by devices in the provider environment 110 connected via a data communication medium to the MFP 102 are displayed in the operation control screen on the operation unit of the MFP 102 such that the user can select an arbitrary one of the displayed functions. The operation control screen is displayed either in the first mode or in the second mode in accordance with a selection made by a user.

Not only functions available in the image forming apparatus (MFP 102 shown in FIG. 1) but also functions that are not executable by the image forming apparatus but executable by service providers on the network are displayed on the image forming apparatus which allows the user to select a function and specify operation conditions of the selected function without concern for whether the function is to be executed by the local apparatus or a remote apparatus. This provides an environment that allows the user to receive, in a quick and efficient manner, service for sophisticated process or binding process from service providers on the network.

As described above, the present invention provides an image forming system and an image forming apparatus, that can be applied to the POD market and, can handle various needs of users, and can be used easily by users in a very convenient manner.

In the embodiments described above, a job that occurs in an image forming apparatus such as an MFP is processed by a remote service provider. However, the present invention is not limited to the image forming apparatus, and the invention may be applied to other types of data processing systems in which data processing (such as accounting service processing, insurance service processing, or financial service processing) that cannot be performed by an application installed on a user's personal computer is performed by a remote service provider.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus having an image forming unit to execute an image forming process in accordance with a print setting and being capable of communicating via a network with an external service provider that includes at least one post processing device which is located remote from the image forming apparatus, the image forming apparatus comprising:
   an operation unit operable by a first user who operates the image forming apparatus;
   a display control unit configured to display a print setting for using functions available in the image forming apparatus and a print setting for using functions available in the external service provider including functions unavailable in the image forming apparatus on the operation unit in a distinguishable condition;
   a print setting command receiving unit configured to receive a print setting command for a print job via the operation unit;

a print start command receiving unit configured to receive a print start command for the print job via the operation unit; and an execution-transmission unit configured to, in response to the reception of the print start command for the print job by the print start command receiving unit, cause the image forming unit to execute a process based on the print setting for using the functions available in the image forming apparatus in print settings included in the print setting command received by the print setting command receiving unit, and transmit, via the network to the external service provider, an order command including information regarding the print setting so that the functions unavailable in the image forming apparatus and available in the external service provider are executed on a print material output from the image forming apparatus by the external service provider, wherein the image forming process executed by the image forming unit includes at least a printing process, wherein the functions unavailable in the image forming apparatus and available in the external service provider include at least a post process on printed material, and wherein the order command includes information for notifying instruction to a second user of the external service provider, of what the second user operates with the post processing device for completion of the post process on the printed material output from the image forming apparatus.

2. The image forming apparatus according to claim 1, wherein the information, included in the order command, for sending the print job in the image forming apparatus from the image forming apparatus to the external service provider is an operation command to instruct the second user of the external service provider to remove the printed material from the image forming apparatus.

3. The image forming apparatus according to claim 1, wherein the display control unit displays the print setting for using the functions available in the image forming apparatus and the print setting for using the functions available in the external service provider on different screens switchable by an operation via the operation unit.

4. The image forming apparatus according to claim 1, wherein the functions available in the external service provider include at least one of a print job order reception, a document reception, a print job edit, scanning, print job content confirmation, print job rasterizing, printing, print job post processing, print job file storage, print job delivery/dispatch, print job text recognition, translation and process management of a workflow including a plurality of process steps.

5. The image forming apparatus according to claim 1, wherein the execution-transmission unit transmits to the external service provider, as the order command, job order data for the print job and operation instruction data identifying a process to be performed on the print job by a device of the external service provider.

6. The image forming apparatus according to claim 1, wherein the post process includes at least one of sheet cutting, saddle binding, case binding, folding, enclosing and collating.

7. A method for processing a print job performed by an image forming apparatus having an image forming unit to execute an image forming process in accordance with a print setting and being capable of communicating via a network with an external service provider that includes at least one post processing device which is located remote from the image forming apparatus, the method comprising:

displaying a print setting for using functions available in the image forming apparatus and a print setting for using functions available in the external service provider including functions unavailable in the image forming apparatus on an operation unit operable by a first user who operates the image forming apparatus in a distinguishable condition;

receiving a print setting command and a print start command for a print job via the operation unit; and causing the image forming unit to execute a process based on the print setting for using the functions available in the image forming apparatus in print settings included in the print setting command received by receiving step in response to the print start command for the print job received by receiving step; and transmitting, via the network to the external service provider, an order command including information regarding the print setting so that the functions unavailable in the image forming apparatus and available in the external service provider are executed on a print material output from the image forming apparatus by the external service provider, wherein the image forming process executed by the image forming unit includes at least a printing process, wherein the functions unavailable in the image forming apparatus and available in the external service provider include at least a post process on printed material, and wherein the order command includes information for notifying instruction to a second user of the external service provider, of what the second user operates with the post processing device for completion of the post process on the printed material output from the image forming apparatus.

8. The method for processing the print job according to claim 7,
wherein the information, included in the order command, for sending the print job in the image forming apparatus from the image forming apparatus to the external service provider is an operation command to instruct the second user of the external service provider to remove the printed material from the image forming apparatus.

9. The method for processing the print job according to claim 7,
wherein the displaying step displays the print setting for using the functions available in the image forming apparatus and the print setting for using the functions available in the external service provider on different screens switchable by an operation via the operation unit.

10. The method for processing the print job according to claim 7,
wherein the functions available in the external service provider include at least one of a print job order reception, a document reception, a print job edit, scanning, print job content confirmation, print job rasterizing, printing, print job post processing, print job file storage, print job delivery/dispatch, print job text recognition, translation and process management of a workflow including a plurality of process steps.

11. The method for processing the print job according to claim 7,
wherein the transmitting step transmits to the external service provider, as the order command, job order data for the print job and operation instruction data identifying a process to be performed on the print job by a device of the external service provider.

12. The image forming apparatus according to claim 7, wherein the post process includes at least one of sheet cutting, saddle binding, case binding, folding, enclosing and collating.

13. A non-transitory computer readable storage medium storing instructions for processing a print job performed by an image forming apparatus having an image forming unit to execute an image forming process in accordance with a print setting and being capable of communicating via a network with an external service provider that includes at least one post processing device which is located remote from the image forming apparatus, which, when executed by a computer, cause the computer to perform operations comprising:

displaying a print setting for using functions available in the image forming apparatus and a print setting for using functions available in the external service provider including functions unavailable in the image forming apparatus on an operation unit operable by a first user who operates the image forming apparatus in a distinguishable condition;

receiving a print setting command and a print start command for a print job via the operation unit; and causing the image forming unit to execute a process based on the print setting for using the functions available in the image forming apparatus in print settings included in the print setting command received by receiving step in response to the print start command for the print job received by receiving step; and transmitting, via the network to the external service provider, an order command including information regarding the print setting so that the functions unavailable in the image forming apparatus and available in the external service provider are executed on a print material output from the image forming apparatus by the external service provider, wherein the image forming process executed by the image forming unit includes at least a printing process, wherein the functions unavailable in the image forming apparatus and available in the external service provider include at least a post process on printed material, and wherein the order command includes information for notifying instruction to a second user of the external service provider, of what the second user operates with the post processing device for completion of the post process on the printed material output from the image forming apparatus.

* * * * *